United States Patent
Mizutani et al.

(10) Patent No.: US 7,512,538 B2
(45) Date of Patent: Mar. 31, 2009

(54) DIALOG SUPPORTING DEVICE

(75) Inventors: Kenji Mizutani, Nara (JP); Yoshiyuki Okimoto, Kyoto (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 11/785,188

(22) Filed: Apr. 16, 2007

(65) Prior Publication Data

US 2007/0198270 A1    Aug. 23, 2007

Related U.S. Application Data

(63) Continuation of application No. PCT/JP2006/311792, filed on Jun. 13, 2006.

(30) Foreign Application Priority Data

Jul. 13, 2005    (JP)    ............................. 2005-204199

(51) Int. Cl.
*G10L 11/00*    (2006.01)

(52) U.S. Cl. ............................. 704/275; 704/5; 704/7; 704/277

(58) Field of Classification Search ................ 704/1–5, 704/6, 7–10, 277, 231, 270, 275, 270.1; 707/4, 707/6, 10

See application file for complete search history.

(56) References Cited

U.S. PATENT DOCUMENTS 6,339,754 B1 *    1/2002    Flanagan et al. ............... 704/2
7,130,801 B2 *    10/2006    Kitahara et al. ............. 704/277
2002/0120436 A1    8/2002    Mizutani et al.
2005/0049851 A1    3/2005    Watanabe et al.

FOREIGN PATENT DOCUMENTS

| JP | 2000-242642 | 9/2000 |
|---|---|---|
| JP | 2003-030187 | 1/2003 |
| JP | 2003-196275 | 7/2003 |
| JP | 2003-288339 | 10/2003 |
| JP | 2004-295578 | 10/2004 |
| JP | 2005-100335 | 4/2005 |
| JP | 2005-107597 | 4/2005 |

* cited by examiner

*Primary Examiner*—Huyen X. Vo
(74) *Attorney, Agent, or Firm*—Wenderoth, Lind & Ponack, L.L.P.

(57) ABSTRACT

Provided is a dialog supporting device which can support dialog to be speedily completed on the whole, by reducing the number of operations required to generate one utterance regardless of dialog partner's interrupting utterances. The dialog supporting device includes: an example database which holds examples used in the dialog; an utterance receiving unit which receives an utterance of the user and provides the utterance as utterance information; an example selecting unit which (i) extracts candidates for an example by searching the example database based on the utterance information, (ii) selects a desired example from the extracted candidates according to instructions from the user, and (iii) obtains a translated example associated with the selected example; a sending unit which sends the translated example to a dialog supporting device of a dialog partner of the user; a receiving unit operable to receive an example from the dialog supporting device of the dialog partner; an utterance outputting unit which outputs the received example; and an example reevaluating unit which reevaluates the candidates held in the example selecting unit, based on the received example.

13 Claims, 52 Drawing Sheets

FIG. 3

| Utterance No. | Language 1 | Language 2 | Evaluation Tag |
|---|---|---|---|
| 1 | こんにちは | Hello | |
| 2 | おはようございます | Good morning | |
| 3 | こんばんは | Good evening | |
| 4 | 空港へ行きたい | I want to go to the airport | v:1 |
| 5 | 電車かバスか地下鉄で行けます | You can go by train, by bus or by subway | v:3 |
| 6 | 電車かバスで行けます | You can go by train or by bus | v:2 |
| 7 | 電車か地下鉄で行けます | You can go by train or by subway | v:2 |
| 8 | バスか地下鉄で行けます | You can go by bus or by subway | v:2 |
| 9 | 電車で行けます | You can go by train | v:1 |
| 10 | バスで行けます | You can go by bus | v:1 |
| 11 | 地下鉄で行けます | You can go by subway | v:1 |
| 12 | 安い方がいいです | The cheaper is welcomed | f:x<=y |
| 13 | 速い方がいいです | The fastest is welcomed | f:x<=y |
| 14 | 最も安いのがいいです | The cheapest is welcomed | f:x<=y |
| 15 | 最も速いのがいいです | The fastest is welcomed | f:x>=y |
| 16 | すべて教えて下さい | Tell me everything | f:x>=y |
| 17 | 何でもいいです | Anything will do | f:x>=y |
| ... | ... | ... | ... |

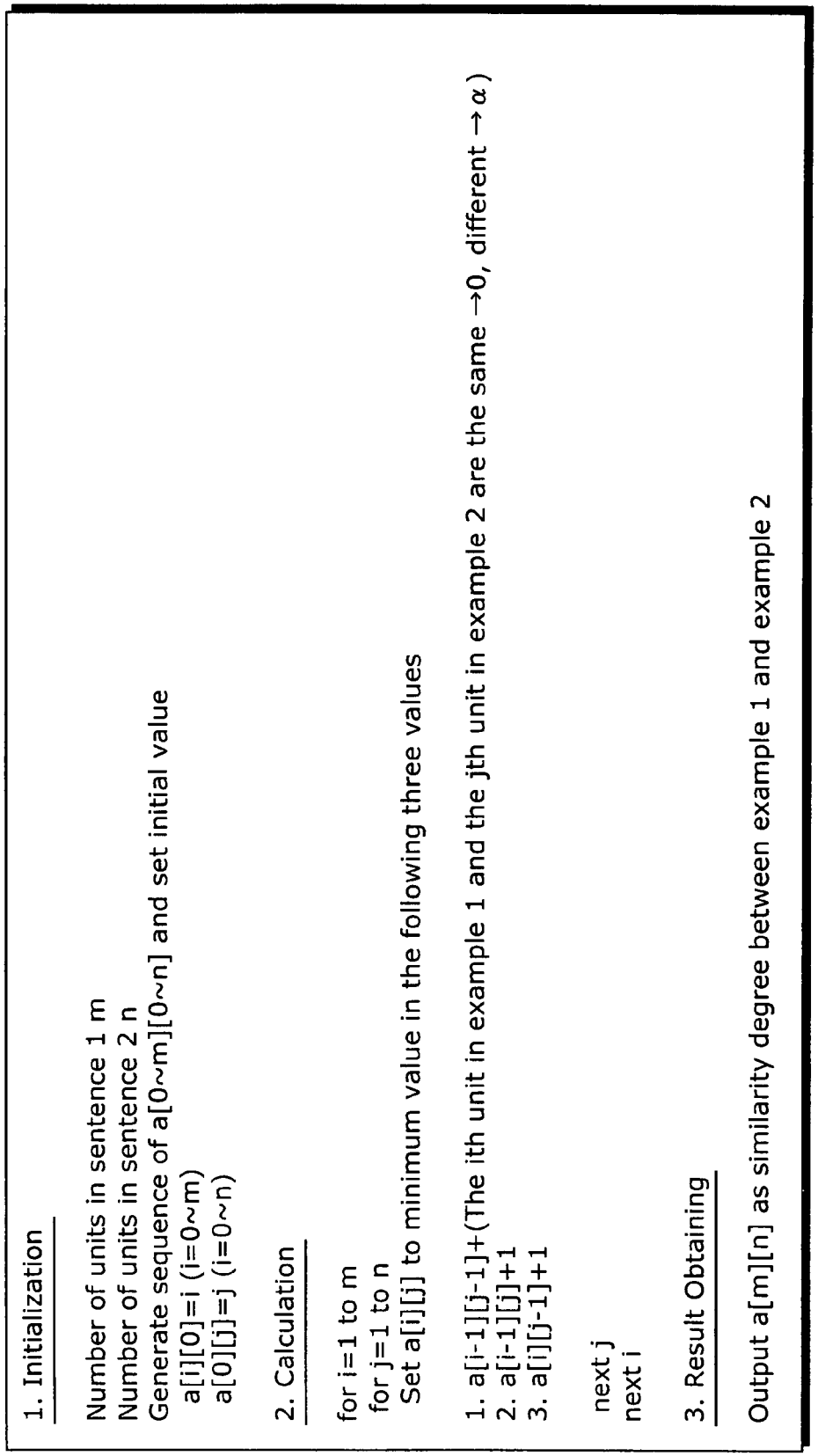

FIG. 5

1. Initialization

Number of units in sentence 1 m
Number of units in sentence 2 n
Generate sequence of a[0~m][0~n] and set initial value
  a[i][0]=i (i=0~m)
  a[0][j]=j (j=0~n)

2. Calculation for i=1 to m
  for j=1 to n
    Set a[i][j] to minimum value in the following three values 1. a[i-1][j-1]+(The ith unit in example 1 and the jth unit in example 2 are the same →0, different →α)
  2. a[i-1][j]+1
  3. a[i][j-1]+1 next j
next i

3. Result Obtaining

Output a[m][n] as similarity degree between example 1 and example 2

FIG. 20

| Utterance No. | Language 1 | Language 2 | Evaluation Tag |
|---|---|---|---|
| 1 | この辺りの気候はいかがですか | How is the climate here | f:x==CLIM |
| 2 | 気温はどうですか | How is the temperature | f:x==TEMP |
| 3 | 湿度はどうですか | How is the humidity | f:x==HUM |
| 4 | ここはとても寒いです | It's very cold here | v:TEMP|CLIM |
| 5 | ここはとても暖かいです | It's very warm here | v:TEMP|CLIM |
| 6 | ここはとても湿度が高いです | It's very wet here | v:HUM|CLIM |
| 7 | ここはとても晴れの日が多いです | It's very sunny here | v:CLIM |
| 8 | ここはとても過ごしやすいです | It's very mild here | v:TEMP|HUM|CLIM |
| 9 | ここはとても湿度が低いです | It's very dry here | v:HUM|CLIM |
| 10 | ここはとても曇りの日が多いです | It's very cloudy here | v:CLIM |
| 11 | ここはとても暑いです | It's very hot here | v:TEMP|CLIM |
| ... | | | ... |

FIG. 31

| Utterance No. | 言語 1 | Language 2 | Evaluation Tag |
|---|---|---|---|
| 1 | 你好 | Hello | |
| 2 | 早上好 | Good morning | |
| 3 | 晚上好 | Good evening | |
| 4 | 想去机场 | I want to go to the airport | |
| 5 | 坐电车，巴士，或者坐地铁就能去 | You can go by train, by bus or by subway | v:1 |
| 6 | 坐电车，或者坐巴士就能去 | You can go by train or by bus | v:3 |
| 7 | 坐电车，或者坐地铁就能去 | You can go by train or by subway | v:2 |
| 8 | 坐巴士，或者坐地铁就能去 | You can go by bus or by subway | v:2 |
| 9 | 坐电车就能去 | You can go by train | v:2 |
| 10 | 坐巴士就能去 | You can go by bus | v:1 |
| 11 | 坐地铁就能去 | You can go by subway | v:1 |
| 12 | 还是便宜的好 | The cheaper is welcomed | f:x<=y |
| 13 | 还是快的好 | The fastest is welcomed | f:x<=y |
| 14 | 最便宜的好 | The cheapest is welcomed | f:x<=y |
| 15 | 最快的好 | The fastest is welcomed | f:x>=y |
| 16 | 请你都告诉我 | Tell me everything | f:x>=y |
| 17 | 都可以 | Anything will do | f:x>=y |
| ... | ... | ... | ... |

FIG. 42

| Utterance No. | 言語 1 | Language 2 | Evaluation Tag |
|---|---|---|---|
| 1 | 这个附近的气候怎样 | How is the climate here | f:x=CLIM |
| 2 | 气温怎样 | How is the temperature | f:x=TEMP |
| 3 | 湿度怎样 | How is the humidity | f:x=HUM |
| 4 | 这里非常冷 | It's very cold here | v:TEMP|CLIM |
| 5 | 这里非常暖和 | It's very warm here | v:TEMP|CLIM |
| 6 | 这里湿度非常高 | It's very wet here | v:HUM|CLIM |
| 7 | 这里晴天非常多 | It's very sunny here | v:CLIM |
| 8 | 这里过得非常好 | It's very mild here | v:TEMP|HUM|CLIM |
| 9 | 这里湿度非常低 | It's very dry here | v:HUM|CLIM |
| 10 | 这里阴天非常多 | It's very cloudy here | v:CLIM |
| 11 | 这里非常热 | It's very hot here | v:TEMP|CLIM |
| ... | ... | ... | ... |

DIALOG SUPPORTING DEVICE

CROSS REFERENCE TO RELATED APPLICATION(S)

This is a continuation application of PCT application No. PCT/JP2006/311792 filed Jun. 13, 2006, designating the United States of America.

BACKGROUND OF THE INVENTION (1) Field of the Invention

The present invention relates to a dialog supporting device which supports on-going dialog between people.

(2) Description of the Related Art

Conventionally, translation devices have been developed with the purpose of supporting on-going dialog in different languages, which is made between ordinary people and local people on trips abroad or the like. Such a translation device is represented by certain translation devices in which a translation scheme using original/translation pairs of example sentences, or example usages, is implemented in small information processing apparatuses such as Personal Digital Assistants (PDAs). Such devices have thousands of examples in order to cover general travel conversation. However, the devices have a problem when a user actually uses the device, since the user has to select a desired example from a list of the examples by sight. This problem is noticeable, especially when such a device has a small display for displaying the list of examples, which makes it difficult for the user to view many examples at once. Moreover, in general use of the translation device, one dialog with a dialog partner requires more than several examples, so that the translation device completes the dialog taking much more time than the user expects. Therefore, in order to achieve the final purpose of supporting dialog between people, there is a need for a function by which the user can speedily select the desired example from a great number of examples.

As a method for solving the above problem, there has been proposed a technique of narrowing down candidates for a next utterance of a user, using example dialog models or a corpus of conversation training histories, as disclosed in Japanese Unexamined Patent Application Publication No. 2003-30187, for instance.

When such a translation device is actually used, two users who speak respective different languages can have dialog using respective translation devices freely. When the translation device has an example that expresses exactly what one user wishes to say to the other user (hereinafter, referred to also as "a partner", "a dialog partner", or "a partner user"), the former user simply selects the example. However, each example in the translation device is generally a short sentence, so that it is able to be applied to various dialog situations. This is because a long example expresses a rather specific situation and thereby applications of the sentence are considerably limited. Therefore, the user has to express what to say, by sequentially selecting a plurality of such short examples.

However, although it is possible to shorten a time required to select examples using, for instance, the technique disclosed in the above-mentioned Japanese Unexamined Patent Application Publication No. 2003-30187, or the like, it is not possible to completely eliminate a time lag between selection of a certain example and selection of a next example. Therefore, as explained below, depending on how the translation device is used, there is a problem that one utterance is outputted from the translation device, using operations which are several times as many as operations for searching one example.

For instance, it is assumed that a user A who speaks Japanese has a dialog with a user B who speaks English, and that the user A wishes to say to the user B, "I'd like to know a cheap way to get to the airport". In this situation, a translation device of the user A has only the following examples which are related to what the user wishes to say.

<Example 1> "空港へ行く方法を教えて下さい。" "How can I get to the airport?"

<Example 2> "安い方がいいです。" "I'd like to take a cheaper way."

Here, the user A firstly selects "空港へ行く方法を教えて下さい。" and then selects "安い方がいいです。". The user B hears the example 1 "How can I get to the airport?" outputted from a translation device of the user B, and then, after a certain time period, hears the example 2 "I'd like to take a cheaper way". Here, it is assumed that the user B attempts to reply to the user A immediately after hearing the example 1, and thereby searching for examples explaining ways to an airport using the translation device of the user B. When the user B hears the example 2 from the user A during the above searching, the user B has to delete all of the searching operations, and begins to search for different examples to reply to the example 2. In short, although the conventional technologies reduce example searching operations required to output one utterance, a problem still remains that the outputting is often cancelled by interruption of a partner's further utterance, so that the operations for the unnecessary outputting are wasted operations. As a result, depending on how the translation device is used, outputting of one utterance from the translation device requires a great number of operations which are several times as many as the operations required to search for one example.

Thus, in view of the above problems, an object of the present invention is to provide a dialog supporting device which can support dialog to be speedily completed on the whole, by reducing the number of operations for generating one utterance regardless of partner's interrupting utterances.

SUMMARY OF THE INVENTION

In order to achieve the above object, a dialog supporting device according to the present invention supports dialog and includes: an example database operable to hold first examples and second examples which are used in the dialog, the first examples are associated with respective second examples; an utterance receiving unit operable to receive an utterance of a user; an example selecting unit operable to (i) extract candidates for the first example by searching the example database based on the utterance received by the utterance receiving unit, (ii) select one first example from the extracted candidates, and (iii) obtain a second example associated with the selected first example; a sending unit operable to send the second example obtained by the example selecting unit, to a dialog supporting device of a dialog partner of the user; a receiving unit operable to receive a second example from the dialog supporting device of the dialog partner; an utterance outputting unit operable to output the second example received by the receiving unit; and an example reevaluating unit operable to reevaluate the candidates extracted by the example selecting unit, based on the second example received by the receiving unit.

FURTHER INFORMATION ABOUT TECHNICAL BACKGROUND TO THIS APPLICATION

The disclosure of Japanese Patent Application No. 2005-204199 filed on Jul. 13, 2005, PCT application No. PCT/JP2006/311792 filed Jun. 13, 2006, including specifications, drawings and claims, are incorporated herein by reference in their entirety.

BRIEF DESCRIPTION OF THE DRAWINGS

These and other objects, advantages and features of the present invention will become apparent from the following description thereof taken in conjunction with the accompanying drawings that illustrate specific embodiments of the present invention. In the Drawings:

FIG. 3 is a table showing an example of an example database;

FIG. 5 is a diagram showing an example of dynamic programming used in a similarity degree calculation performed by the example selecting unit;

FIG. 20 is a table showing an example of an example database;

FIG. 31 is a table showing an example of an example database;

FIG. 42 is a table showing an example of an example database;

DESCRIPTION OF THE PREFERRED EMBODIMENT(S)

Figure 1:
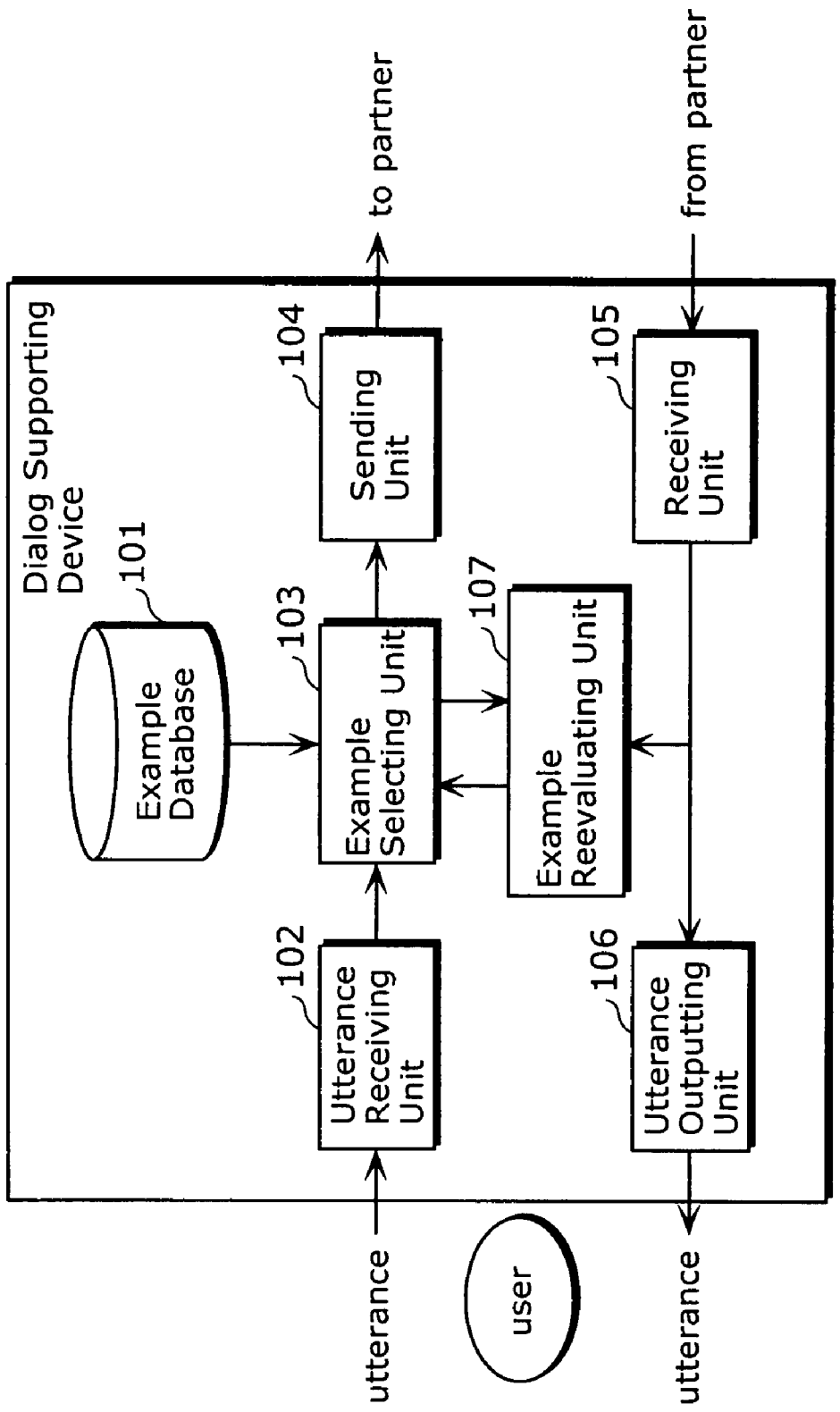
FIG. 1 is a block diagram showing a structure of a dialog supporting device according to an embodiment of the present invention.

In order to achieve the above object, a dialog supporting device according to the present embodiments of the present invention supports dialog and includes: an example database operable to hold first examples and second examples which are used in the dialog, the first examples are associated with respective second examples; an utterance receiving unit operable to receive an utterance of a user; an example selecting unit operable to (i) extract candidates for the first example by searching the example database based on the utterance received by the utterance receiving unit, (ii) select one first example from the extracted candidates, and (iii) obtain a second example associated with the selected first example; a sending unit operable to send the second example obtained by the example selecting unit, to a dialog supporting device of a dialog partner of the user; a receiving unit operable to receive a second example from the dialog supporting device of the dialog partner; an utterance outputting unit operable to output the second example received by the receiving unit; and an example reevaluating unit operable to reevaluate the candidates extracted by the example selecting unit, based on the second example received by the receiving unit.

Thus, in view of the above problems, the dialog supporting device according to the present invention can support dialog to be speedily completed on the whole, by reducing the number of operations for generating one utterance regardless of a partner's interrupting utterances.

Here, it is preferable that the example database is further operable to hold the first examples and the second examples in association with evaluation tags, respectively, the example selecting unit is operable to obtain the second example in addition to an evaluation tag associated with the second example, and the example reevaluation unit is operable to reevaluate the candidates based on the evaluation tag added to the second example received by the receiving unit.

Further, the evaluation tag may be at least one of: an amount tag regarding information of which the user provides the dialog partner; and a condition tag indicating conditions of information which the user requests the dialog partner, and the example reevaluating unit is operable to reevaluate the candidates based on (i) a condition tag which is the evaluation tag added to the second example and (ii) respective amount tags which are evaluation tags associated with the respective candidates. Thereby, it is possible to easily perform reevaluation of candidates for the first example.

Still further, the example reevaluating unit may be operable to reevaluate the candidates, when the receiving unit receives the second example from the dialog supporting device of the dialog partner before the example selecting unit selects one first example from the candidates.

Still further, the example reevaluating unit may be operable to reevaluate the candidates and guide the user to select one first example from the candidates, when the receiving unit receives the second example from the dialog supporting device of the dialog partner before the example selecting unit selects one first example from the candidates.

Still further, the dialog supporting device may further include a candidate notifying unit operable to notify the user of the candidates extracted by the example selecting unit; and a selection instruction receiving unit operable to receive an instruction from the user to select one first example from the candidates, wherein the example selecting unit is operable to select one first example based on the instruction received by the selection instruction receiving unit.

Here, the candidate notifying unit may be operable to sort the candidates based on a result of the reevaluation of the example reevaluating unit, and to notify the user of the sorted candidates. Thereby, the user can easily search the example candidates for a desired example without giving a further utterance.

Still further, the dialog supporting device may further include a topic change detecting unit operable to detect a change in topics in the dialog, based on the second example received by the receiving unit, wherein the example reevaluating unit is operable not to reevaluate the candidates when the receiving unit receives the second example from the dialog supporting device of the dialog partner and the topic change detecting unit detects the change before the example selecting unit selects one first example from the candidates. Thereby, it is possible to guide the user not to search for a desired example from examples which do not include the desired example due to a change of a topic, thereby preventing an increase of an amount of operations performed by the dialog supporting device.

Here, the example reevaluating unit may be operable not to reevaluate the candidates but to guide the user to make a further utterance when the receiving unit receives the second example from the dialog supporting device of the dialog partner and the topic change detecting unit detects the change before the example selecting unit selects one first example from the candidates. Thereby, the user can choose to ignore example candidates which are currently displayed but to input a new utterance from the beginning, which makes it possible to reduce an amount of operations performed by the dialog supporting device to generate one utterance of the user.

Still further, the utterance receiving unit may be operable to receive the utterance (i) via continuous utterance recognition processing using a language model derived from the first example held in the example database, or (ii) via a keyboard under the limitation that only words included in the first examples held in the example database can be inputted.

Moreover, a dialog supporting system according to the present embodiments of the present invention supports dialog using a first dialog supporting device and a second dialog supporting device that are connected via a server. The first dialog supporting device includes: an utterance receiving unit operable to receive an utterance of a user; a receiving unit operable to receive a second example from the server; an utterance outputting unit operable to output the second example received by the receiving unit; and a sending unit operable to send the utterance received by the utterance receiving unit, to the server. The server includes: an example database operable to hold first examples and second examples which are used in the dialog, the first examples are associated with respective second examples; an example selecting unit operable to (i) extract candidates for a first example by searching the example database based on the utterance from the first dialog supporting device, (ii) select one first example from the extracted candidates, and (iii) obtain a second example associated with the selected first example; an example reevaluating unit operable to reevaluate the candidates extracted by the example selecting unit, based on a second example associated with the utterance sent from the second dialog supporting device; and a sending unit operable to send (i) the second example obtained by the example selecting unit and (ii) a result of the reevaluating of the example reevaluating unit, to the first dialog supporting device. The second dialog supporting device includes: an utterance receiving unit operable to receive an utterance of a user; a receiving unit operable to receive a second example from the server; an utterance outputting unit operable to output the second example received by the receiving unit; and a sending unit operable to send the utterance received by the utterance receiving unit, to the server.

Note that, the present invention can be realized not only as the above-described dialog supporting device, but also as: a dialog supporting method having processing performed by the units in the dialog supporting device; a computer program product which, when loaded into a computer, allows the computer to execute the processing; and the like. Furthermore, it is obvious that the program product can be distributed via a recording medium such as a CD-ROM or a transmitting medium such as the Internet.

The following describes preferred embodiments according to the present invention with reference to the drawings.

FIG. 1 is a block diagram showing a structure of a dialog supporting device according to one embodiment of the present invention.

The dialog supporting device is a device which supports dialog between people. As shown in FIG. 1, the dialog supporting device has an example database 101, an utterance receiving unit 102, an example selecting unit 103, a sending unit 104, a receiving unit 105, an utterance outputting unit 106, and an example reevaluating unit 107.

Here, the utterance receiving unit 102 corresponds to an utterance receiving unit; the example selecting unit 103 corresponds to an example selecting unit including a candidate notifying unit and a selection instruction receiving unit; the receiving unit 105 corresponds to a receiving unit; the sending unit 104 corresponds to a sending unit; the utterance outputting unit 106 corresponds to an utterance outputting unit; and the example reevaluating unit 107 corresponds to the example reevaluating unit, respectively, in the claims appended in the specification.

The example database 101 holds examples of sentences used in dialog. The utterance receiving unit 102 receives an utterance of the user and converts the utterance into utterance information. The example selecting unit 103 extracts example candidates from the example database 101 based on the utterance information, selects a desired example from the extracted example candidates, and then provides a translation of the selected example to the sending unit 104. To a dialog supporting device of the partner user, the sending unit 104 sends the translated example provided from the example selecting unit 103. The receiving unit 105 receives the translated example sent from the partner's dialog supporting device. The utterance outputting unit 106 outputs the received example for the partner user. Based on the example received by the receiving unit 105, the example reevaluating unit 107 reevaluates the example candidates held in the example selecting unit 103.

Note that a block diagram of FIG. 1 shows a basic structure of a dialog supporting device of the present invention. Each dialog participant uses a single dialog supporting device. A sending unit 104 and a receiving unit 105 of a dialog supporting device of a user are connected to a receiving unit 105 and a sending unit 104 of another dialog supporting device of a user's dialog partner, respectively, so that the user and the partner realize dialog in different languages using these dialog supporting devices. The dialog supporting devices may be connected with each other directly, or may be connected via a server indirectly.

Next, the above-explained structure of the dialog supporting device which supports dialog in different languages is described in more detail.

Figure 2A:
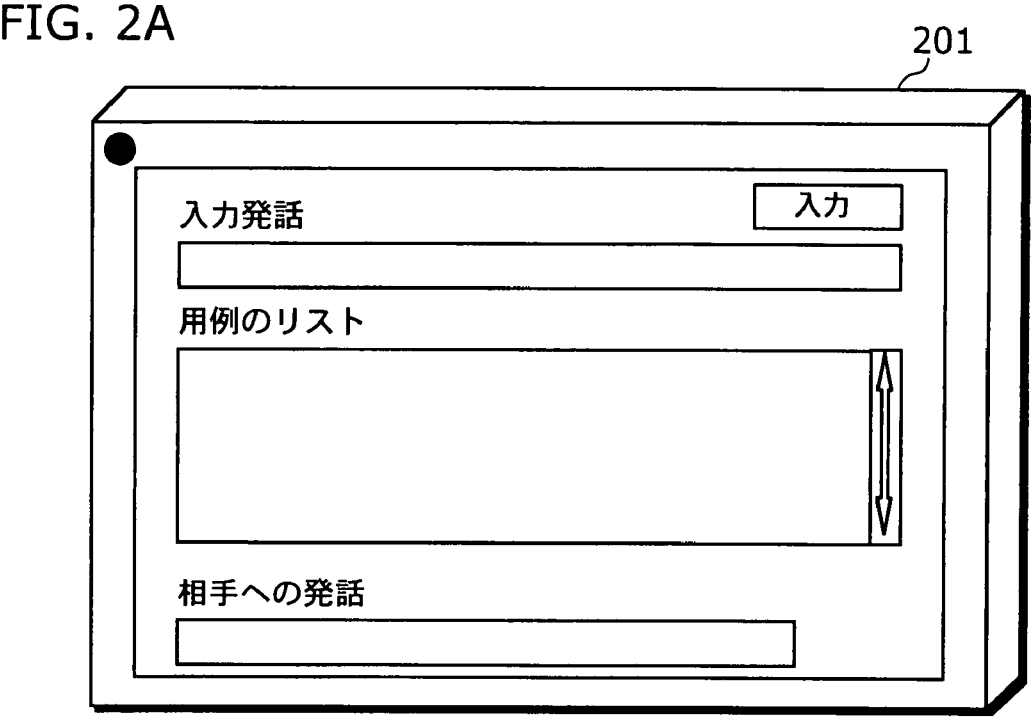
FIGS. 2A and 2B are diagrams showing display examples of the respective dialog supporting devices according to the present invention.
Figure 2B:
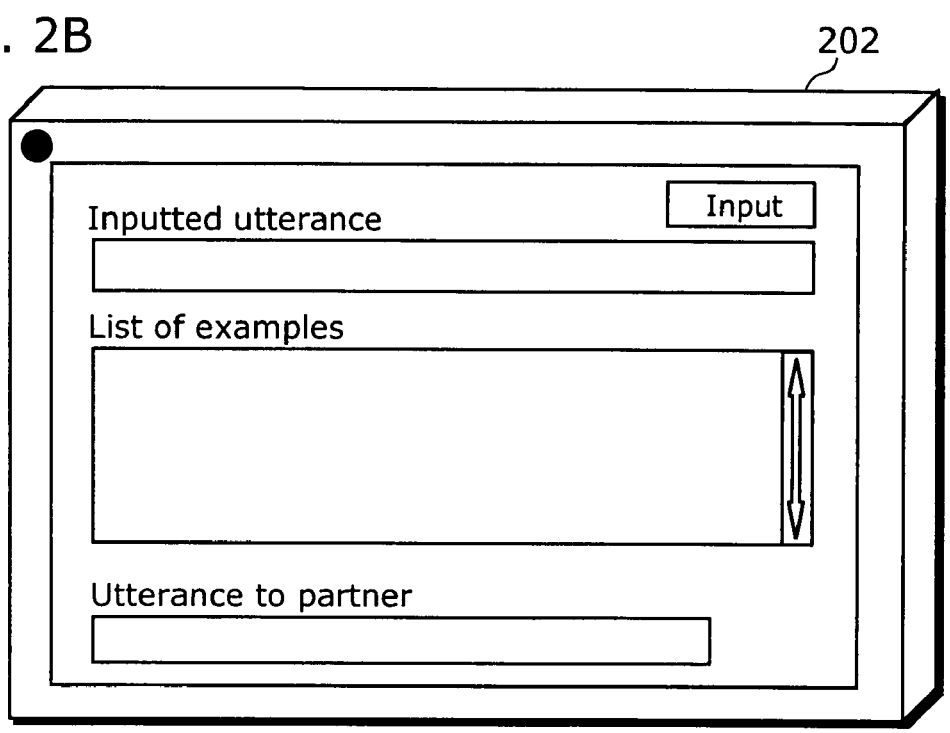

FIGS. 2A and 2B are diagrams showing display examples of the respective dialog supporting devices. It is assumed that a user 1 who speaks Japanese uses a dialog supporting device 201 shown in FIG. 2A, and that a user 2 who speaks English uses a dialog supporting device 202 shown in FIG. 2B.

FIG. 3 is a table showing an example of examples held in the example database 101 in the dialog supporting device 201. Language 1 corresponding to the first examples is a native language of the user, while language 2 corresponding to the second examples is a native language of the dialog partner. For instance, when the example selecting unit 103 selects an utterance No. 2, then a translated example associated with the selected utterance, which is an example "Good morning" in language 2, is outputted together with an evaluation tag. In the dialog supporting device 202, an example database 101 has an opposite structure where language 1 is English and language 2 is Japanese. The evaluation tag is predetermined for each example.

There are two types of evaluation tags: amount tags and condition tags. The amount tags are assigned to examples which provide the partner with information, based on an amount of the provided information. Here, for instance, an amount of information provided from example No. 5 is three pieces of "電車", "バス", and "地下鉄", so that an amount tag "v:3" is assigned as an evaluation tag to the example No. 5. In this case, "v:" represents that a type of the evaluation tag is an amount tag, and "3" represents that a value of the amount is three.

On the other hand, the condition tags are assigned to examples which provide limitation on the information received from the partner. Here, for instance, an example No. 12 in the example database 101 expresses that a smaller amount of information is desirable to be received from the partner, so that a condition tag "f:x<=y" is assigned as an evaluation tag to the example No. 12. In this case, "f:" represents that a type of the evaluation tag is a condition tag, and "x<=y" represents a conditional equation which is used to determine an order of sorting examples candidates. Note that no evaluation tag is assigned to examples, such as example 1, which are not related to information exchange with the partner.

The utterance receiving unit 102 receives a user's utterance as character data, using continuous utterance recognition processing or a keyboard, and then provides the character data as utterance information to a next stage. Here, the utterance information is a character string corresponding to the user's utterance. When the utterance receiving unit 102 converts a user's utterance using the continuous utterance recognition processing, accuracy of the utterance recognition is able to be increased by deriving language models from the examples held in the example database 101. On the other hand, when the utterance receiving unit 102 receives a user's utterance inputted by the keyboard, the characters are able to be efficiently inputted, by limiting input-able words to the words included in the examples in language 1 held in the example database 101.

Figure 4:
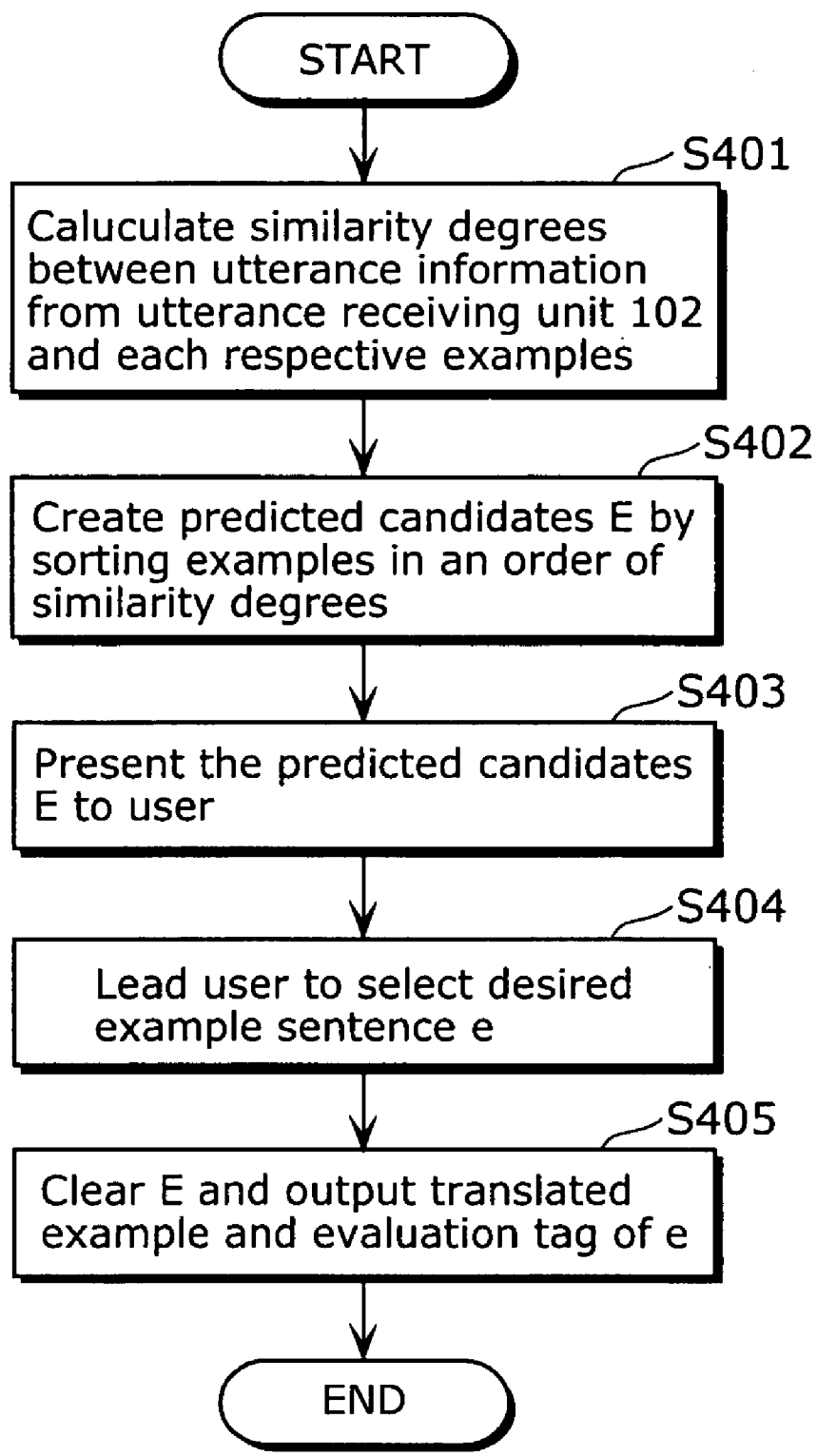
FIG. 4 is a flowchart showing processing performed by an example selecting unit.

FIG. 4 is a flowchart showing processing performed by the example selecting unit 103. According to the flowchart of FIG. 4, the example selecting unit 103 selects an example which is the most similar to the utterance information, and then outputs a translated example of the selected example, together with an evaluation tag.

Firstly, the example selecting unit 103 calculates respective degrees of similarity (hereinafter, referred to as "similarity degrees") between (i) the utterance information and (ii) all of the examples in language 1 in the example database 101 (Step S401). Here, the example selecting unit 103 calculates, as such a similarity degree, a distance between the utterance information and each of the examples, using dynamic programming as shown in FIG. 5, for instance. In the dynamic programming of FIG. 5, a constitutional unit in a sentence is a character, a word, or a letter representing pronunciation, or a combination of them. For instance, in the case where the constitutional unit is a word (a=1), a similarity degree between a sentence 1={電車か, バスで} and a sentence 2={電車か, バスで, 行けます} is calculated as a[2][3]=1. In this calculation, the more the sentence 1 is similar to the sentence 2, the smaller the value becomes.

Next, the example selecting unit 103 creates example candidates E by listing examples according to priorities of the similarity degrees (Step S402). Then, the example selecting unit 103 presents the example candidates E to the user (Step S403). Next, the example selecting unit 103 selects a desired example e which is indicated by the user (Step S404). Then, the example selecting unit 103 provides the sending unit 104 with a translated example and an evaluation tag of the selected example e, by referring to the example database 101 (Step S405). Here, the example selecting unit 103 holds the example candidates E until the desired example e is selected by the user, and after the desired example e is selected, sets the example candidates E to be empty.

The sending unit 104 sends, to the partner's dialog supporting device, such translated examples and evaluation tags which are sequentially provided from the example selecting unit 103 by repeating the above processing. The sent information is received by the receiving unit 105 of the partner's dialog supporting device, and outputted to the partner via the utterance outputting unit 106. The utterance outputting unit 106 is a display device such as a liquid crystal display (LCD), audio synthesis processing, or combination of them.

At step S403, where the example selecting unit 103 holds the example candidates E and the user has not yet selected the desired example e, if the partner's device sends a translated example and an evaluation tag, the example reevaluating unit 107 of the user's device re-evaluates the example candidates E. Then, the example reevaluating unit 107 sorts the example candidates E to be presented to the user.

The following describes processing performed by the above-structured dialog supporting devices in order to support dialog in different languages.

Figure 6:
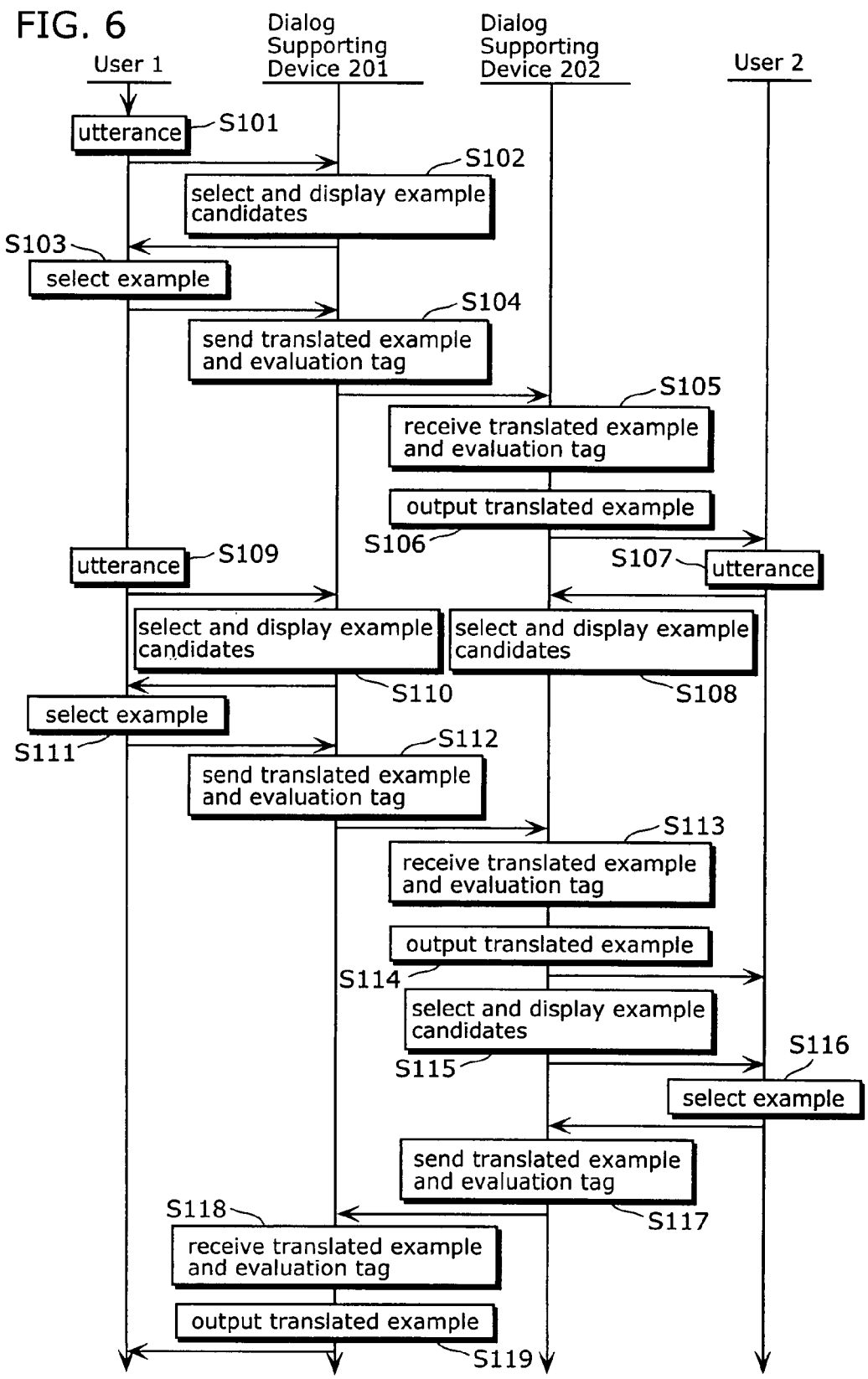
FIG. 6 is a flowchart showing overall processing of supporting dialog.
Figure 7:
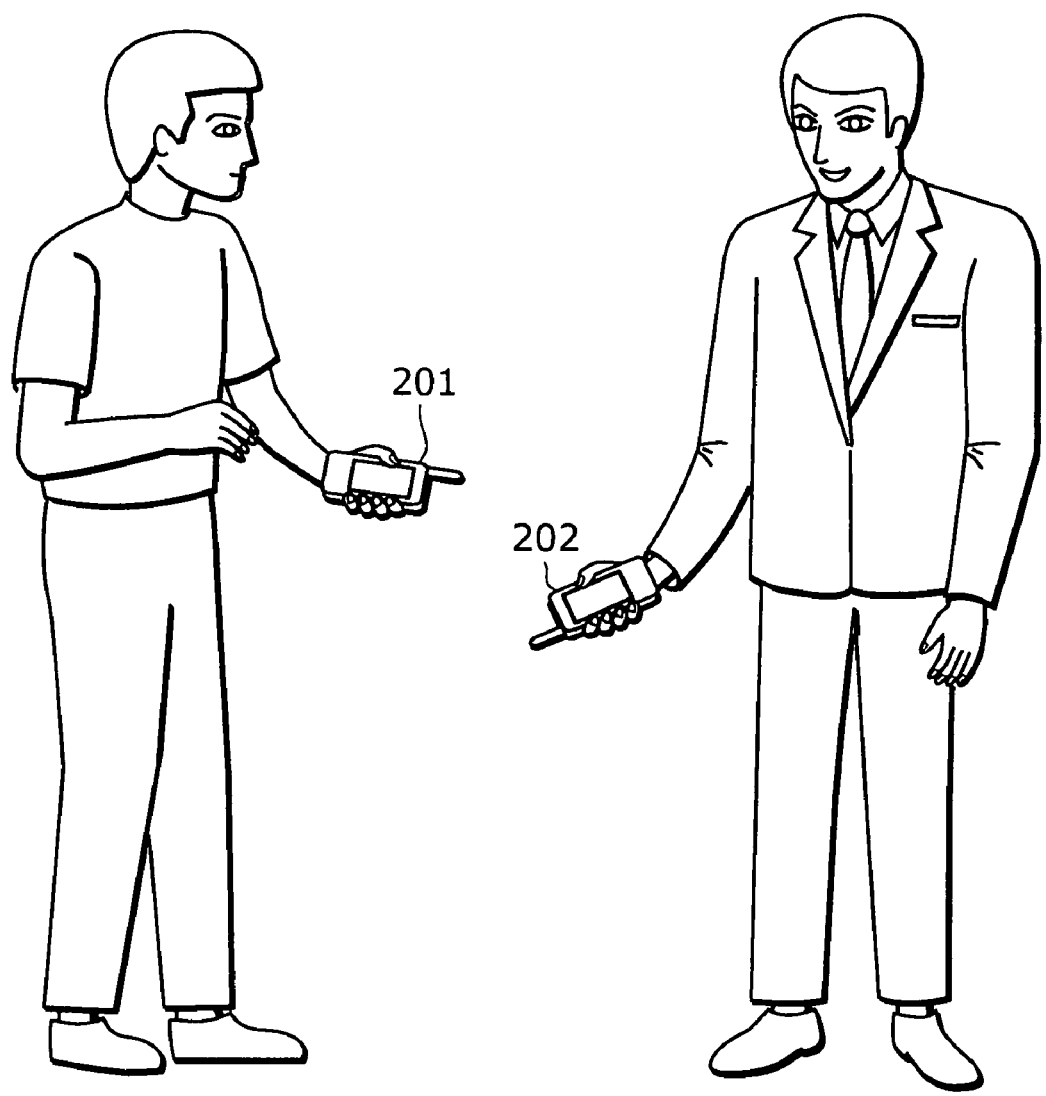
FIG. 7 is a diagram showing an example showing a situation where dialog supporting devices according to the present invention are used.

FIG. 6 is a flowchart showing overall processing in the above case. Here, it is assumed that, as shown in FIG. 7, a user 1, who is a tourist and wishes to know how to get to an airport by a cheap way, have dialog with a user 2, who is a passerby and familiar with local transportations. It is also assumed that train, bus, and subway are the possible transportations to the airport, and that the subway is the cheapest way.

Figure 8A:
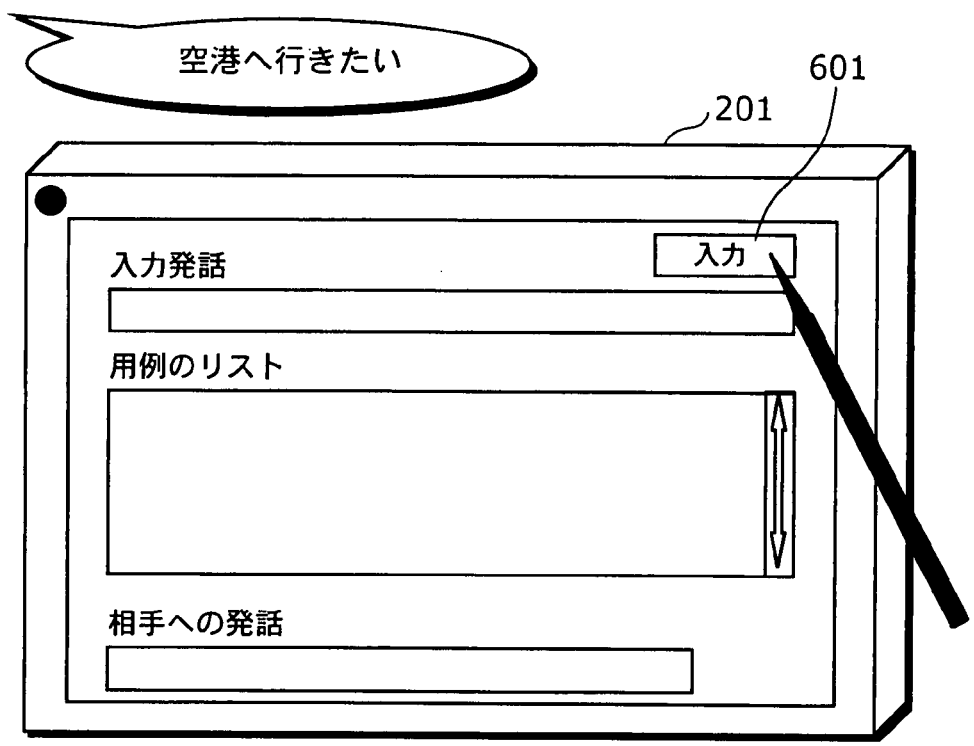
FIGS. 8A and 8B are diagrams showing display examples of the respective dialog supporting devices according to the present invention.
Figure 8B:
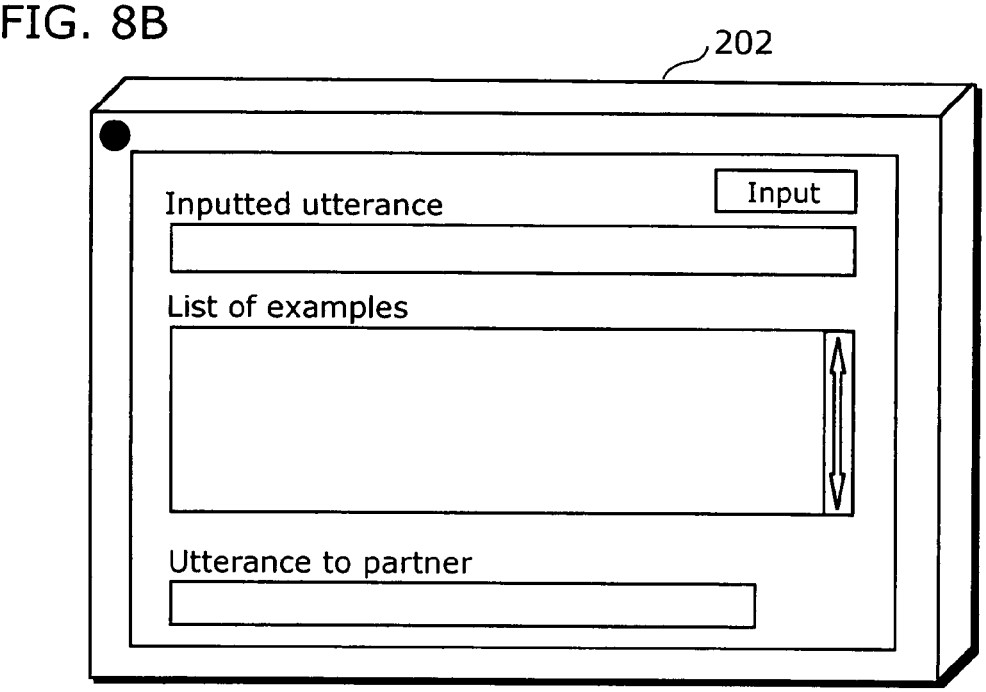
Figure 9A:
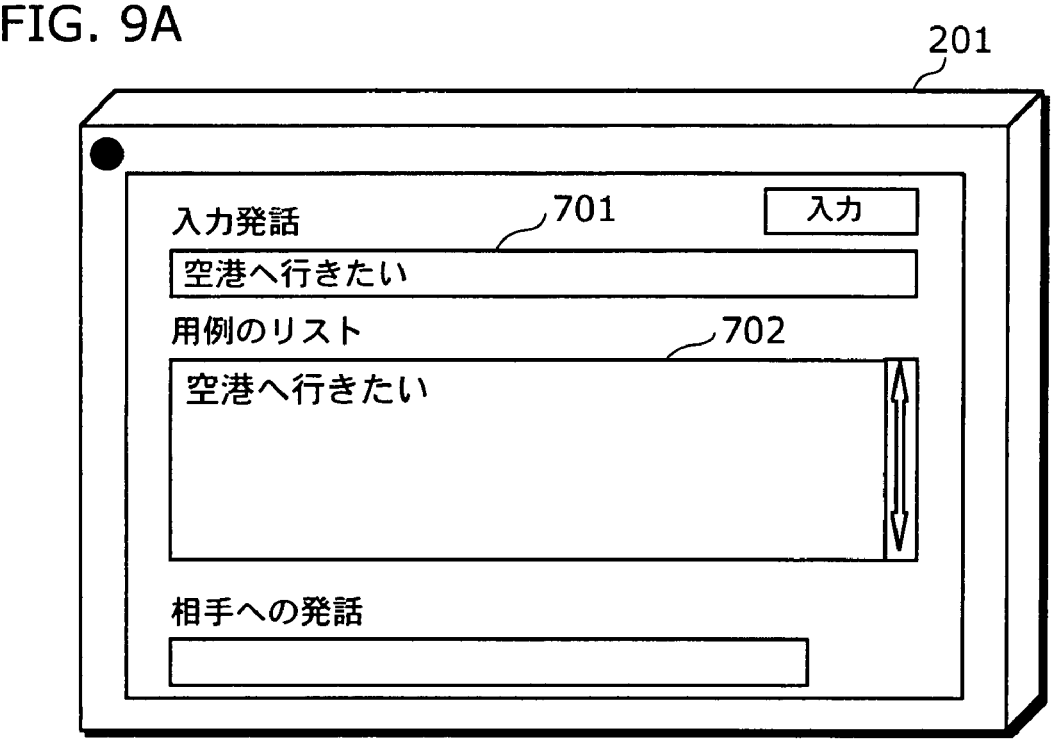
FIGS. 9A and 9B are diagrams showing display examples of the respective dialog supporting devices according to the present invention.
Figure 9B:
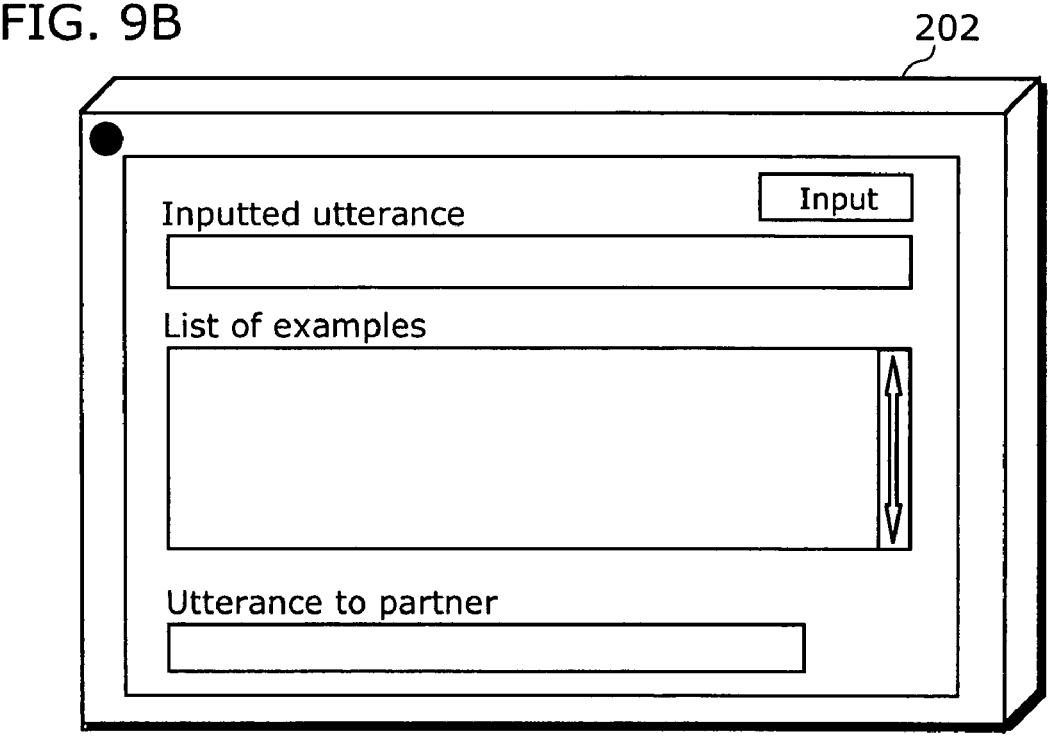

As shown in FIG. 8A, the user 1 is assumed to press an utterance input button 601 and say "空港へ行きたい" (Step S101). The utterance receiving unit 102 converts the utterance using the utterance recognition processing into character information, and provides "空港へ行きたい" as utterance information. As shown in FIG. 9A, the utterance information is displayed on a display area 701. The example selecting unit 103 calculates respective similarity degrees between the utterance information and respective examples in language 1 in the example database 101, so that an example candidate E={空港へ行きたい'} is obtained at Step S402. At Step S403, examples included in example candidates E are sequentially displayed on a display area 702 (Step S102).

Figure 10A:
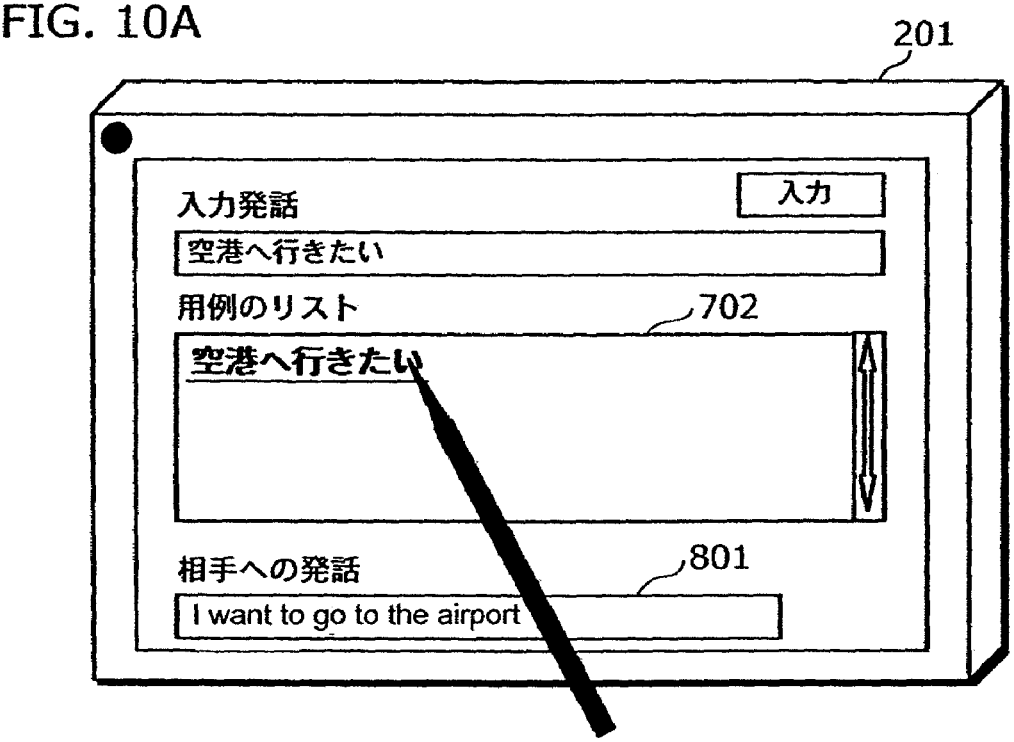
FIGS. 10A and 10B are diagrams showing display examples of the respective dialog supporting devices according to the present invention.
Figure 10B:
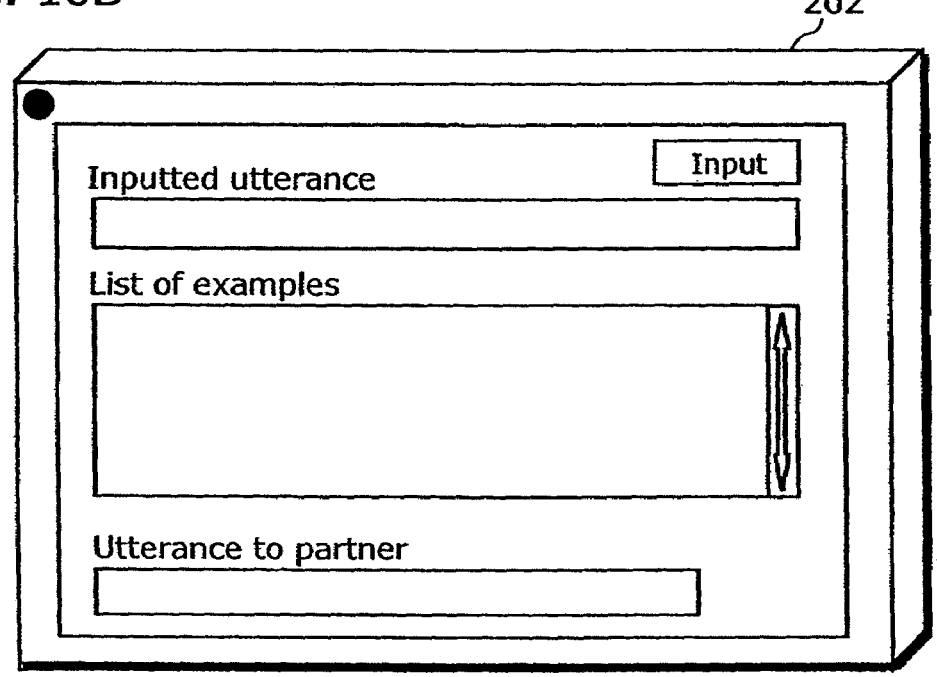

As shown in FIG. 10A, if the user 1 selects "空港へ行きたい" as a desired example e from the display area 702 (Step S103), then a translated example "I want to go to the airport" is displayed on a display area 801. Further, the translated example and its evaluation tag are sent by the sending unit 104 to the dialog supporting device 202 of the user 2 (Step S104). The dialog supporting device 202 of the user 2 receives the translated example and its evaluation tag by the receiving unit 105 (Step S105), and as shown in FIG. 10B, presents the user 2 with the "I want to go to the airport" as an utterance (Step S106).

Figure 11A:
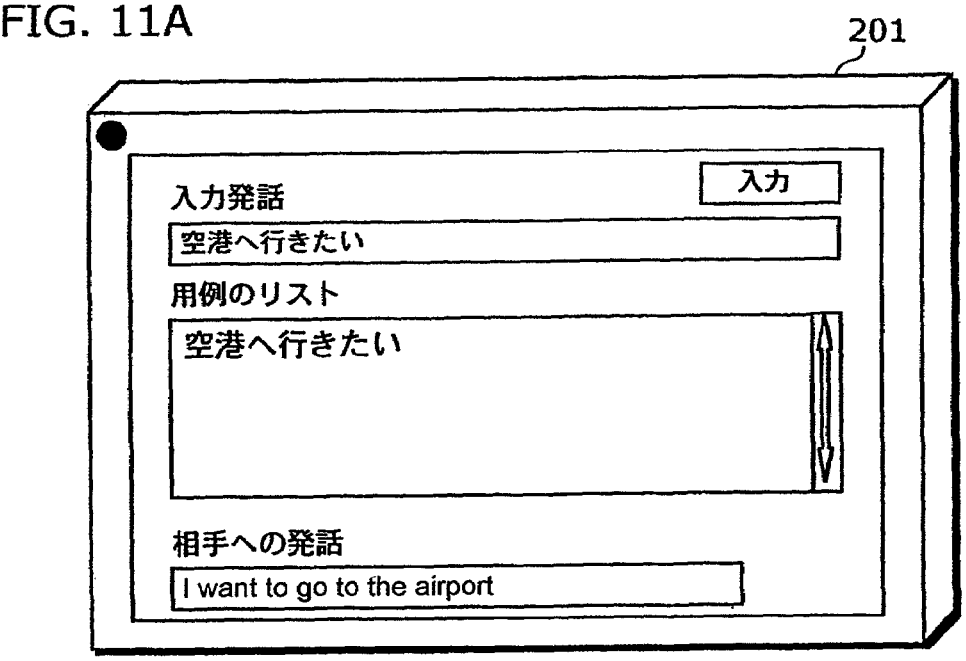
FIGS. 11A and 11B are diagrams showing display examples of the respective dialog supporting devices according to the present invention.
Figure 11B:
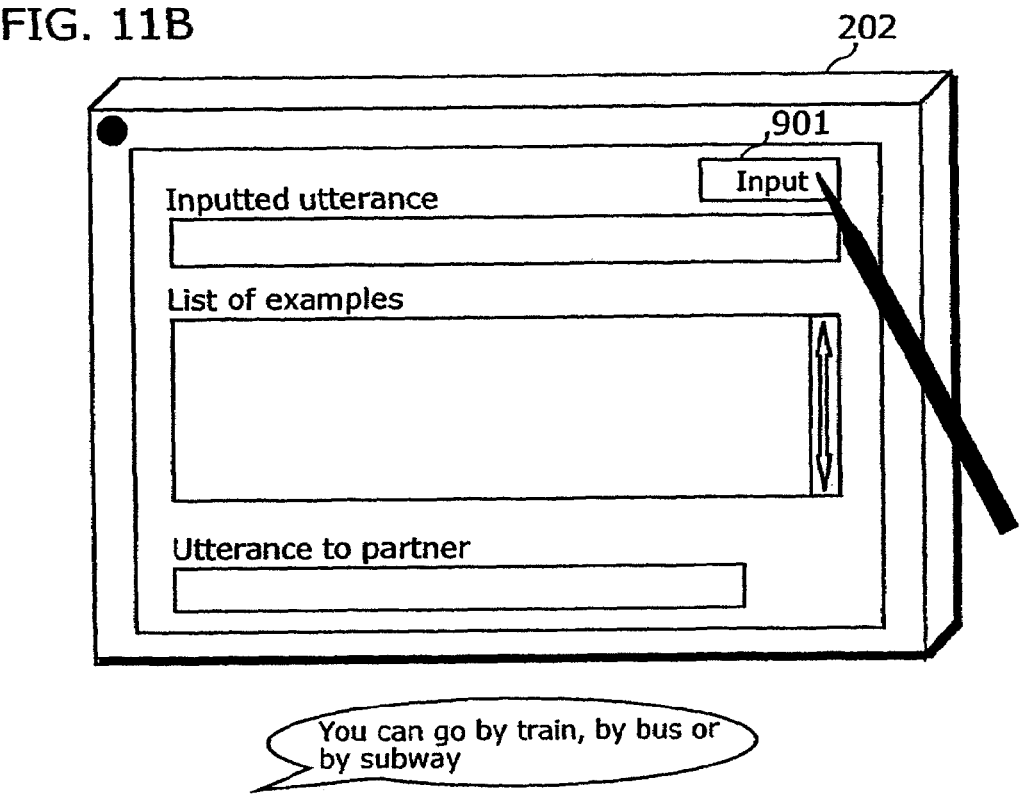
Figure 12A:
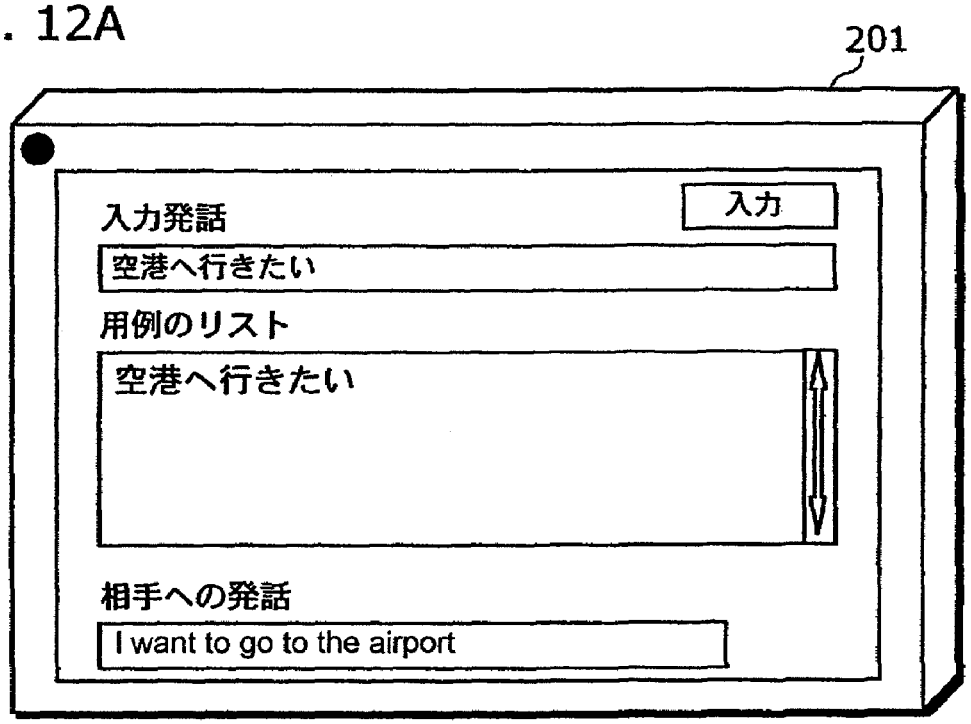
FIGS. 12A and 12B are diagrams showing display examples of the respective dialog supporting devices according to the present invention.
Figure 12B:
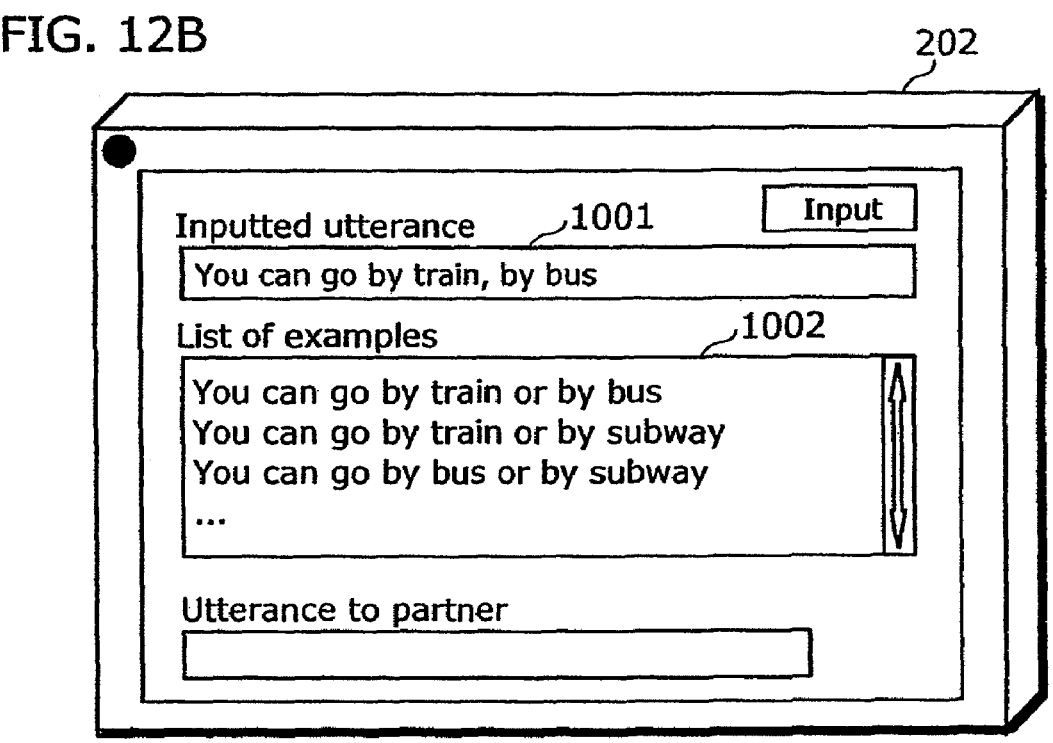

Likewise, as shown in FIG. 11B, the user 2 presses an utterance input button 901 and says "You can go by train, by bus or by subway" (Step S107). As shown in FIG. 12B, the utterance is converted by the utterance receiving unit 102 into character information to be displayed on a display area 1001. In the case where the utterance receiving unit 102 has utterance recognition processing, there is a high possibility of utterance recognition errors for long utterances. Here, it is assumed that some words are missed by error, and eventually character information "You can go by train, by bus" is obtained. The example selecting unit 103 calculates respective similarity degrees between this utterance information and respective examples included in the example database 101, and generates the following example candidates E (Step S108).

---

Examples E = {
You can go by train or by bus (1),
You can go by train or by subway (2),
You can go by bus or by subway (2),
You can go by train (2),
You can go by bus (2),
You can go by train, by bus or by subway (3),
You can go by subway (3)}

---

Note that, in the above examples, the numerals in parenthesis represent the similarity degrees calculated by dynamic programming shown in FIG. 5. The example candidates E created by the example selecting unit 103 are displayed on a display area 1002.

In this case, it is desirable that the user 2 can immediately select a desired example e from the example candidates, but such a selecting operation generally requires a considerable time in a small device such as a mobile terminal. For example, in the case where only three example candidates can be displayed on a screen at the same time as shown in FIG. 12B, the user has to scroll the display to check each of example candidates which have been hidden outside the screen, so that it takes a time to select a desired example candidate.

Figure 13A:
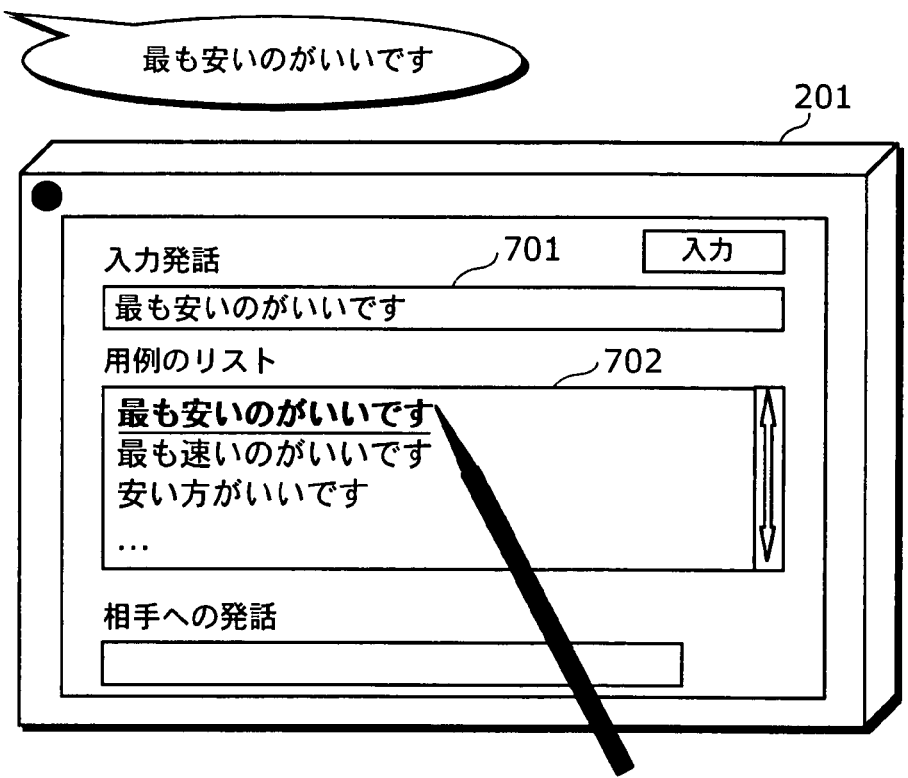
FIGS. 13A and 13B are diagrams showing display examples of the respective dialog supporting devices according to the present invention.
Figure 13B:
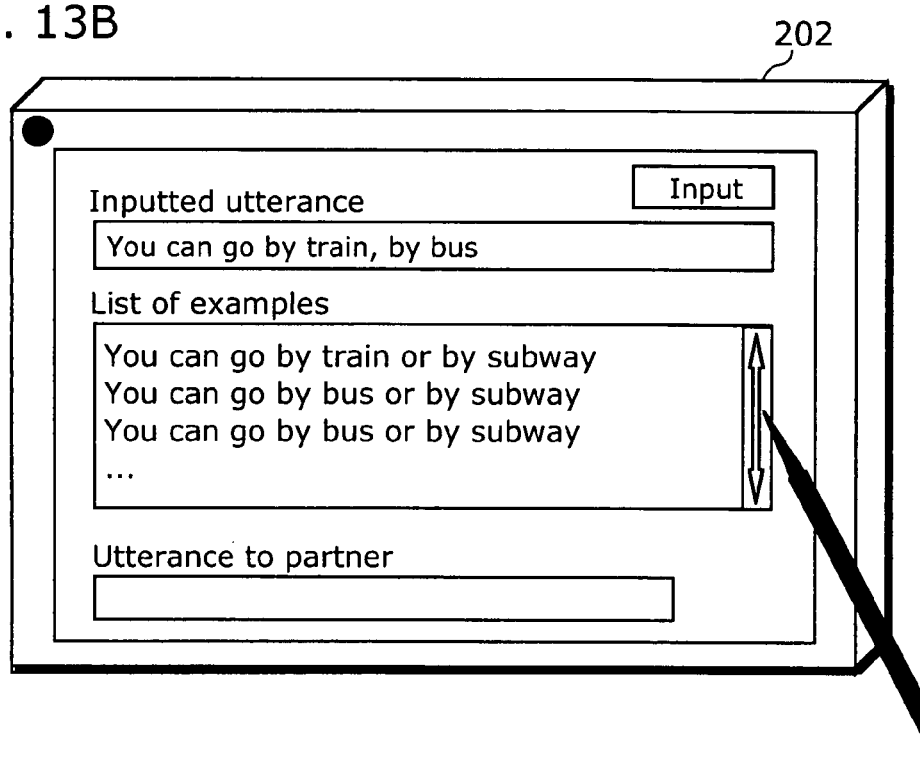
Figure 14A:
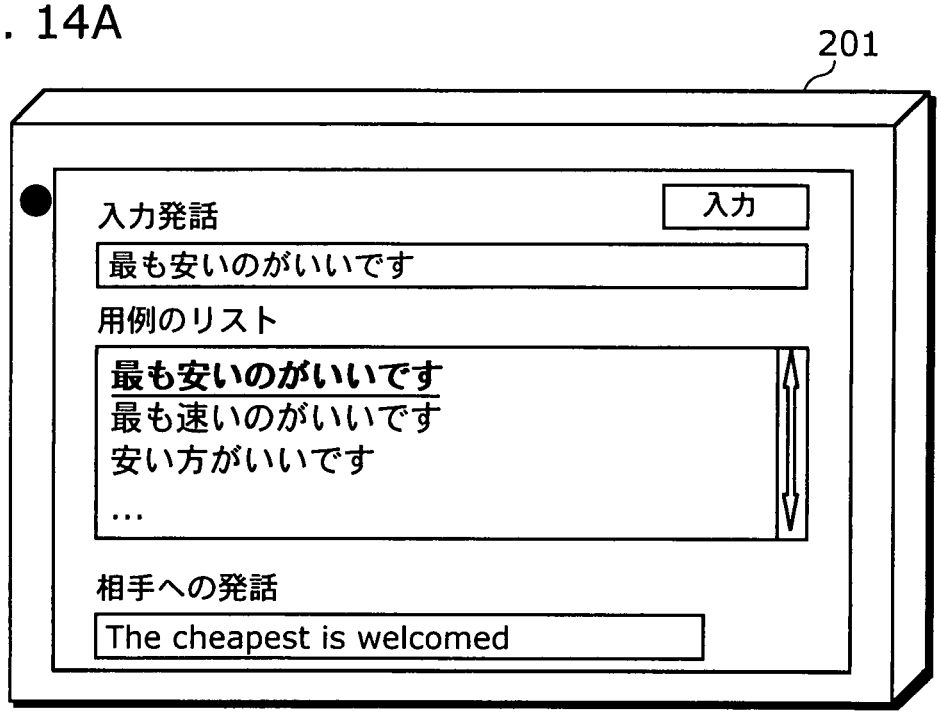
FIGS. 14A and 14B are diagrams showing display examples of the respective dialog supporting devices according to the present invention.
Figure 14B:
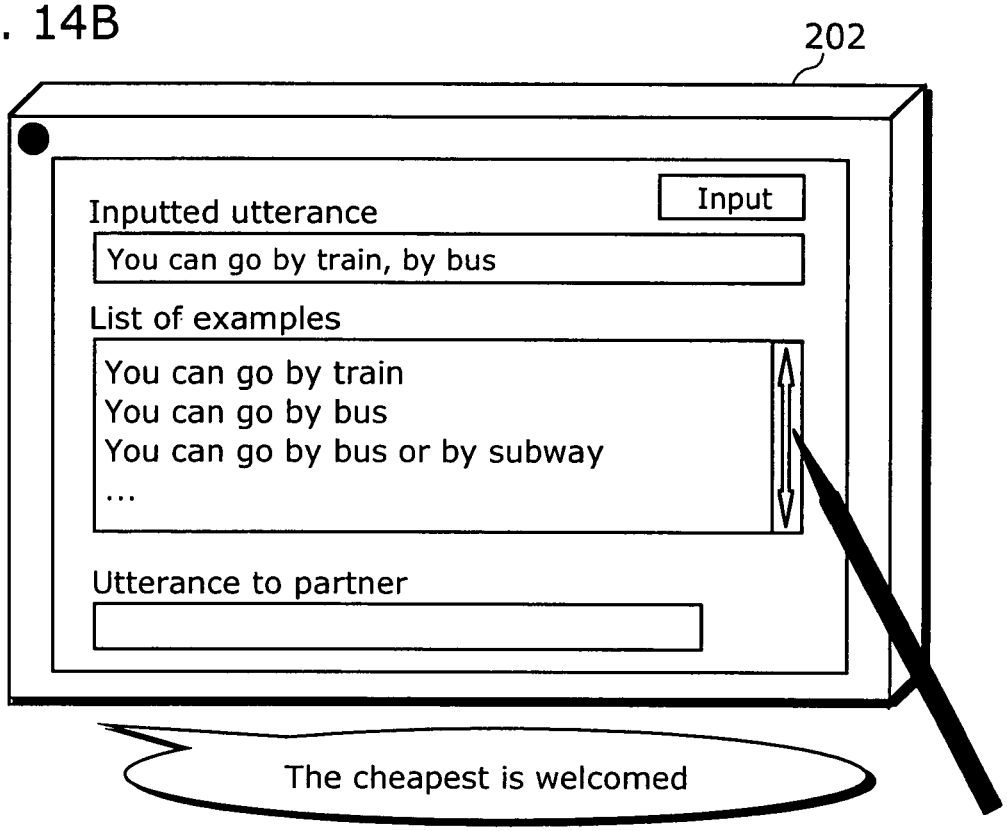

Here, it is assumed that, while the user 2 is searching for the desired example e, the user 1 inputs, as shown in FIG. 13A, a next utterance "最も安いのがいいです" into the display area 701 (Step S109). When the user 1 selects the desired example e "最も安いの がいいです" from the display area 702 in the same manner as described above (Steps S110, S111), the example e "最も安いのがい いです" and its evaluation tag "f:x<=y" are sent to the dialog supporting device 202 of the user 2 (Step S112). The dialog supporting device 202 of the user 2 outputs the received data as shown in FIG. 14B (Steps S113, S114), so that the user 2 changes targets to be searched in order to select "You can go by subway" because subway is the cheapest transportation.

Next, in the dialog supporting device 202 of the user 2, the example reevaluating unit 107 reevaluates the following example candidates E held in the example selecting unit 103, using the evaluation tag "f:x<=y" sent from the dialog supporting device 201 of the user 1 (Step S115).

```
Example candidates E = {
You can go by train or by bus (1) <v:2>,
You can go by train or by subway (2) <v:2>,
You can go by bus or by subway (2) <v:2>,
You can go by train (2) <v:1>,
You can go by bus (2) <v:1>,
You can go by train, by bus or by subway (3) <v:3>,
You can go by subway (3) <v:1>}
```

In other words, the examples included in the example candidates are sorted in an order by which amount parts satisfy a conditional equation x<=y, by referring to respective evaluation tags defined in the example database 101. As a result, by prioritizing an example whose evaluation tag has an amount tag v:n where n is smaller, the example candidates are sorted as follows.

```
E = {
You can go by train (2) <v:1>,
You can go by bus (2) <v:1>,
You can go by subway (3) <v:1>,
You can go by train or by bus (1) <v:2>,
You can go by train or by subway (2) <v:2>,
You can go by bus or by subway (2) <v:2>,
You can go by train, by bus or by subway (3) <v:3>}
```

Figure 15A:
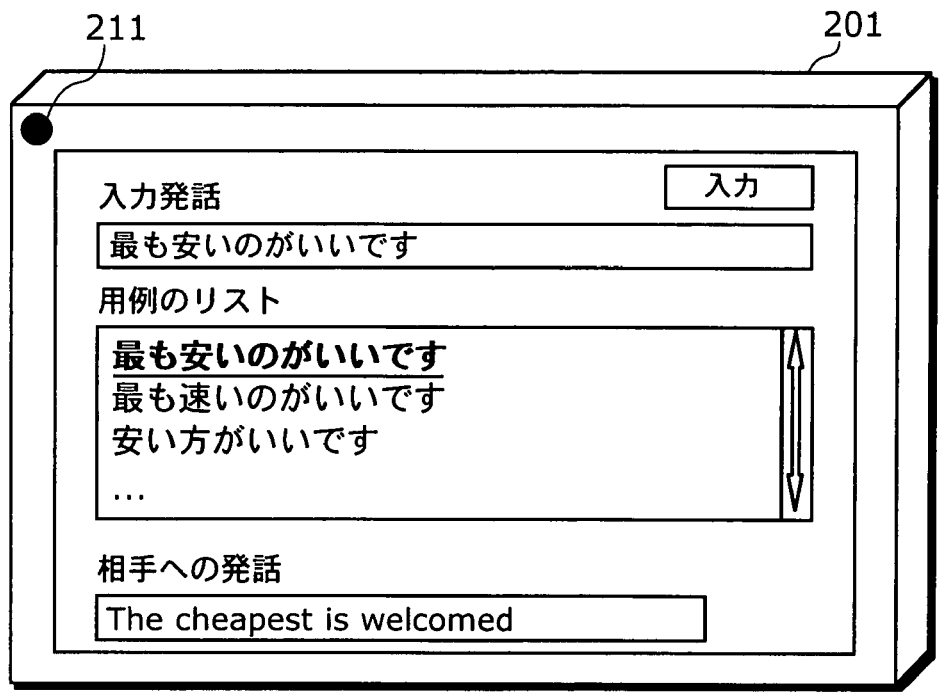
FIGS. 15A and 15B are diagrams showing display examples of the respective dialog supporting devices according to the present invention.
Figure 15B:
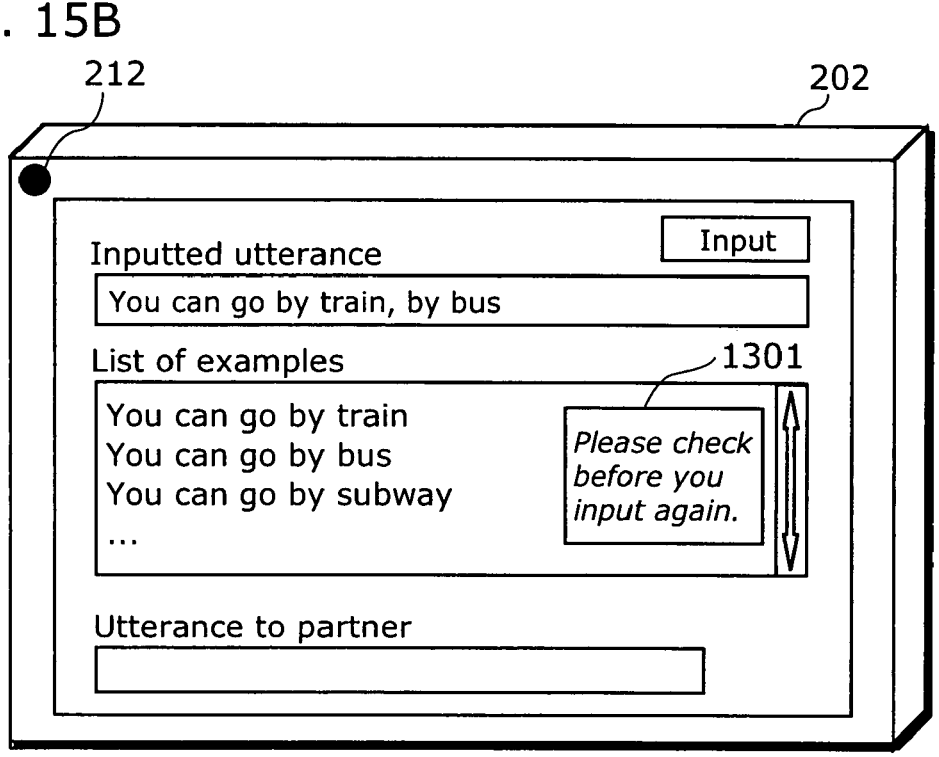

The sorted example candidates are presented to the user 2 together with a message 1301 asking the user 2 to select a desired example from the example candidates, as shown in FIG. 15B.

Figure 16A:
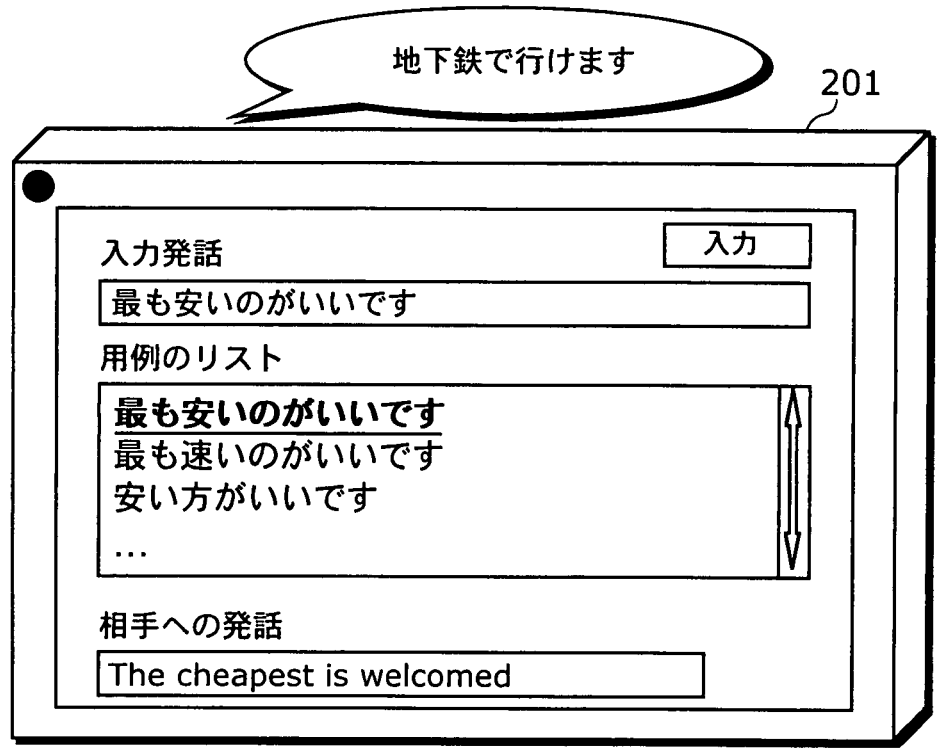
FIGS. 16A and 16B are diagrams showing display examples of the respective dialog supporting devices according to the present invention.
Figure 16B:
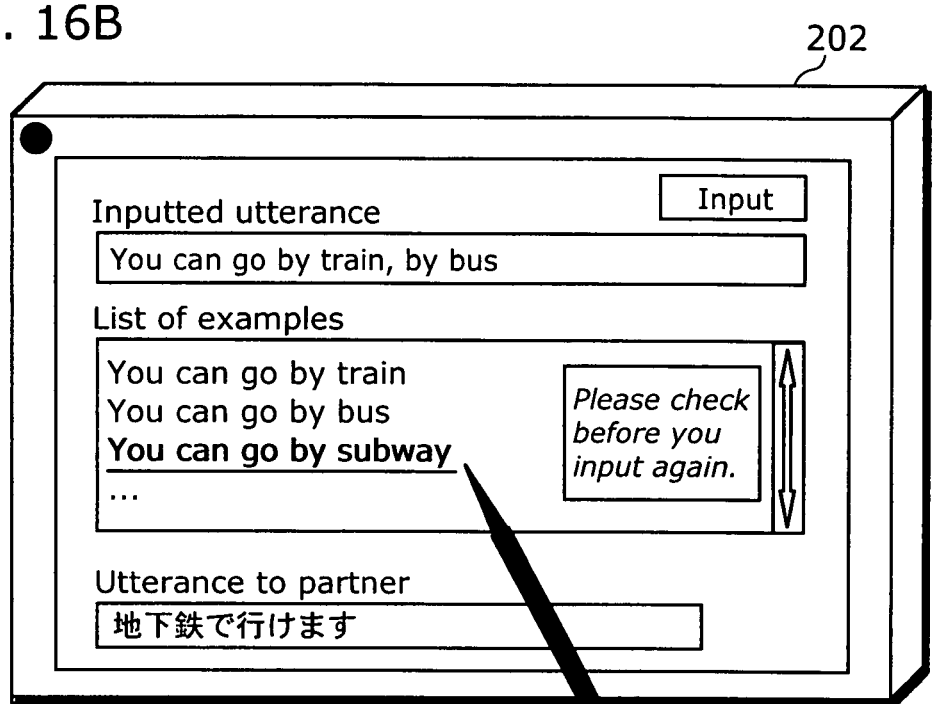

Thereby, the user 2 can immediately select an example e "You can go by subway" as the desired example as shown in FIG. 16B (Step S116), so that a translated example "地下鉄で行けます" can be immediately outputted to the user 1 as shown in FIG. 16A (Steps S117 to S119).

In a conventional method without the example reevaluating unit 107, it is common that the user 2 presses an utterance input button 901 to say "You can go by subway" and then performs a new searching operation for example candidates of this utterance. The reason is that it is not certain that a next desired example is included in the already-displayed example candidates, so that the user 2 thinks that it is quicker to start a new searching operation from the beginning. Here, advantages of the present embodiment are examined quantitatively. It is assumed that T represents an average operation amount from when the user inputs an utterance until when the user selects a desired example. In the case where the user 1 and the user 2 have dialog using the dialog supporting devices, the dialogs are as follows. Note that an utterance in parenthesis is an utterance which is not outputted from the dialog supporting device due to interruption from the partner.

User 1: "I want to go to the airport".
(User 2: "電車かバスか地下鉄で行けます")
User 1: "The cheapest is welcomed."
User 2: "'地下鉄で行けます"

Figure 17A:
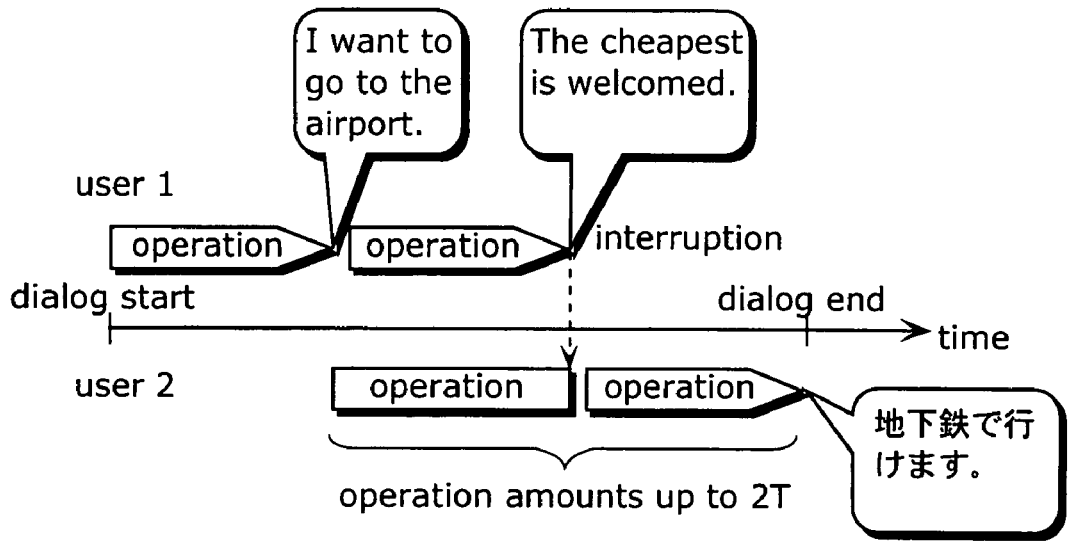
FIGS. 17A and 17B are diagrams quantitatively showing effects of the present invention.
Figure 17B:
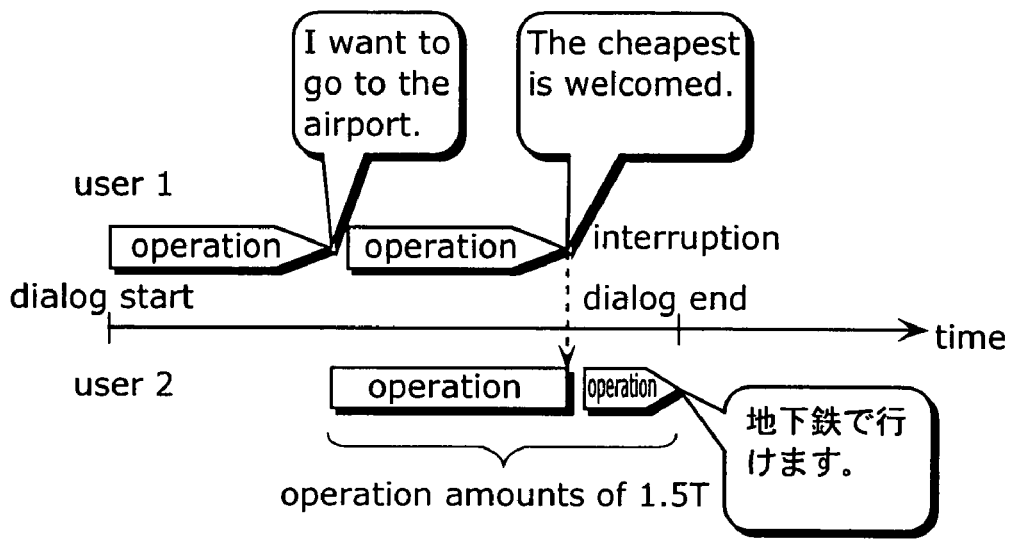

Here, the above dialog is assumed to occur at the timings shown in FIGS. 17A and 17B. In order to generate "地下鉄で行けます" in the conventional method shown in FIG. 17A, the user 2 spends an operation amount that is almost 2 T. However, in the present embodiment shown in FIG. 17B, the example candidates are reevaluated by the example reevaluating unit 107, so that the user does not need to perform further search from the beginning thereby spending an operation amount 1.5 T to generate the "地下鉄で行けます す". Therefore, it is possible to reduce, for the whole dialog, an amount of operations in the device required to generate one utterance.

Figure 18:
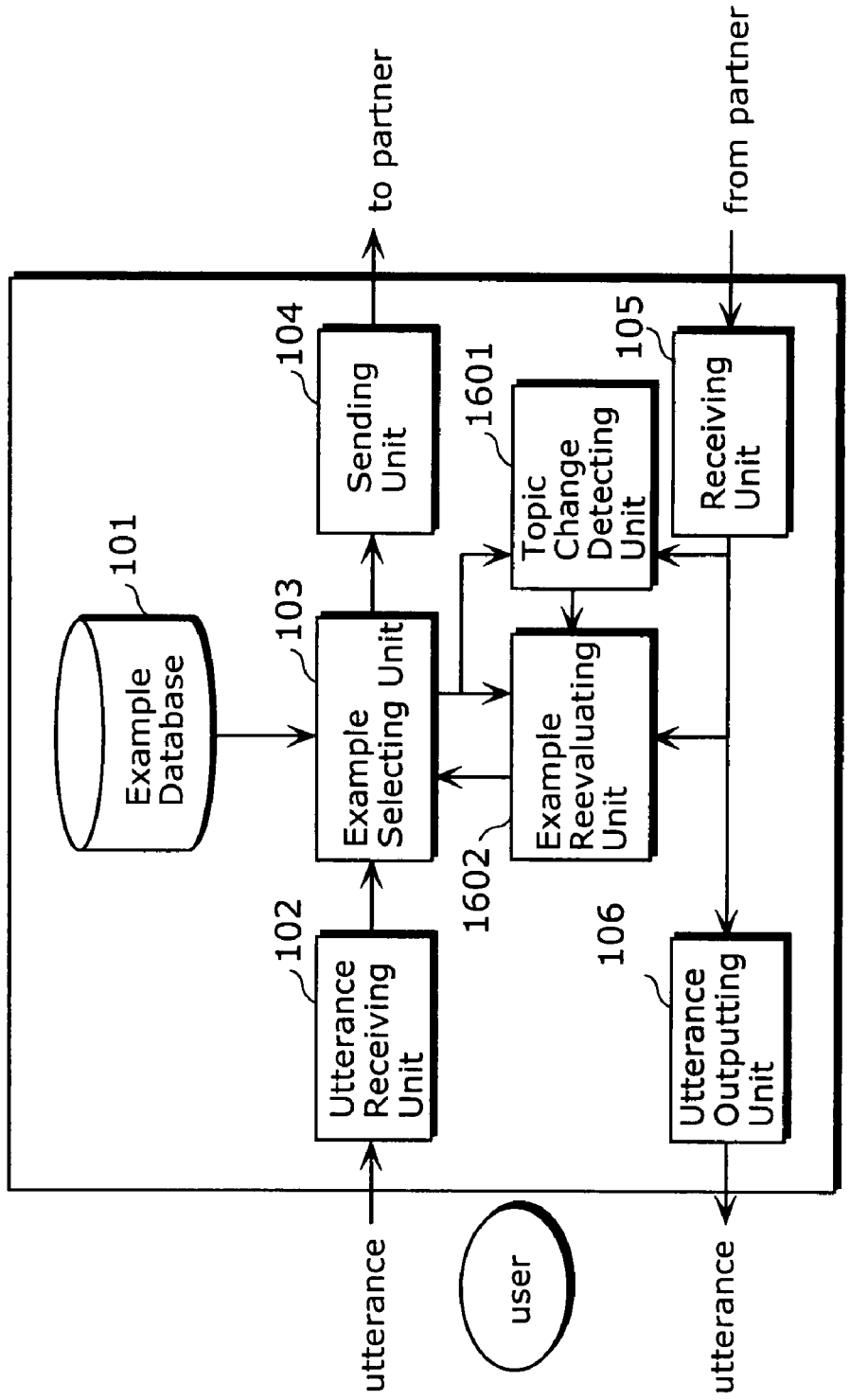
FIG. 18 is a block diagram showing a structure of a dialog supporting device according to another embodiment of the present invention.
Figure 19:
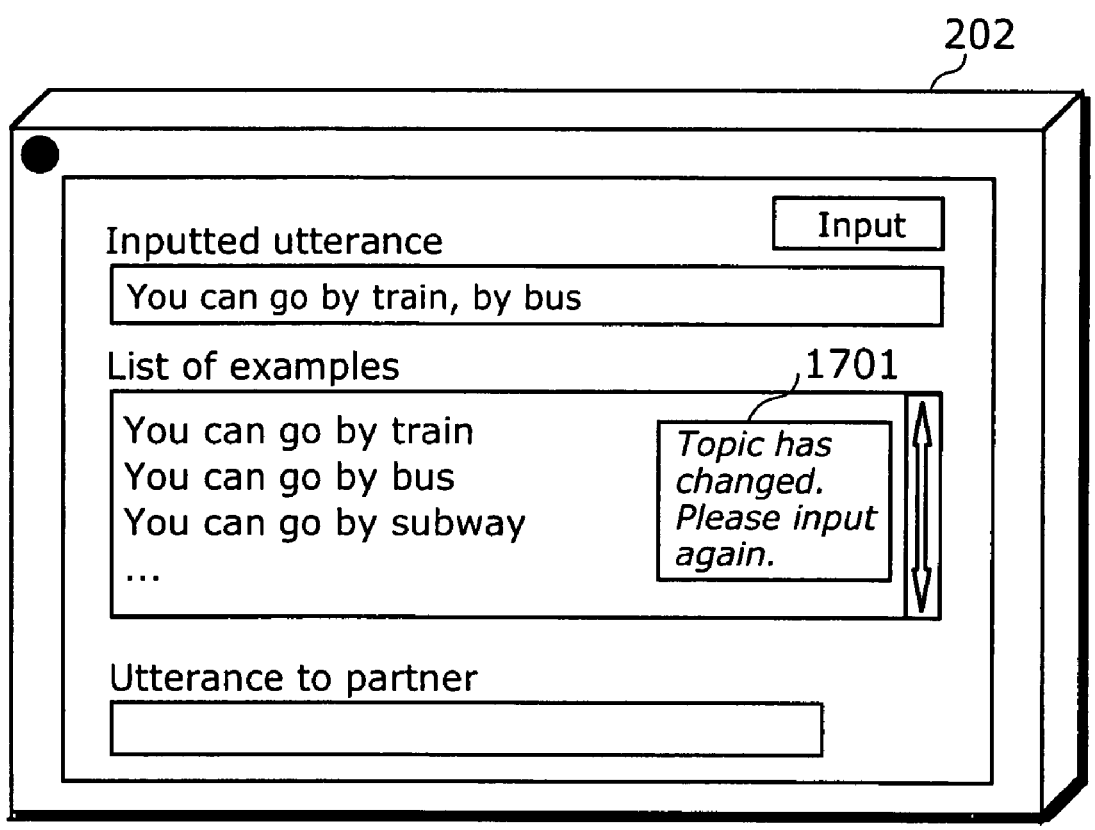
FIG. 19 is a diagram showing display an example of the dialog supporting device according to the present invention.

Note that, as shown in FIG. 18, in addition to the structure of the dialog supporting device of FIG. 1, the dialog supporting device may further include a topic change detecting unit 1601. The topic change detecting unit 1601 records examples selected by the example selecting unit 103 and examples received by the receiving unit 105 from the partner's dialog supporting device, and detects a change in topics. As a result, the example reevaluating unit 107 can perform the above reevaluation according to existence of the topic change detected by the topic change detecting unit 1601. Here, the topic change detecting unit 1601 can detect such topic changes by words such as "ところで" and "さて". More specifically, by controlling the example reevaluation unit 107 so as to not reevaluate example candidates held in the example selecting unit 103 when a topic is changed, it is possible to guide the user not to search for a desired example from the currently-displayed example candidates in which the desired example is not included any longer due to the topic change, thereby preventing an increase in the operations by the dialog supporting device. Note that, in the above case, a message 1701 asking the user to input an utterance may be displayed as shown in FIG. 19. From the message 1701, the user can determine to ignore the currently-displayed example candidates, and to input a new utterance from the beginning, which makes it possible to reduce an amount of operations performed by the dialog supporting device to generate one utterance of the user.

Note also that the amount tags and the condition tags are not necessarily the above-described quantified expression, but may be defined by: further segments according to types of information of the examples; by symbols; or by graphs. The following describes processing of supporting dialog in different languages in the present embodiment, where the example database 101 has a structure as shown in FIG. 20. Here, it is assumed that the user is a tourist and visits a certain location at the first time, and that the user 2 is a local resident. It is also assumed that the climate at the location is hot and humid.

Each evaluation tag of the examples shown in FIG. 20 is described as not a quantified expression but a logical expression using symbols. For instance, an evaluation tag "f:x=CLIM" of utterance No. 1 is a condition tag, where a conditional equation x=CLIM represents a condition in which an amount tag corresponds to a symbol CLIM representing climate. Further, for instance, an evaluation tag "v:TEMP|CLIM" of utterance No. 4 is an amount tag, where an amount TEMP|CLIM represents that an amount is a symbol TEMP representing a temperature or a symbol CLIM.

Figure 21A:
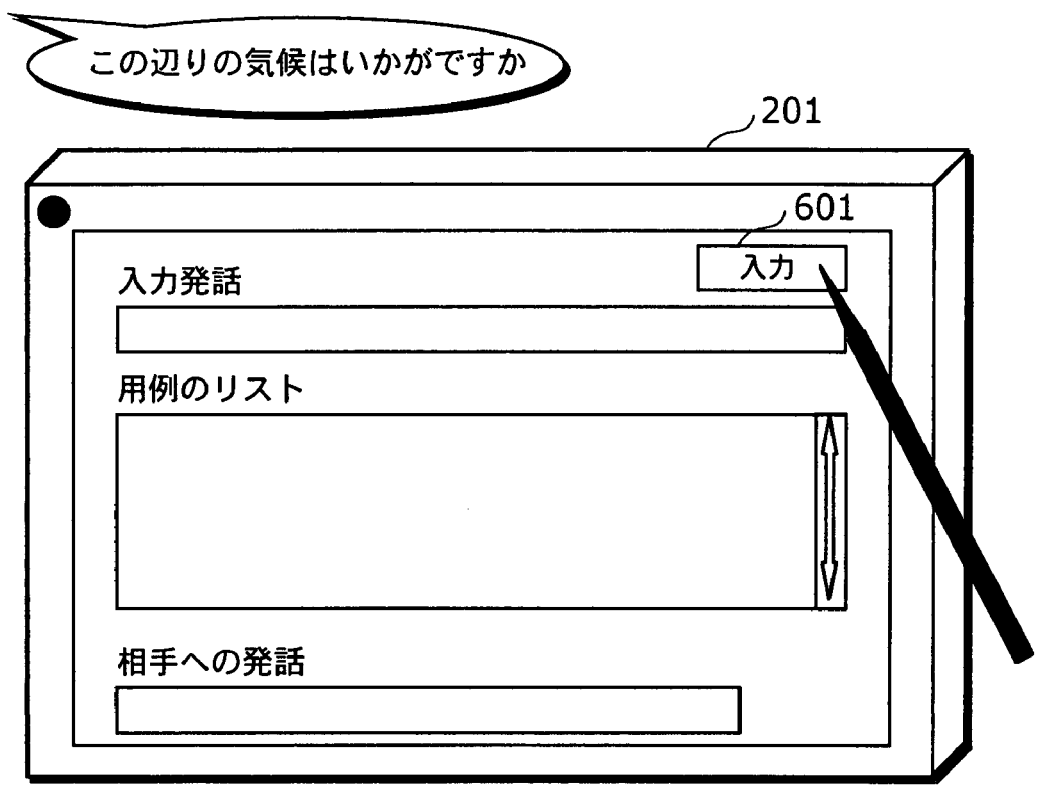
FIGS. 21A and 21B are diagrams showing display examples of the respective dialog supporting devices according to the present invention.
Figure 21B:
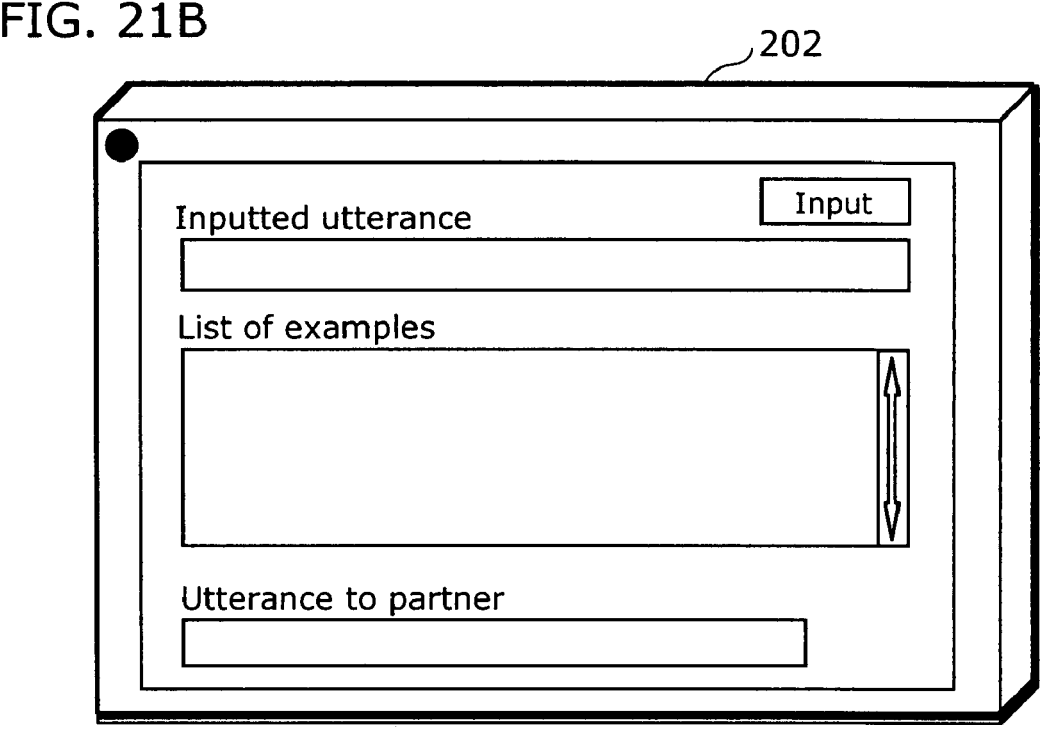
Figure 22A:
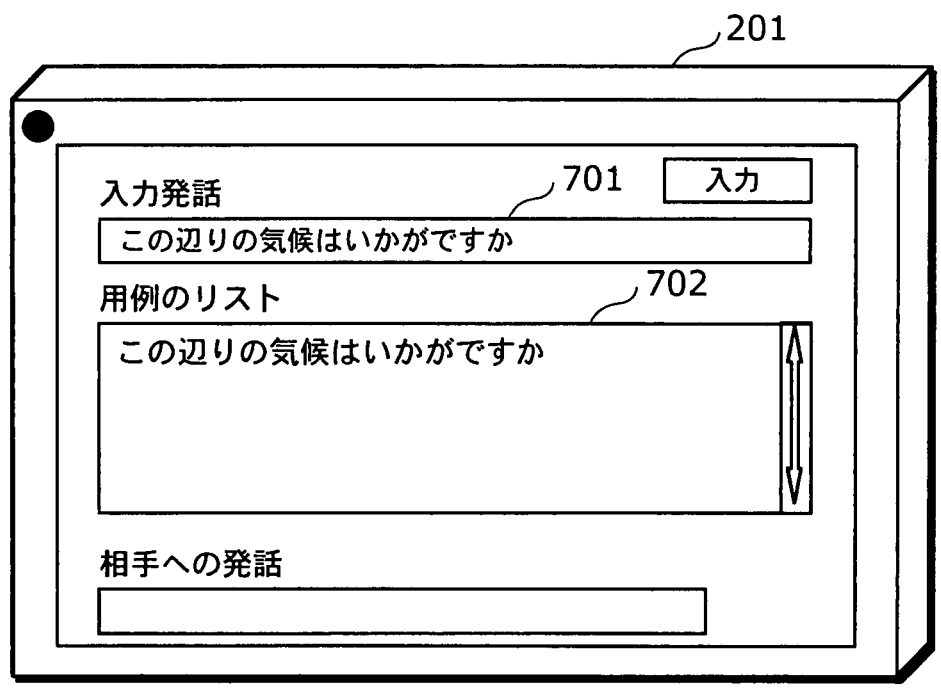
FIGS. 22A and 22B are diagrams showing display examples of the respective dialog supporting devices according to the present invention.
Figure 22B:
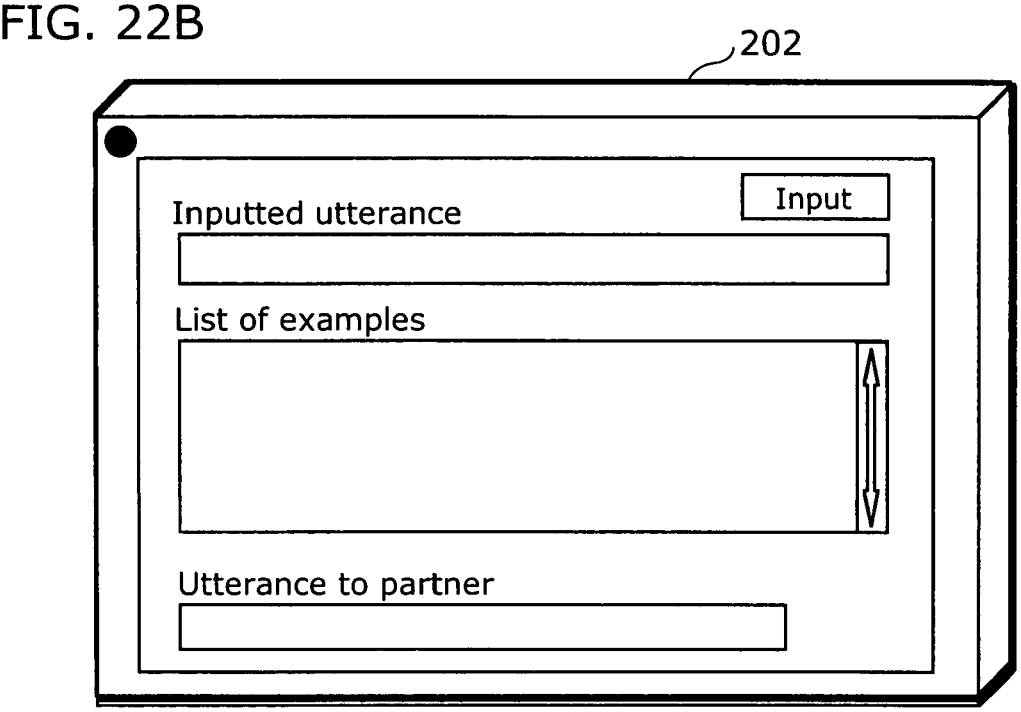

It is assumed that, as shown in FIG. 21A, the user 1 presses an utterance input button 601 and says "この辺りの気候はいかがですか". The utterance receiving unit 102 converts the utterance by utterance recognition processing into character information and provides character data "この辺りの気候はいかがですか" as utterance information. As shown in FIG. 22A, the utterance information is displayed on the display area 701. The example selecting unit 103 calculates respective similarity degrees between the utterance information and respective examples in language 1 in the example database 101, and an example candidate E={この辺りの気候はいか気候はいか} is obtained at Step S402. At step S403, examples included in example candidates E are sequentially displayed on the display area 702.

Figure 23A:
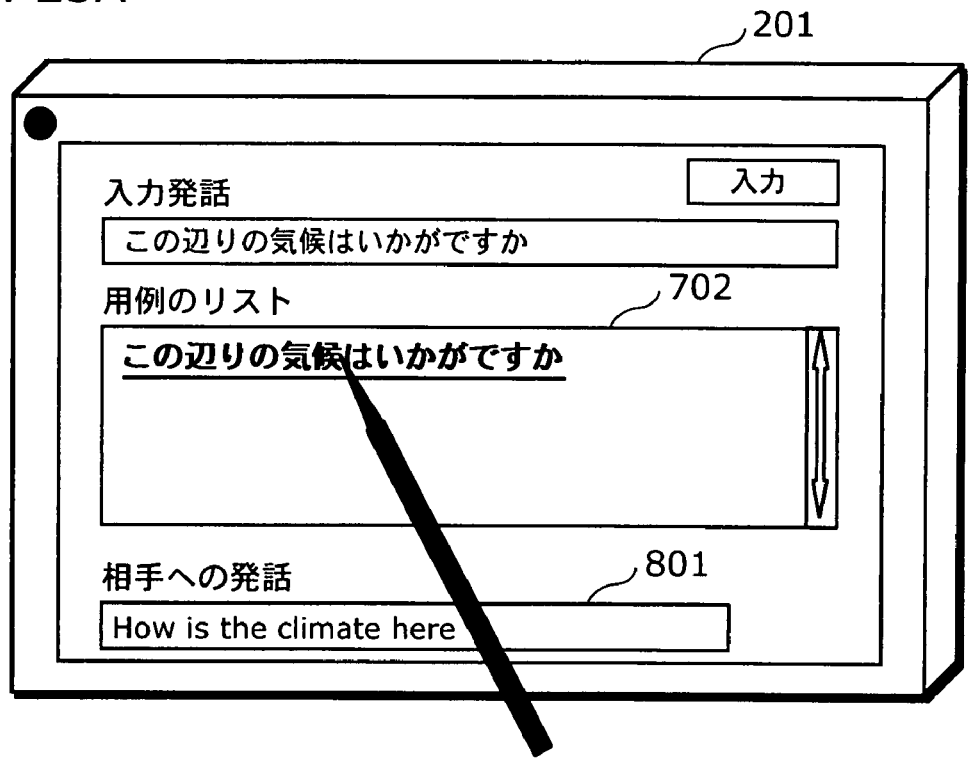
FIGS. 23A and 23B are diagrams showing display examples of the respective dialog supporting devices according to the present invention.
Figure 23B:
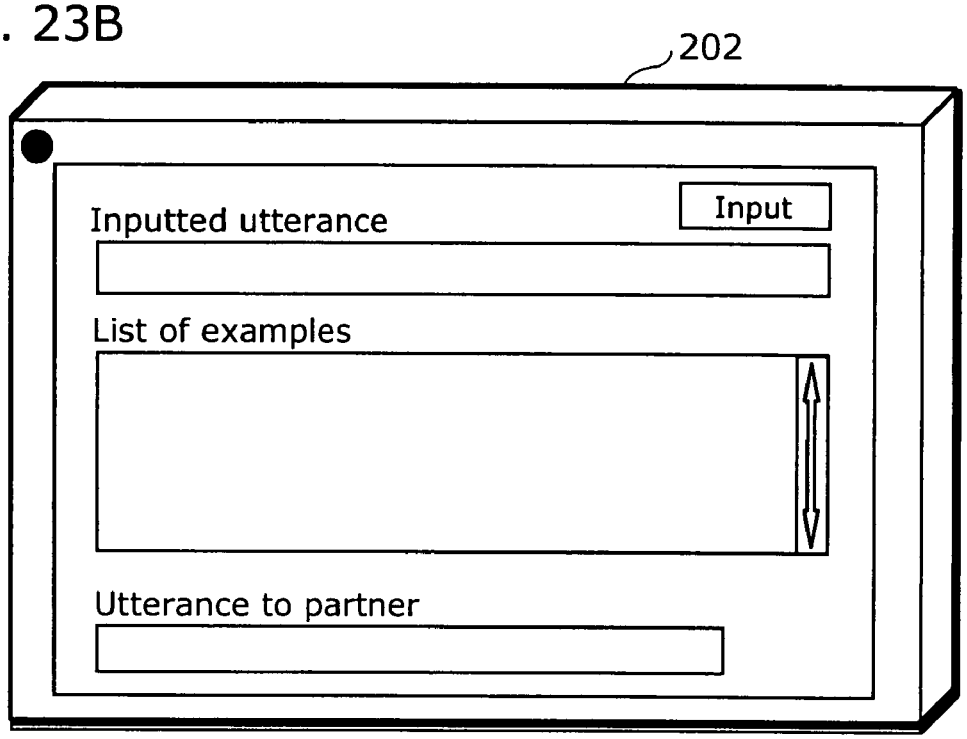

As shown in FIG. 23A, when the user 1 selects an example "この辺りの気候はいかがですか" as a desired example e from the display area 702, a translated example "How is the climate here?" is displayed on the display area 801. Furthermore, the translated example and its evaluation tag are sent by the sending unit 104 to the dialog supporting device 202 of the user 2. In the dialog supporting device 202 of the user 2, the receiving unit 105 receives the translated example and its evaluation tag, an utterance "How is the climate here?" is provided as an utterance to the user 2.

Figure 24A:
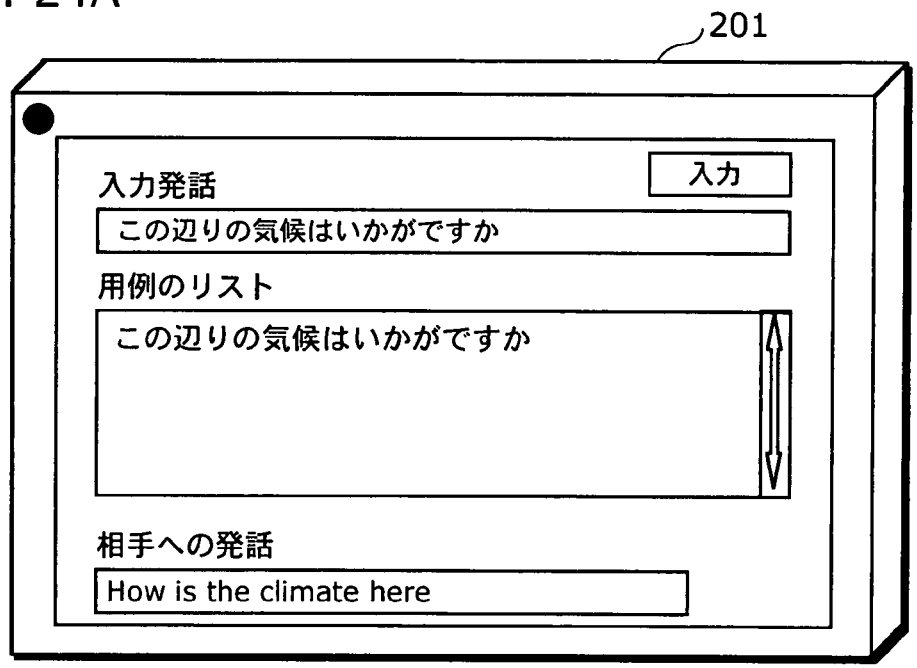
FIGS. 24A and 24B are diagrams showing display examples of the respective dialog supporting devices according to the present invention.
Figure 24B:
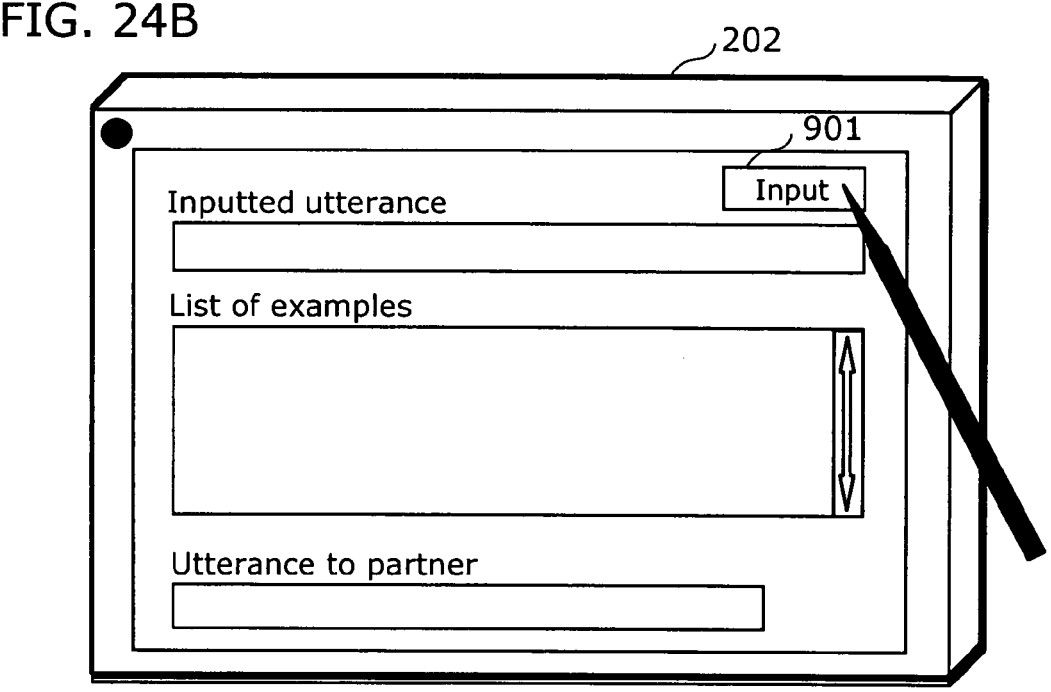
Figure 25A:
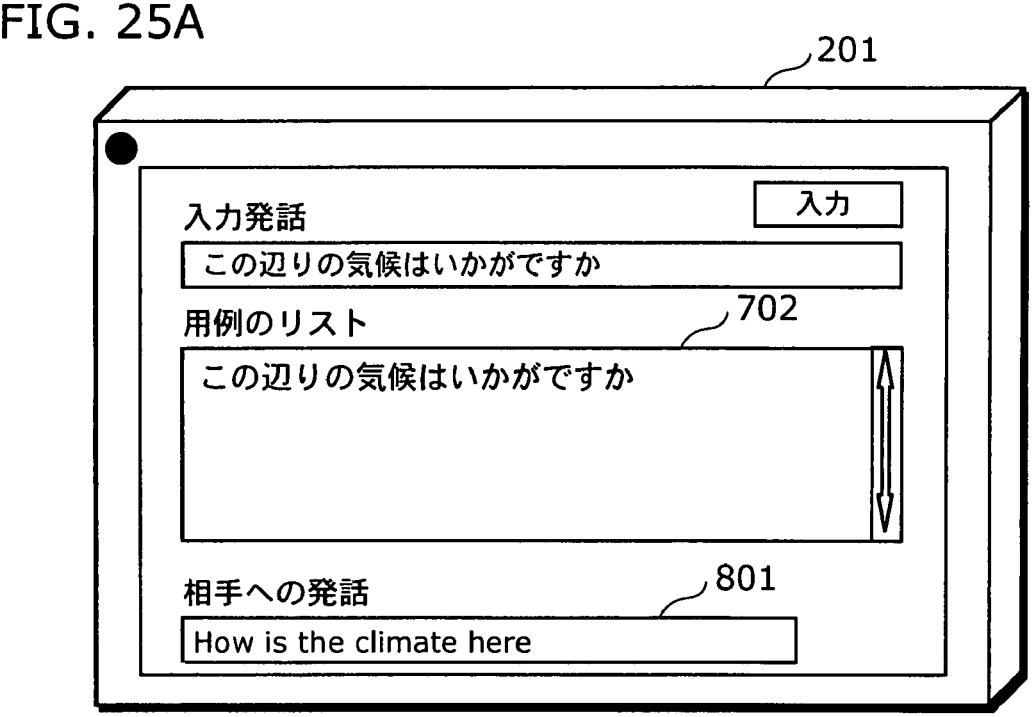
FIGS. 25A and 25B are diagrams showing display examples of the respective dialog supporting devices according to the present invention.
Figure 25B:
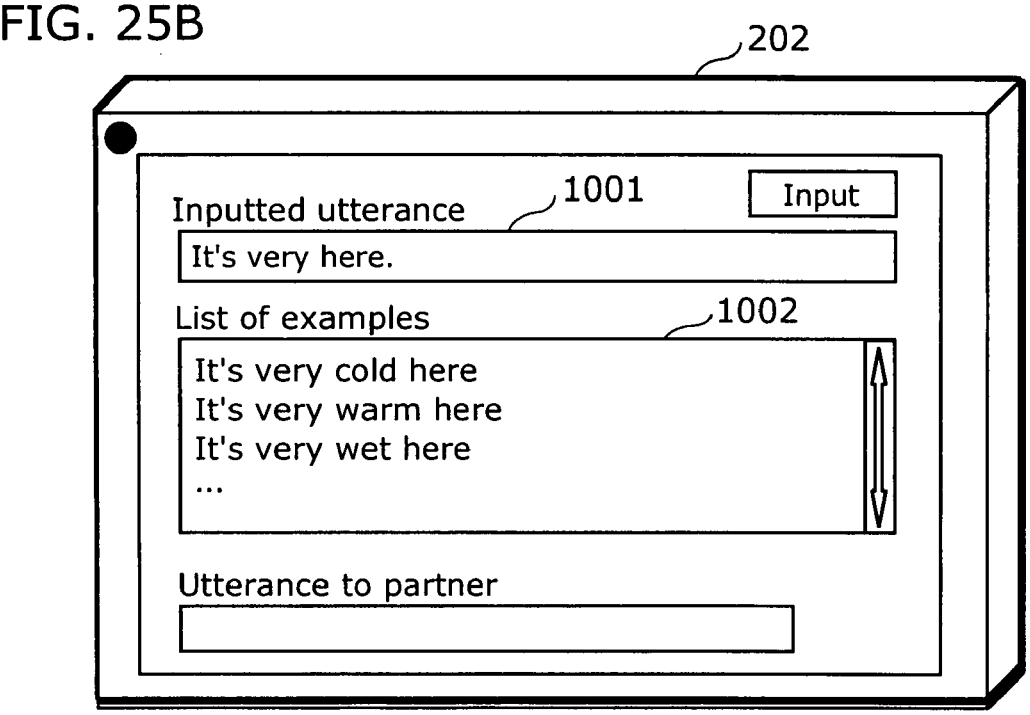

Likewise, as shown in FIG. 24B, the user 2 presses an utterance input button 901 and says "It's very dry here". As shown in FIG. 25B, the utterance is converted by the utterance receiving unit 102 into character information and displayed on an display area 1001. If the utterance receiving unit 102 has utterance recognition processing, there is a high possibility of utterance recognition errors for words with short utterance time period. Here, it is assumed that a word is missed as an error and utterance information "It's very here" is obtained. The example selecting unit 103 calculates respective similarity degrees between this utterance information and respective examples included in the example database 101 and generates the following example candidates E.

---

Example candidate E = {
It's very cold here (1),
It's very warm here (1),
It's very wet here (1),
It's very sunny here (1),
It's very mild here (1),
It's very dry here (1),
It's very cloudy here (1),
It's very hot here (1)}

---

Note that, in the above examples, the numerals in parenthesis represent similarity degrees calculated by dynamic programming as shown in FIG. 5. The example candidates E created by the example selecting unit 103 are displayed on the display area 1002.

In this case, it is desirable that the user 2 can immediately select a desired example e from the example candidates, but such a selecting operation generally requires a considerable time in a small device such as a mobile terminal. For instance, in the case where only three example candidates can be displayed on a screen at the same time as shown in FIG. 25, the user has to scroll the display to check each of example candidates which have been hidden outside the screen, so that it takes a long time to select a desired example candidate.

Figure 26A:
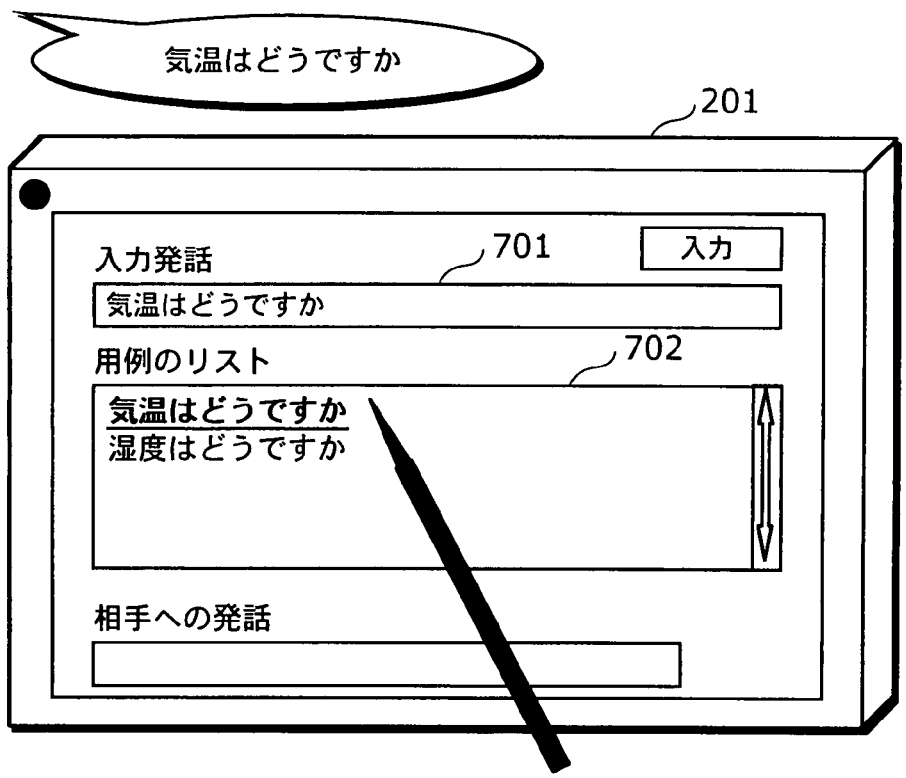
FIGS. 26A and 26B are diagrams showing display examples of the respective dialog supporting devices according to the present invention.
Figure 26B:
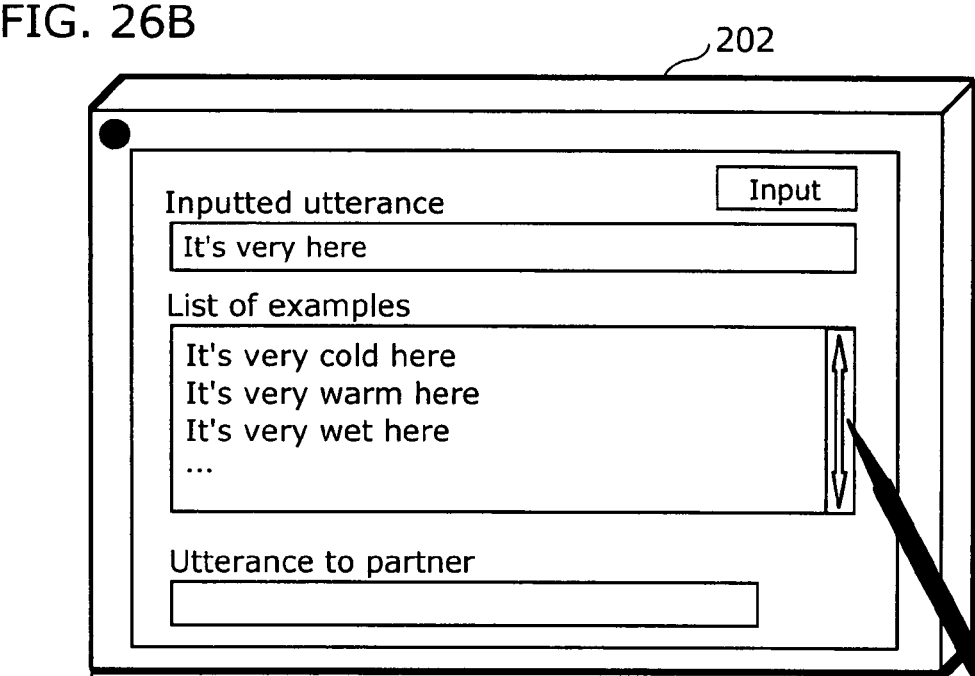
Figure 27A:
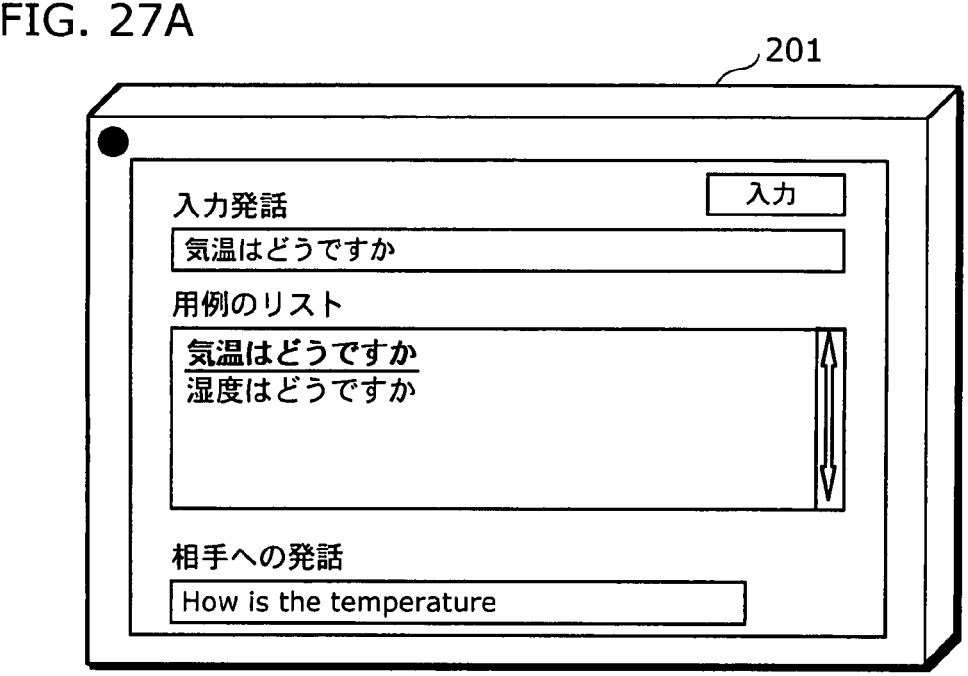
FIGS. 27A and 27B are diagrams showing display examples of the respective dialog supporting devices according to the present invention.
Figure 27B:
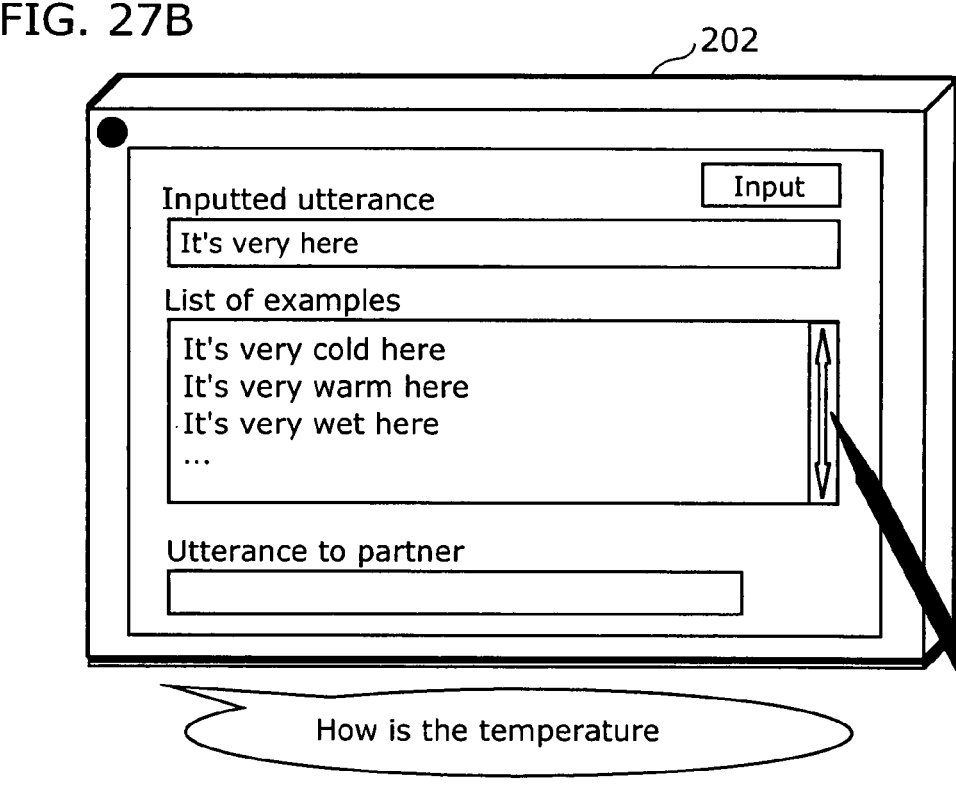

Here, it is assumed that, while the user 2 is searching for the desired example e, the user 1 inputs, as shown in FIG. 26A, a next utterance "気温はどうですか" into the display area 701. When the user 1 selects the desired example e "気温はどうですか" from the display area 702 in the same manner as described above, the example e "気温はどうですか" and its evaluation tag "f:x=TEMP" are sent to the dialog supporting device 202 of the user 2. As shown in FIG. 27B, the sent data are outputted from the dialog supporting device 202 of the user 2, so that the user 2 has to change a target example to be searched in order to say to the partner "It's very hot" since the user 2 is actually asking information of temperature. In the conventional method without the example reevaluating unit 107, it is common that the user 2 presses an utterance input button 901 to say "It's very hot here" and then performs a further searching operation for example candidates of the utterance. The reason is that it is not certain that a next desired example is included in the currently-displayed example candidates, so that the user 2 thinks that it is quicker to start a new searching operation from the beginning.

However, in the present embodiment, in the dialog supporting device 202 of the user 2, the example reevaluating unit 107 reevaluates the following example candidates E held in the example selecting unit 103, using the evaluation tag "f:x=TEMP" sent from the dialog supporting device 201 of the user 1.

---

Example candidate E = {
It's very cold here (1) <v:TEMP|CLIM>,
It's very warm here (1), <v:TEMP|CLIM>,
It's very wet here (1) <v:HUM|CLIM>,
It's very sunny here (1) <v:CLIM>,
It's very mild here (1) <v:TEMP|HUM|CLIM>,
It's very dry here (1) <v:HUM|CLIM>,
It's very cloudy here (1) <v:CLIM>,
It's very hot here (1) <v:TEMP|CLIM>}

---

In other words, the examples included in the example candidates are sorted in an order by which amount parts satisfy a conditional equation x=TEMP, by referring to respective evaluation tags defined in the example database 101. As a result, by prioritizing an example whose evaluation tag has an amount tag "v:n" where n corresponds to TEMP, the example candidates E are sorted as follows.

---

E = {
It's very cold here (1) <v:TEMP|CLIM>,
It's very warm here (1), <v:TEMP|CLIM>,
It's very hot here (1) <v:TEMP|CLIM>,
It's very mild here (1) <v:TEMP|HUM|CLIM>,
It's very wet here (1) <v:HUM|CLIM>, -continued It's very sunny here (1) <v:CLIM>,
It's very dry here (1) <v:HUM|CLIM>,
It's very cloudy here (1) <v:CLIM>}

Figure 28A:
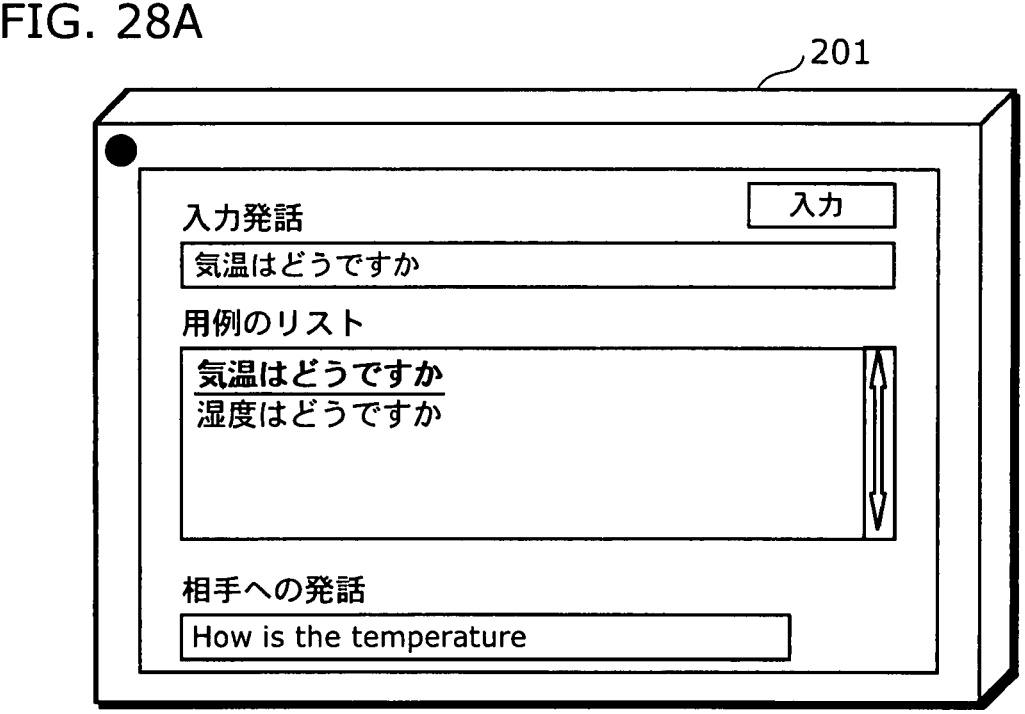
FIGS. 28A and 28B are diagrams showing display examples of the respective dialog supporting devices according to the present invention.
Figure 28B:
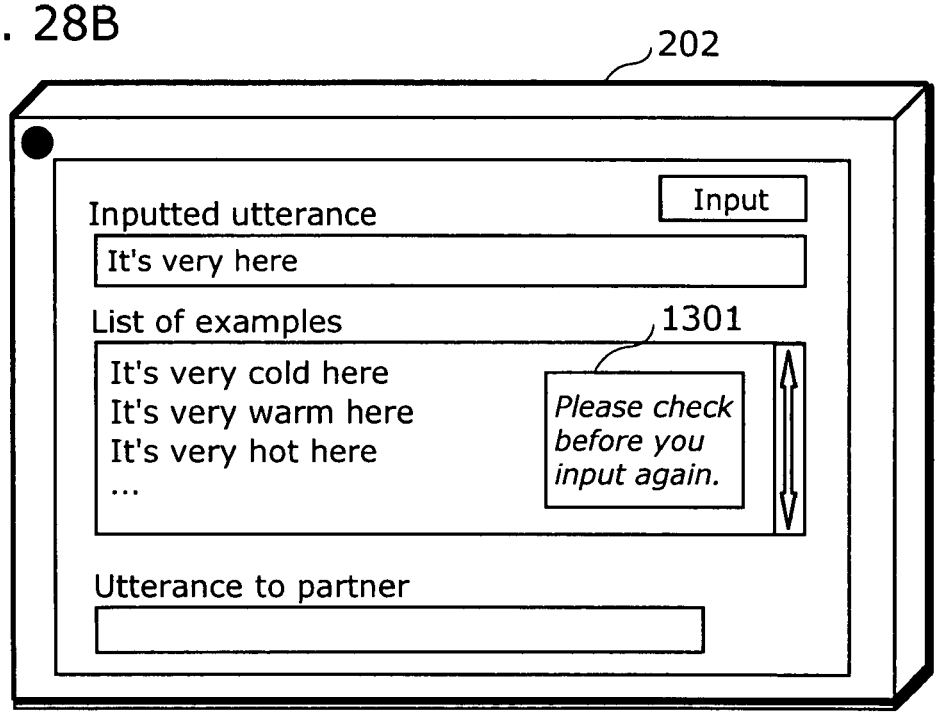

Here, the example No. 11 "It's very hot here" (1)<v: TEMP|CLIM> is arranged prior to the example No. 8 "It's very mild here" (1)<v:TEMP|HUM|CLIM>, since a conditional equation x=TEMP of the example No. 11 has higher meaning satisfaction for the conditional equation. More specifically, an interpretable range of each of the examples is calculated based on the number of types of amount parts in the amount tag, and it is determined that a smaller interpretable range has higher meaning satisfaction for the conditional equation. For instance, an interpretable range of the example No. 8 is 3, while an interpretable range of the example No. 11 is 2. Therefore, the example reevaluating unit 107 arranges the example No. 11 prior to the example No. 8. The sorted example candidates are presented to the user 2 together with a message 1301 asking the user 2 to select a desired example from the example candidates, as shown in FIG. 28B.

Figure 29A:
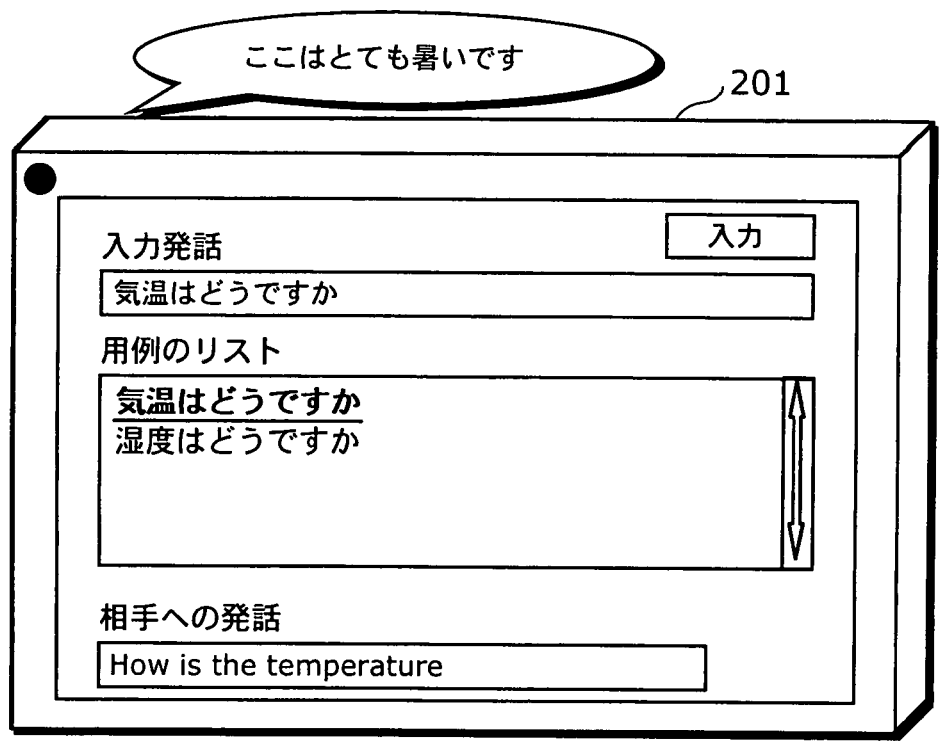
FIGS. 29A and 29B are diagrams showing display examples of the respective dialog supporting devices according to the present invention.
Figure 29B:
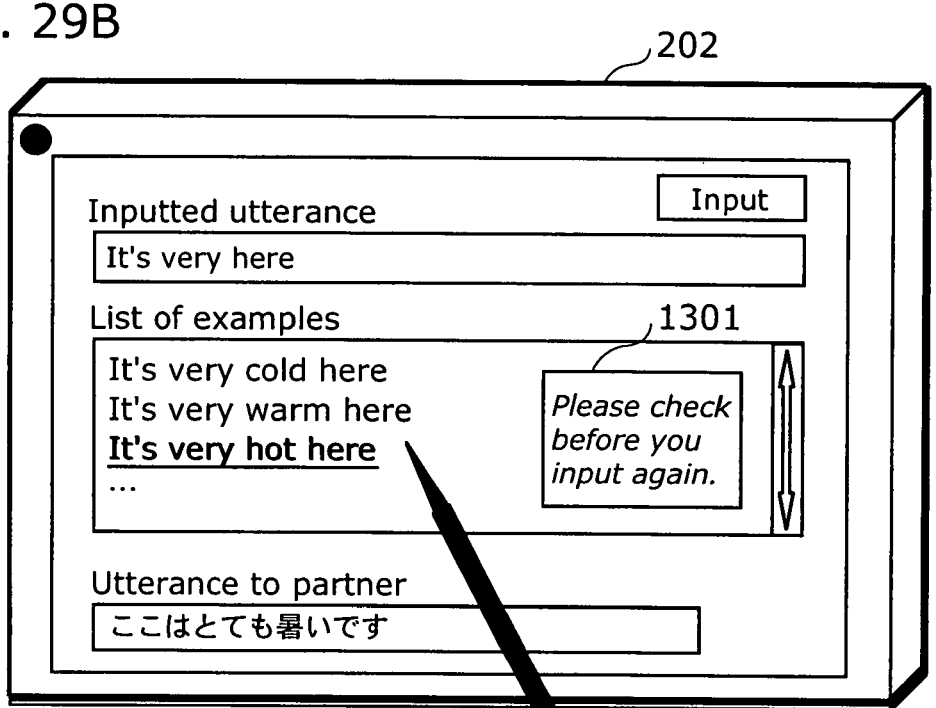

Therefore, the user 2 can immediately select the example e "It's very hot here" as the desired example as shown in FIG. 29B, so that a translated example "ここはとても暑いです" is promptly outputted to the user 1 as shown in FIG. 29A.

As described above, the example candidates are reevaluated, so that additional search is not necessary and an operation amount required to generate one utterance can be reduced on the whole dialog.

Although the above have been described assuming that the user 1 speaks Japanese and the user 2 speaks English using the dialog supporting devices, but the following describes assuming that the user 1 speaks Chinese and the user 2 speaks English using the dialog supporting devices. Here, it is assumed, as shown in FIG. 7, that the user 1, who is a tourist and wishes to know how to get to an airport by a cheap way, has a dialog with the user 2, who is a passerby and familiar with local transportations. It is also assumed that train, bus, and subway are possible transportations to the airport, and that the subway is the cheapest way. Note that a structure that is the same as in the above-described structure is not described again further below.

Figure 30A:
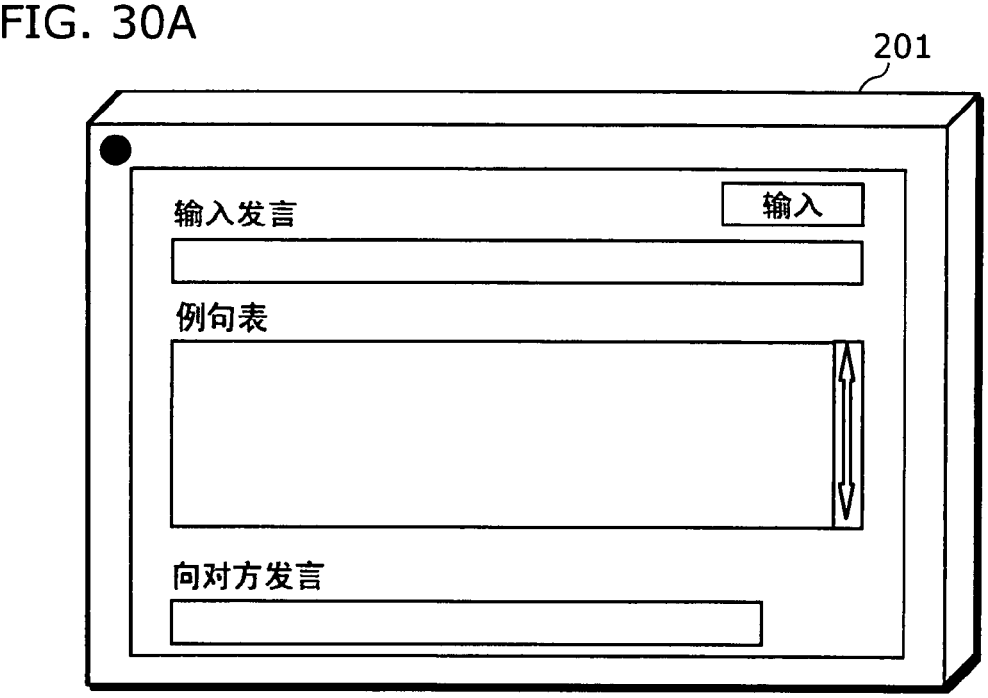
FIGS. 30A and 30B are diagrams showing display examples of the respective dialog supporting devices according to the present invention.
Figure 30B:
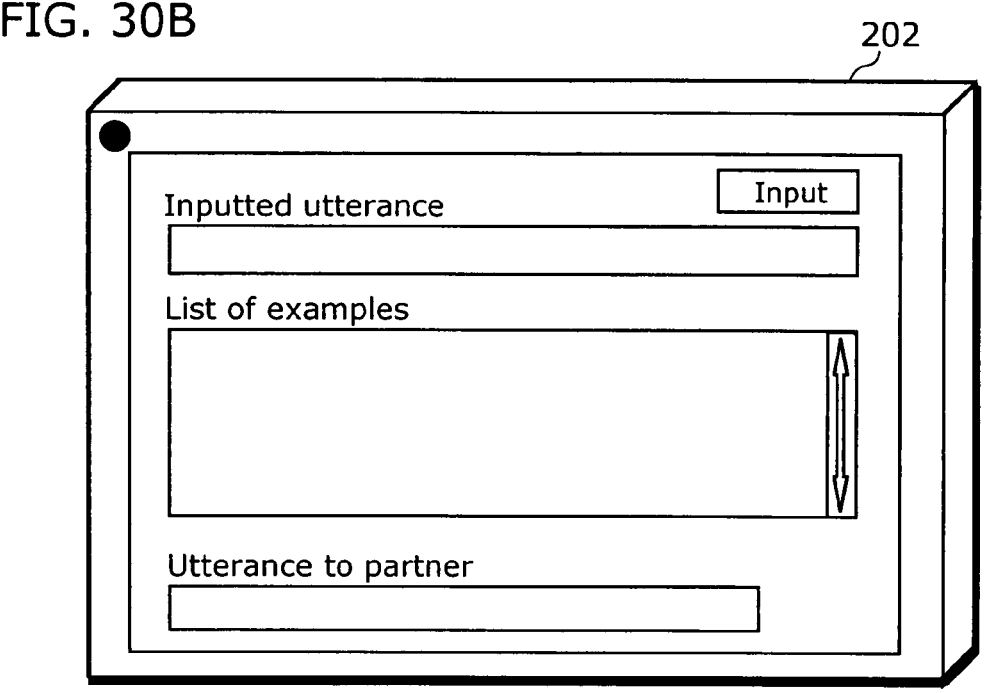

FIGS. 30A and 30B are diagrams showing display examples of the respective dialog supporting devices. The user 1 who speaks Chinese uses a dialog supporting device 201 shown in FIG. 30A, and the user 2 who speaks English uses a dialog supporting device 202 shown in FIG. 30B.

FIG. 31 is a table showing an example of examples held in the example database 101 in the dialog supporting device 201. Language 1 corresponding to the first examples is a native language of the user, while language 2 corresponding to the second examples is a native language of the dialog partner. For instance, when the example selecting unit 103 selects an utterance No. 2, then a translation of the selected example, which is an example "Good morning" in language 2, are outputted together with its evaluation tag. In the dialog supporting device 202, an example database 101 has an opposite structure where language 1 is English and language 2 is Chinese. The evaluation tag is predetermined for each example.

Figure 32A:
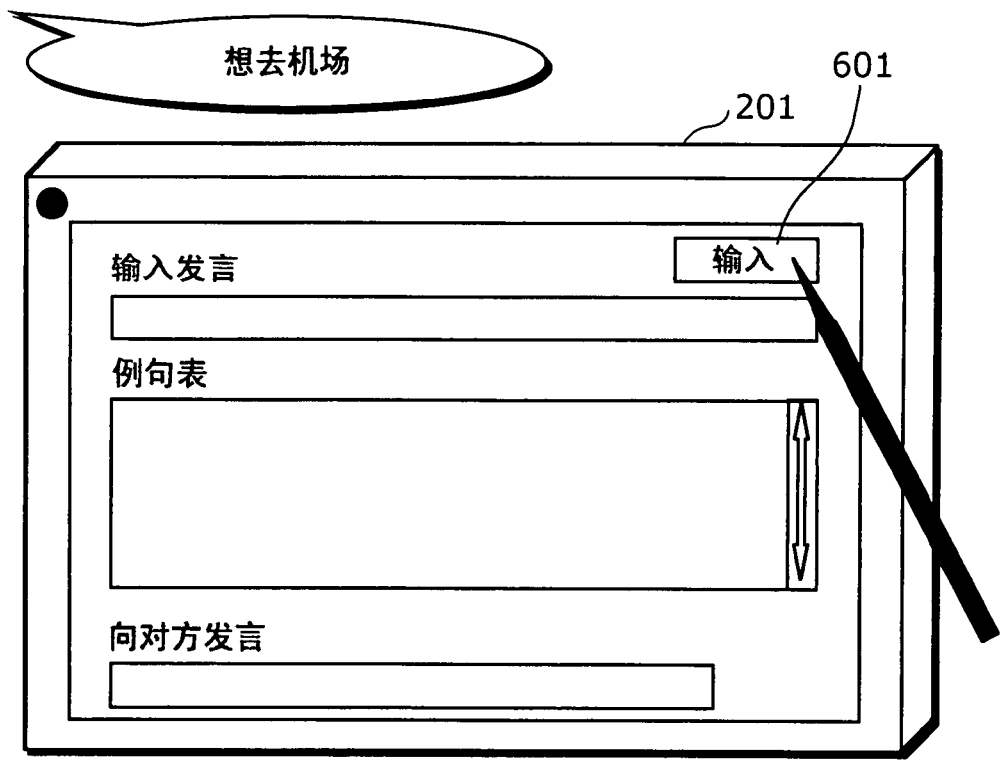
FIGS. 32A and 32B are diagrams showing display examples of the respective dialog supporting devices according to the present invention.
Figure 32B:
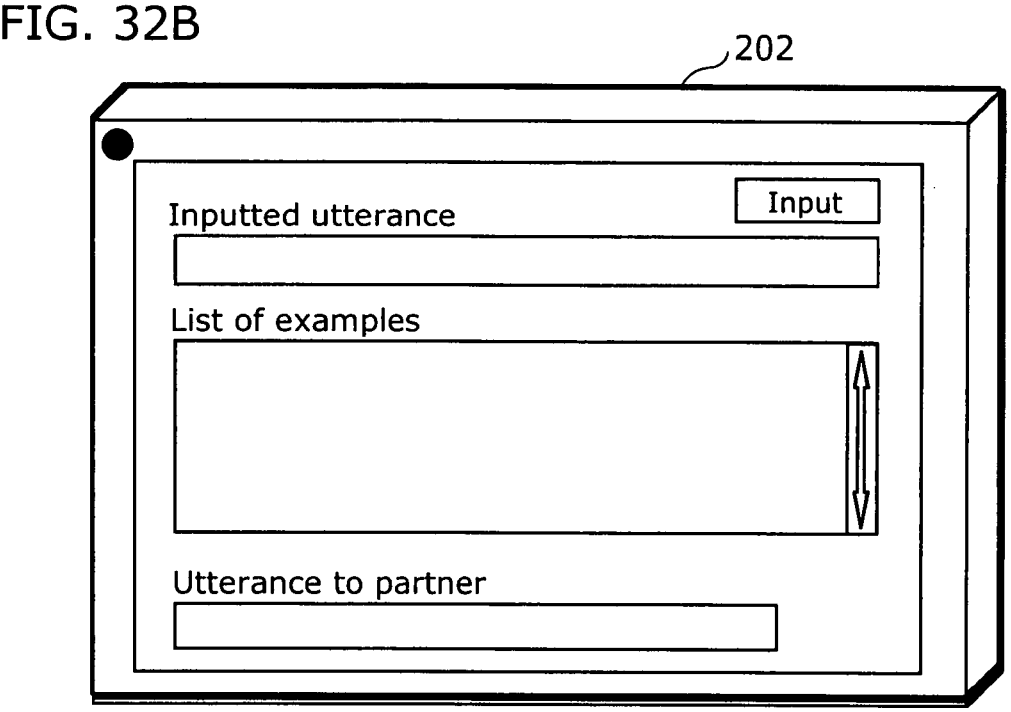
Figure 33A:
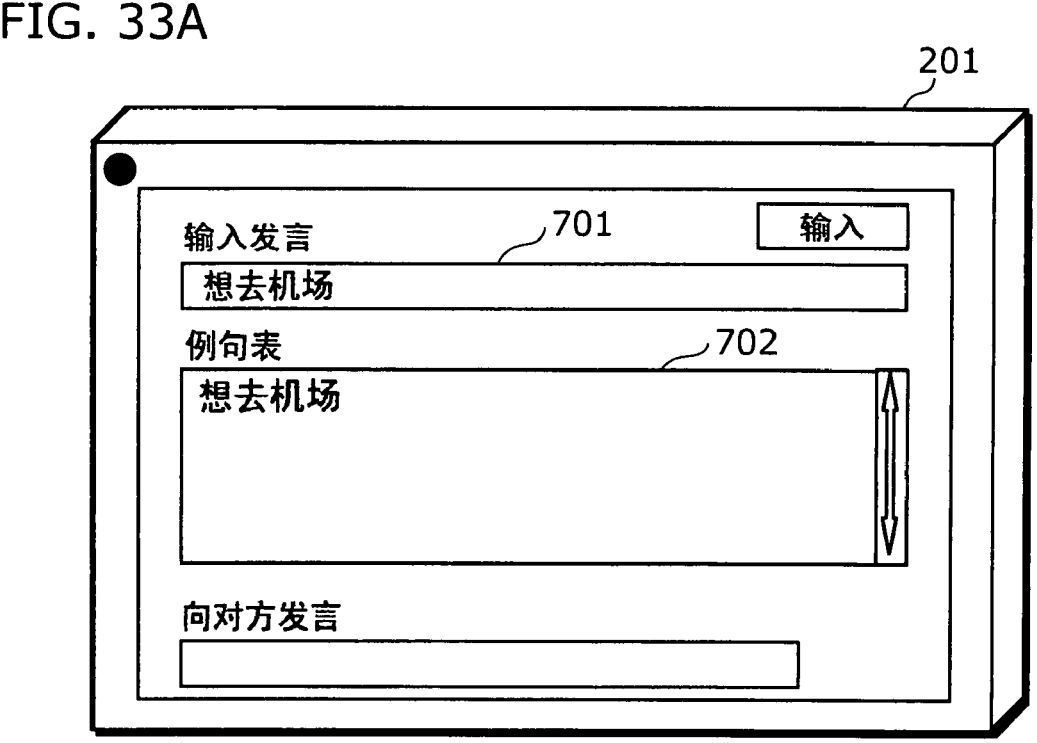
FIGS. 33A and 33B are diagrams showing display examples of the respective dialog supporting devices according to the present invention.
Figure 33B:
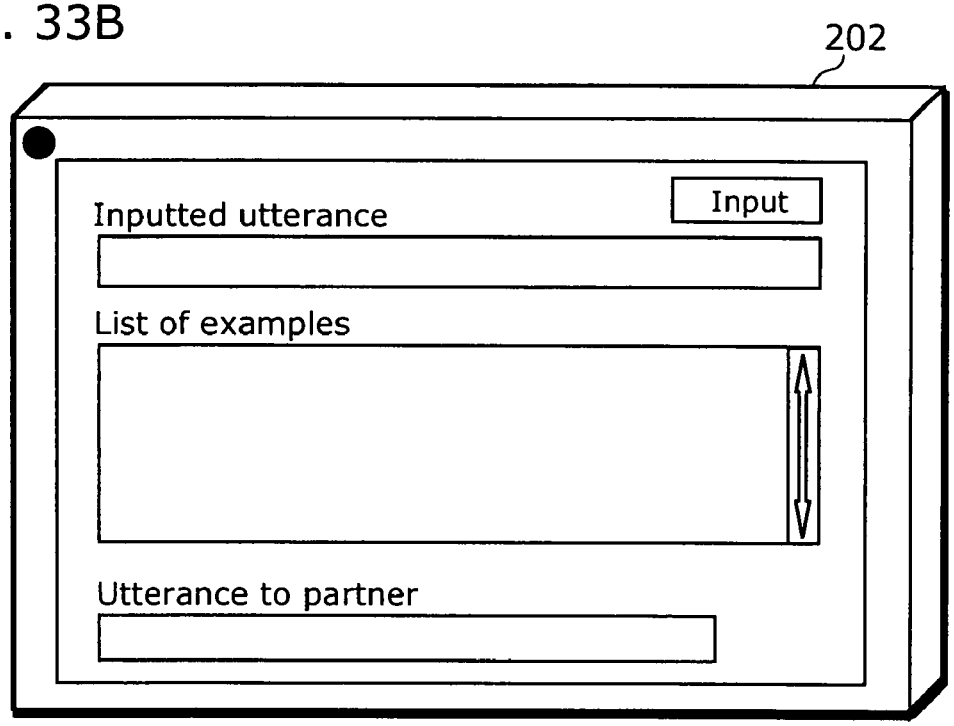

As shown in FIG. 32A, the user 1 is assumed to press an utterance input button 601 and say "想去机场" (Step S101). The utterance receiving unit 102 converts the utterance using the utterance recognition processing into character information, and provides "想去机场" as utterance information. As shown in FIG. 33A, the utterance information is displayed on a display area 701. The example selecting unit 103 calculates respective similarity degrees between the utterance information and respective examples in language 1 in the example database 101, so that example E {想去 机场} is obtained at Step S402. At Step S403, examples included in example candidates are sequentially displayed on a display area 702 (Step S102).

Figure 34A:
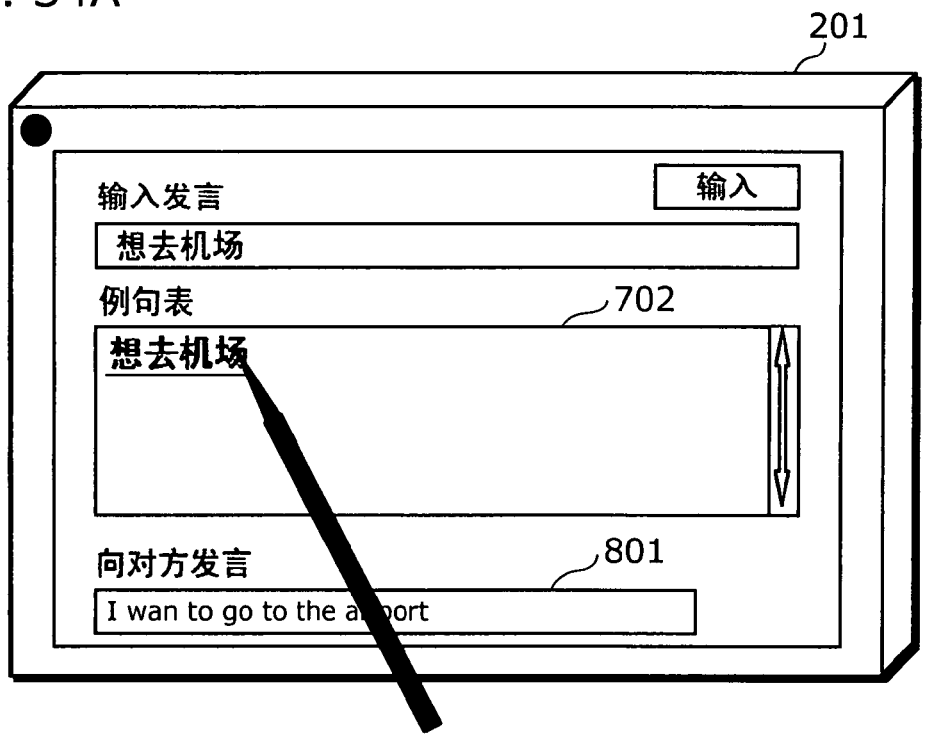
FIGS. 34A and 34B are diagrams showing display examples of the respective dialog supporting devices according to the present invention.
Figure 34B:
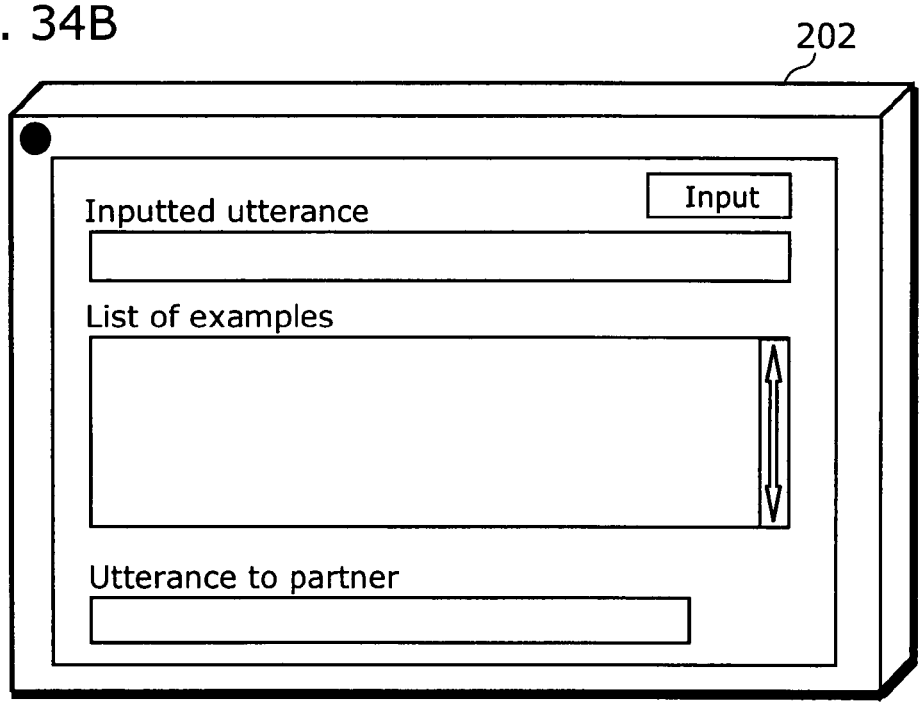

As shown in FIG. 34A, when the user 1 selects the example "想 去机场" as a desired example e from the display area 702 (Step S103), a translated example "I want to go to the airport" is displayed on a display area 801. Further, the translated example and its evaluation tag are sent by the sending unit 104 to the dialog supporting device 202 of the user 2 (Step S104). The dialog supporting device 202 of the user 2 receives the translated example and its evaluation tag by the receiving unit 105 (Step S105), and as shown in FIG. 34B, provides the user 2 with "I want to go to the airport" as an utterance (Step S106).

Figure 35A:
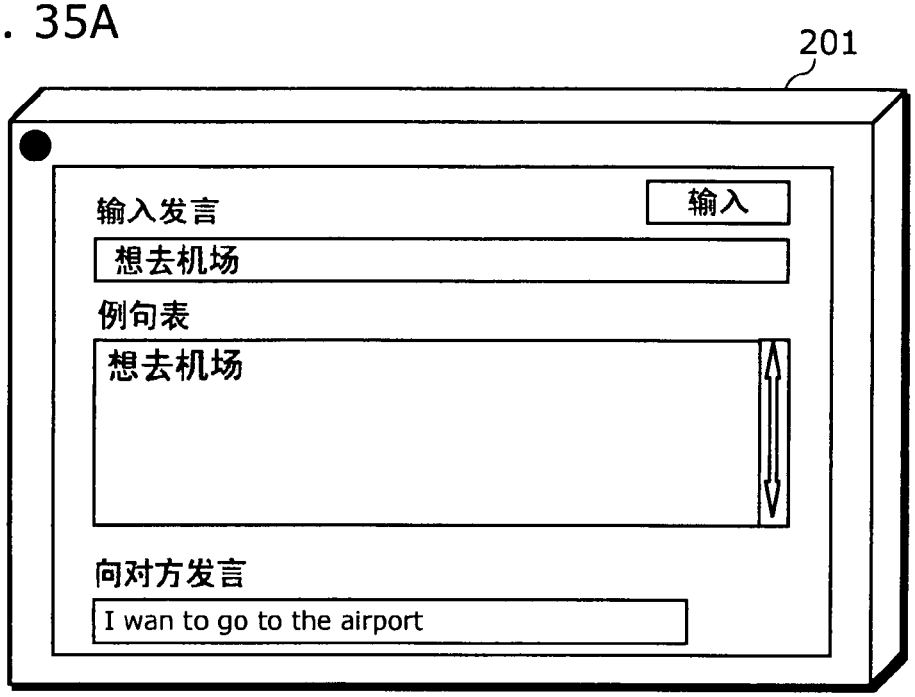
FIGS. 35A and 35B are diagrams showing display examples of the respective dialog supporting devices according to the present invention.
Figure 35B:
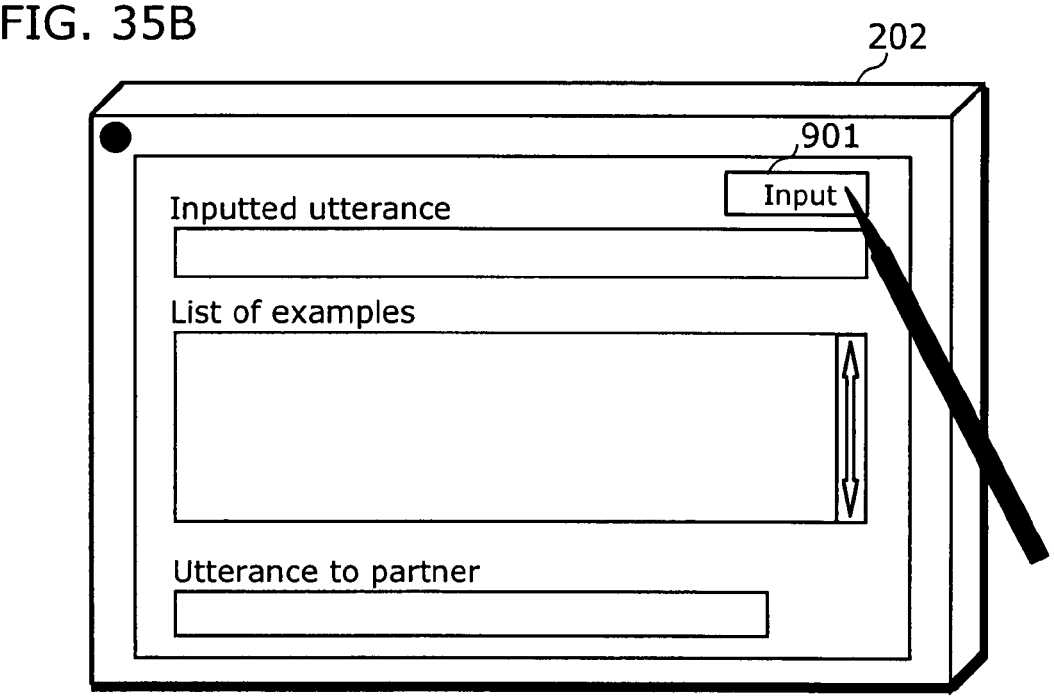
Figure 36A:
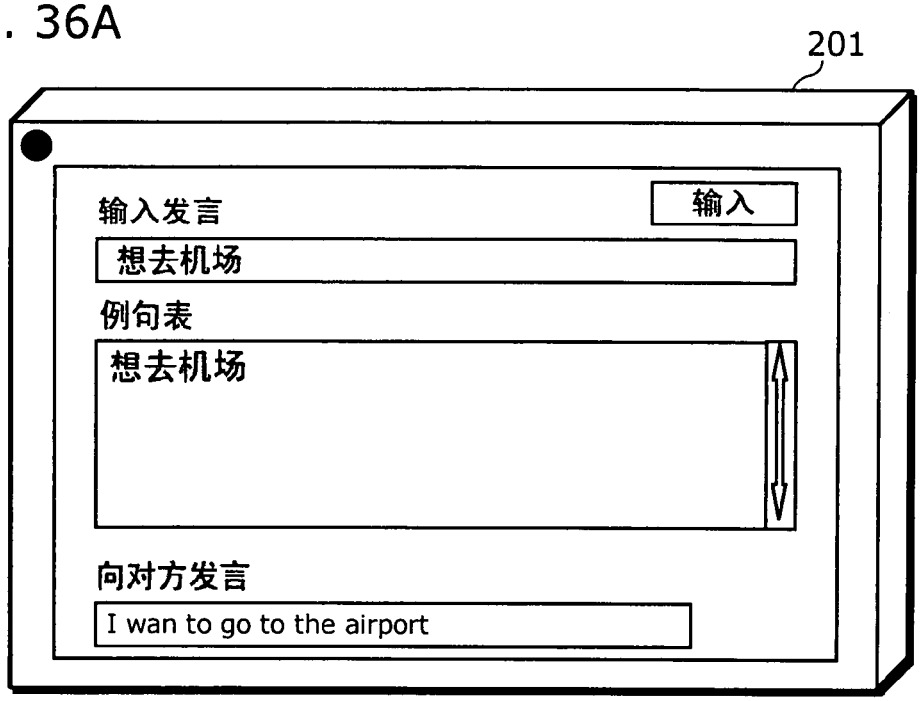
FIGS. 36A and 36B are diagrams showing display examples of the respective dialog supporting devices according to the present invention.
Figure 36B:
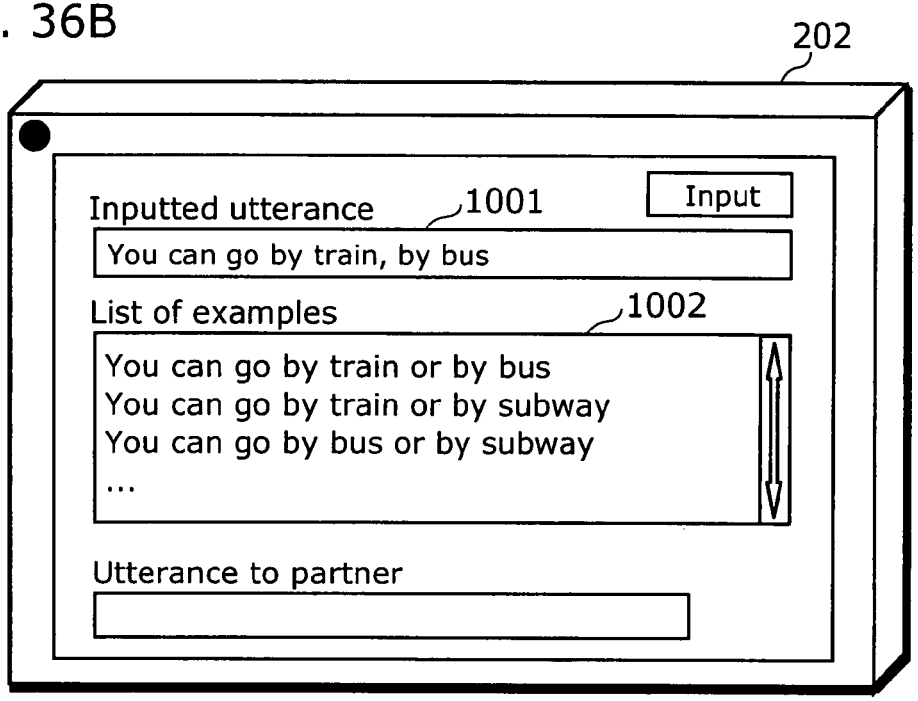

Likewise, as shown in FIG. 35B, the user 2 presses an utterance input button 901 and says "You can go by train, by bus or by subway" (Step S107). As shown in FIG. 36B, the utterance information is converted by the utterance receiving unit 102 into character information and displays on an display area 1001. In the case where the utterance receiving unit 102 has utterance recognition processing, there is a high possibility of utterance recognition errors for long utterances. Here, it is assumed that some words are missed by error, and eventually character information "You can go by train, by bus" is obtained. The example selecting unit 103 calculates respective similarity degrees between this utterance information and respective examples included in the example database 101 and generates the following example candidates E (Step S108).

Example candidate E = {
You can go by train or by bus (1),
You can go by train or by subway (2),
You can go by bus or by subway (2),
You can go by train (2),
You can go by bus (2),
You can go by train, by bus or by subway (3),
You can go by subway (3)}

Note that, in the above examples, the numerals in parenthesis represent similarity degrees calculated by dynamic programming as shown in FIG. 5. The example candidates E created by the example selecting unit 103 are displayed on a display area 1002.

In this case, it is desirable that the user 2 can immediately select a desired example e from the example candidates, but such a selecting operation generally requires a considerable time in a small device such as a mobile terminal. For instance, in the case where only three example candidates can be displayed on a screen at the same time as shown in FIG. 36B, the user has to scroll the display to check each of example candidates which have been hidden outside the screen, so that it takes a long time to select a desired example candidate.

Figure 37A:
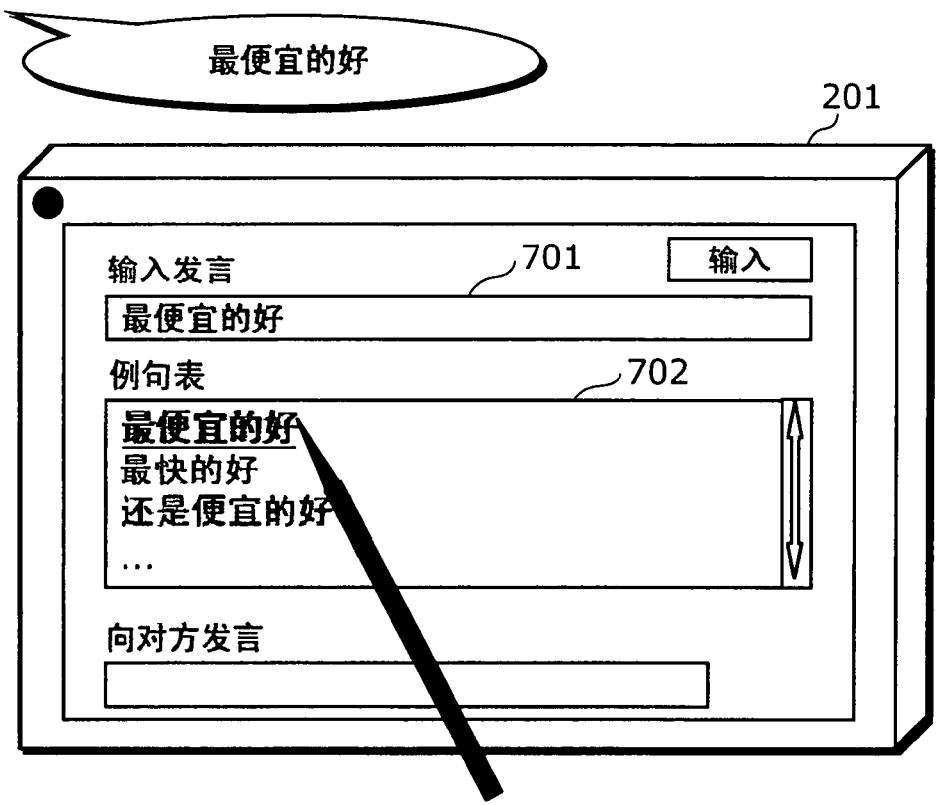
FIGS. 37A and 37B are diagrams showing display examples of the respective dialog supporting devices according to the present invention.
Figure 37B:
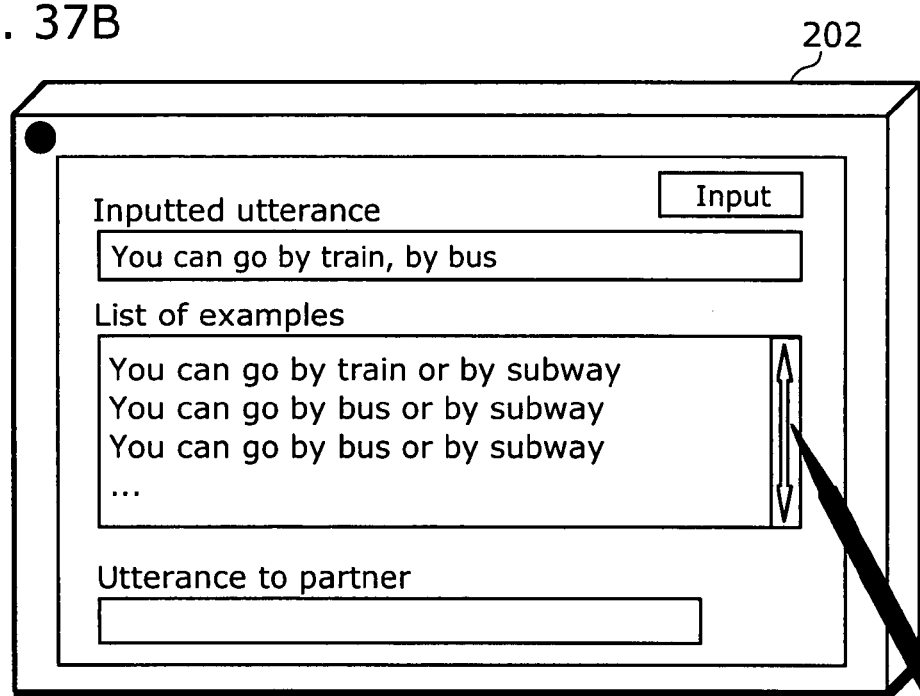

Here, it is assumed that, while the user 2 is searching for the desired example e, the user 1 inputs, as shown in FIG. 37A, a next utterance "最便宜的好" into the display area 701 (Step S109).

Figure 38A:
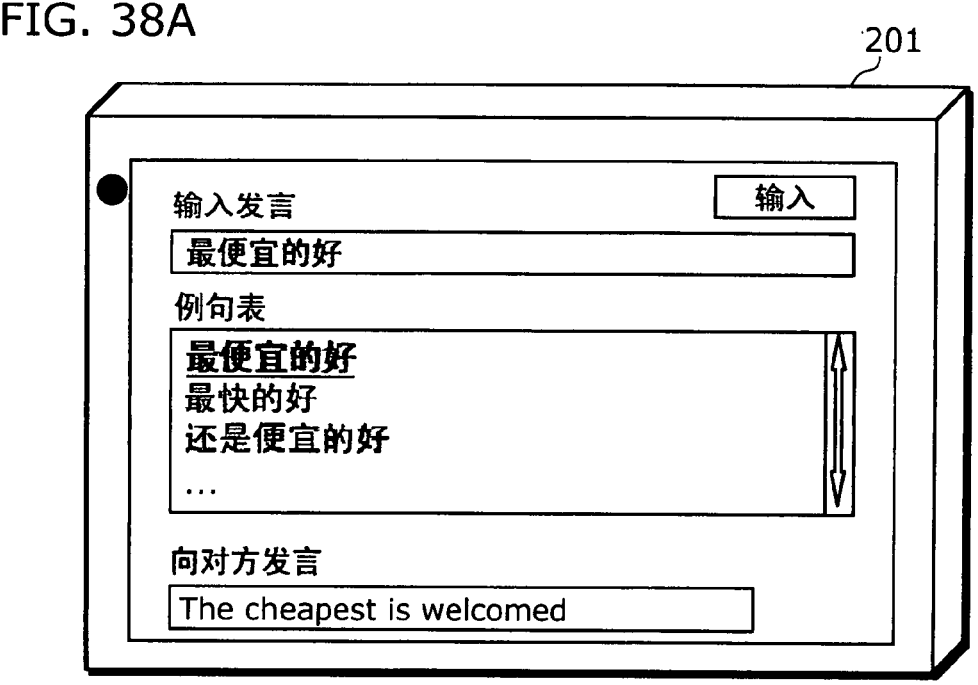
FIGS. 38A and 38B are diagrams showing display examples of the respective dialog supporting devices according to the present invention.
Figure 38B:
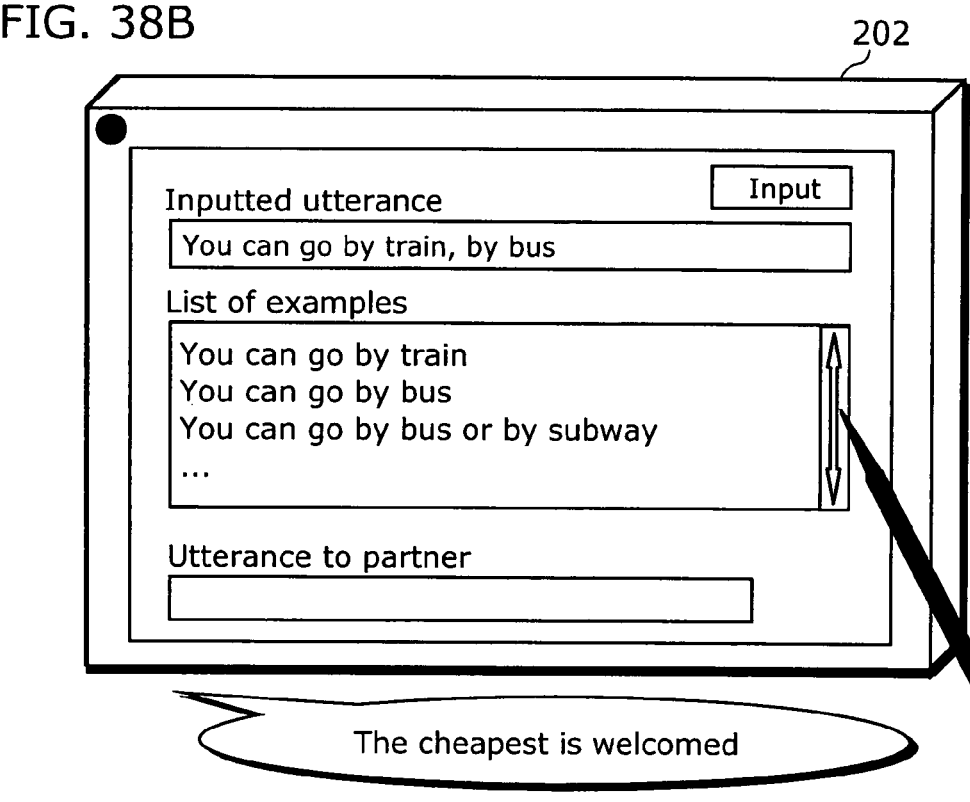

When the user 1 selects the desired example e "最便宜的好" from the display area 702 in the same manner as described above (Steps S110, S111), the example e "最便宜的好" and its evaluation tag "f:x<=y" are sent to the dialog supporting device 202 of the user 2 (Step S112). The sent data are outputted from the dialog supporting device 202 of the user 2 as shown in FIG. 38B (Steps S113, S114), so that the user 2 changes targets to be searched in order to select "You can go by subway" because subway is the cheapest transportation.

Next, in the dialog supporting device 202 of the user 2, the example reevaluating unit 107 reevaluates the following example candidates E held in the example selecting unit 103, using the evaluation tag "f:x<=y" sent from the dialog supporting device 201 of the user 1 (Step S115).

---

Example candidate E = {
You can go by train or by bus (1) <v:2>,
You can go by train or by subway (2) <v:2>,
You can go by bus or by subway (2) <v:2>,
You can go by train (2) <v:1>,
You can go by bus (2) <v:1>,
You can go by train, by bus or by subway (3) <v:3>,
You can go by subway (3) <v:1>}

---

In other words, the examples included in the example candidates are sorted in an order by which amount parts satisfy a conditional equation x<=y, by referring to the evaluation tags defined in the example database 101. As a result, by prioritizing an example whose evaluation tag has an amount tag "v:n" where n is smaller, the example candidates E are sorted as follows.

---

E = {
You can go by train (2) <v:1>,
You can go by bus (2) <v:1>,
You can go by subway (3) <v:1>,
You can go by train or by bus (1) <v:2>,
You can go by train or by subway (2) <v:2>,
You can go by bus or by subway (2) <v:2>,
You can go by train, by bus or by subway (3) <v:3>}

---

Figure 39A:
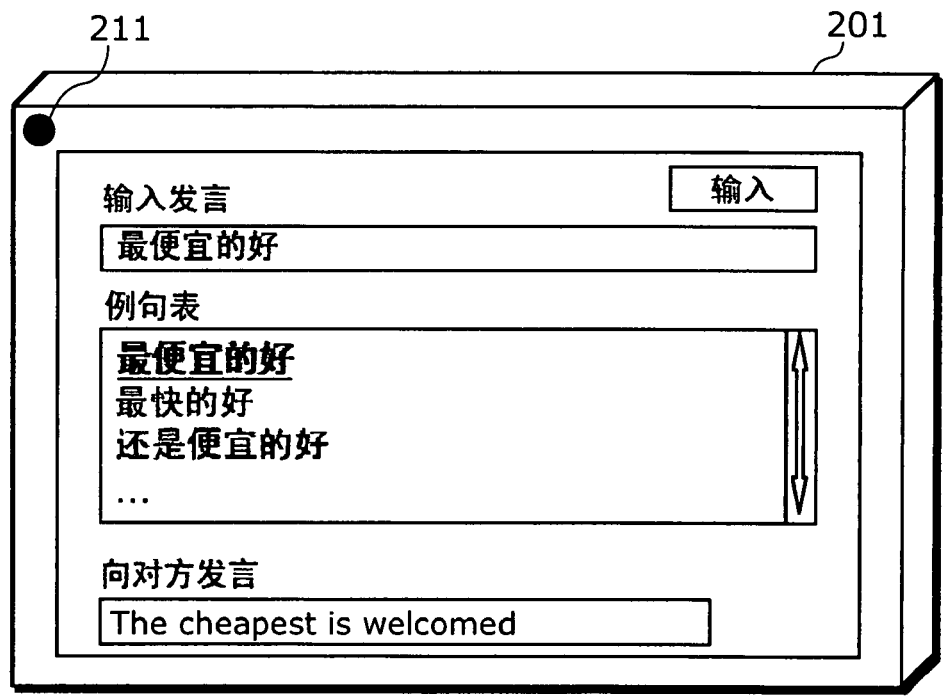
FIGS. 39A and 39B are diagrams showing display examples of the respective dialog supporting devices according to the present invention.
Figure 39B:
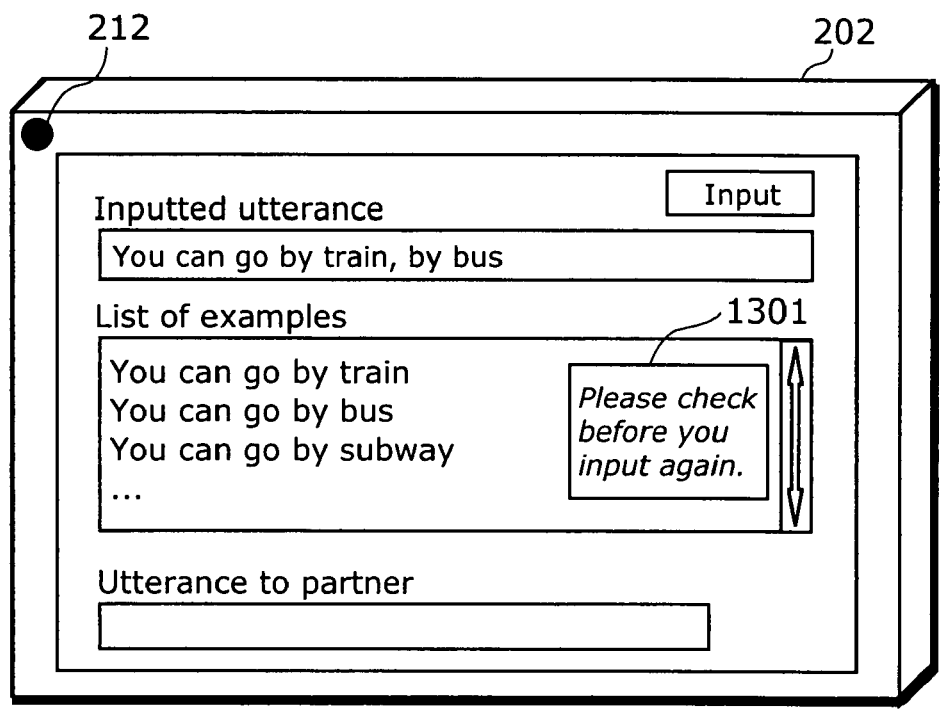

The sorted example candidates are presented to the user 2 together with a message 1301 asking the user 2 to select a desired example from the example candidates, as shown in FIG. 39B.

Figure 40A:
FIGS. 40A and 40B are diagrams showing display examples of the respective dialog supporting devices according to the present invention.
Figure 40B:
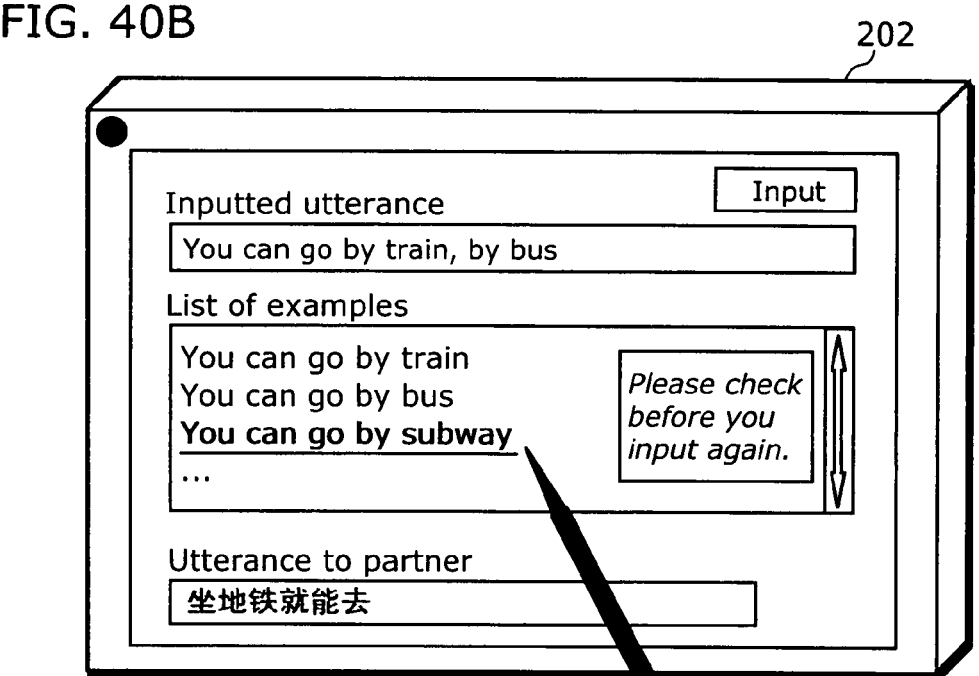

Thereby, the user 2 can immediately select an example e "You can go by subway" as the desired example as shown in FIG. 40B (Step S116), so that a translated example "坐地铁就能去" can be immediately outputted to the user 1 as shown in FIG. 40A (Steps S117 to S119).

In a conventional method without the example reevaluating unit 107, it is common that the user 2 presses an utterance input button 901 to say "You can go by subway" and then performs a further searching operation for example candidates of the utterance. The reason is that it is not certain that a next desired example is included in the currently-displayed example candidates, so that the user 2 thinks that it is quicker to start a new searching operation from the beginning. Here, advantages of the present embodiment are examined quantitatively. It is assumed that T represents an average operation amount from when the user inputs an utterance until when the user selects a desired example. In the case where the user 1 and the user 2 have a dialog using the dialog supporting devices, the dialogs are as follows. Note that an utterance in parenthesis is an utterance which is not outputted from the dialog supporting device due to interruption from the partner.

User 1: "I want to go to the airport".
(User 2: "坐电车，巴士,,或者坐地铁就能去")
User 1: "The cheapest is welcomed."
User 2: "坐地铁就能去"

Figure 41A:
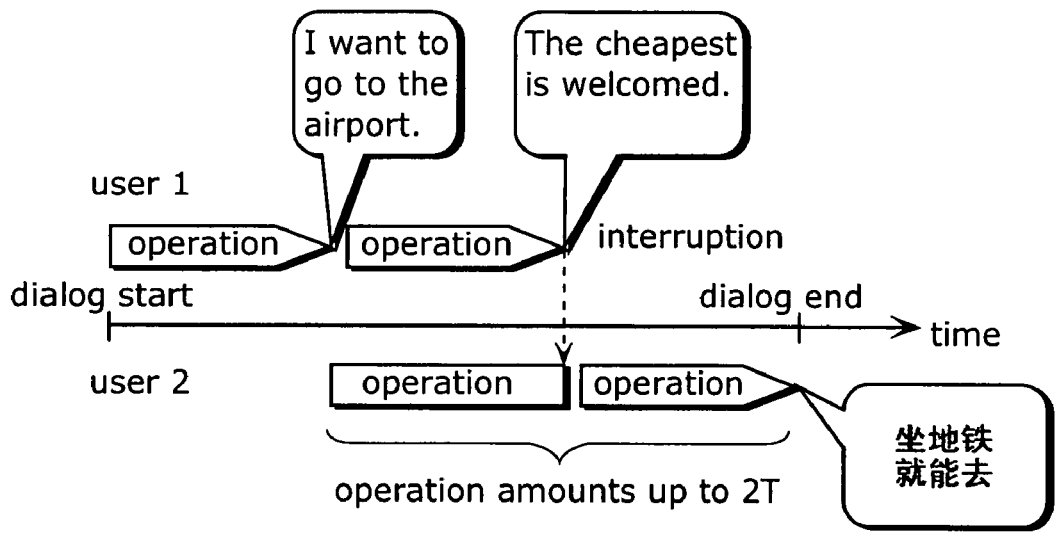
FIGS. 41A and 41B are diagrams quantitatively showing effects of the present invention.
Figure 41B:
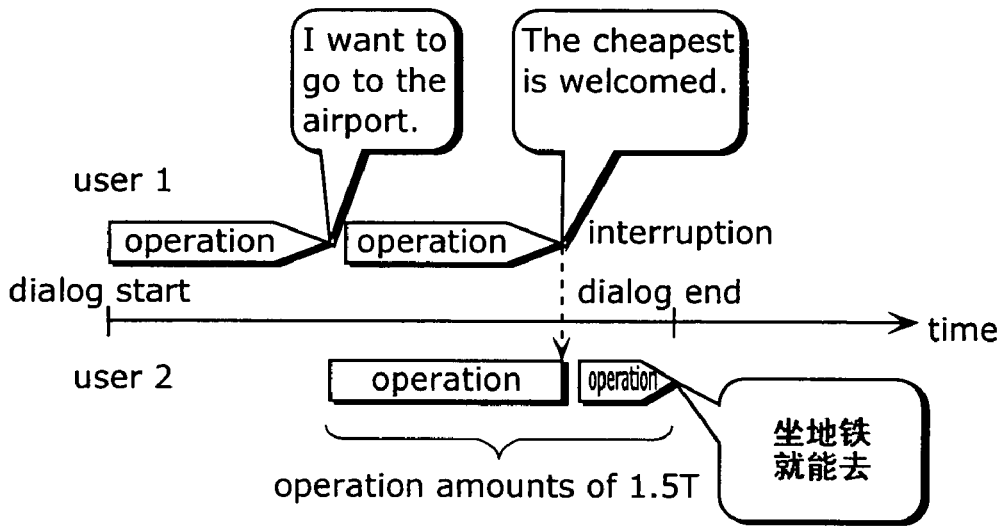

Here, if the above dialog occur at the timings shown in FIGS. 41A and 41B, in the conventional method shown in FIG. 41A, the user 2 spends an operation amount, which is almost 2 T, in order to generate "坐地铁就能去". However, in the present embodiment shown in FIG. 31B, the example candidates are reevaluated by the example reevaluating unit 107, so that the user does not need to perform further search from the beginning thereby spending an operation amount 1.5 T to generate "坐地铁就能去". Therefore, it is possible to reduce, for the whole dialog, an amount of operations in a device required to generate one utterance.

The following describes processing of supporting dialog in different languages in the present embodiment, where the example database 101 has a structure as shown in FIG. 42. Here, it is assumed that the user 1, who speaks Chinese, is a tourist and visits the location at the first time, and that the user 2 is a local resident. It is also assumed that the climate at the location is hot and humid.

Each evaluation tag of the examples shown in FIG. 42 is described as not quantified expression but logical expression using symbols. For instance, an evaluation tag "f:x=CLIM" of utterance No. 1 is a condition tag, where a conditional equation x=CLIM represents a condition in which an amount tag corresponds to a symbol CLIM representing climate. Further, for instance, an evaluation tag "v:TEMP|CLIM" of utterance No. 4 is an amount tag, where an amount TEMP|CLIM represents that an amount part is a symbol TEMP representing a temperature or a symbol CLIM.

Figure 43A:
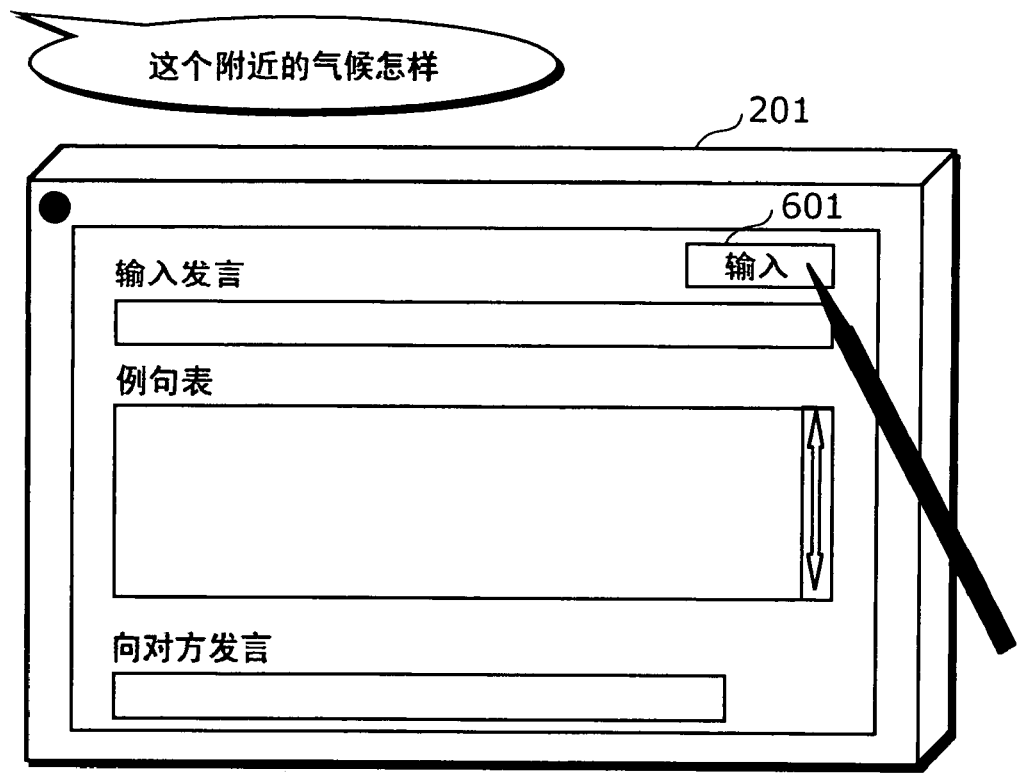
FIGS. 43A and 43B are diagrams showing display examples of the respective dialog supporting devices according to the present invention.
Figure 43B:
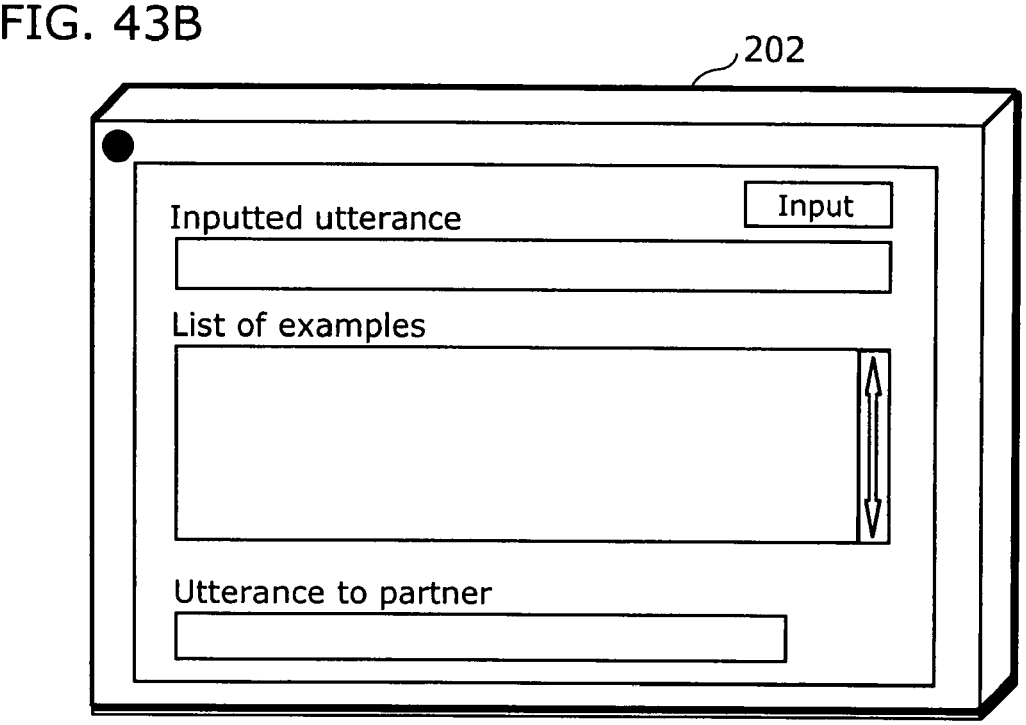
Figure 44A:
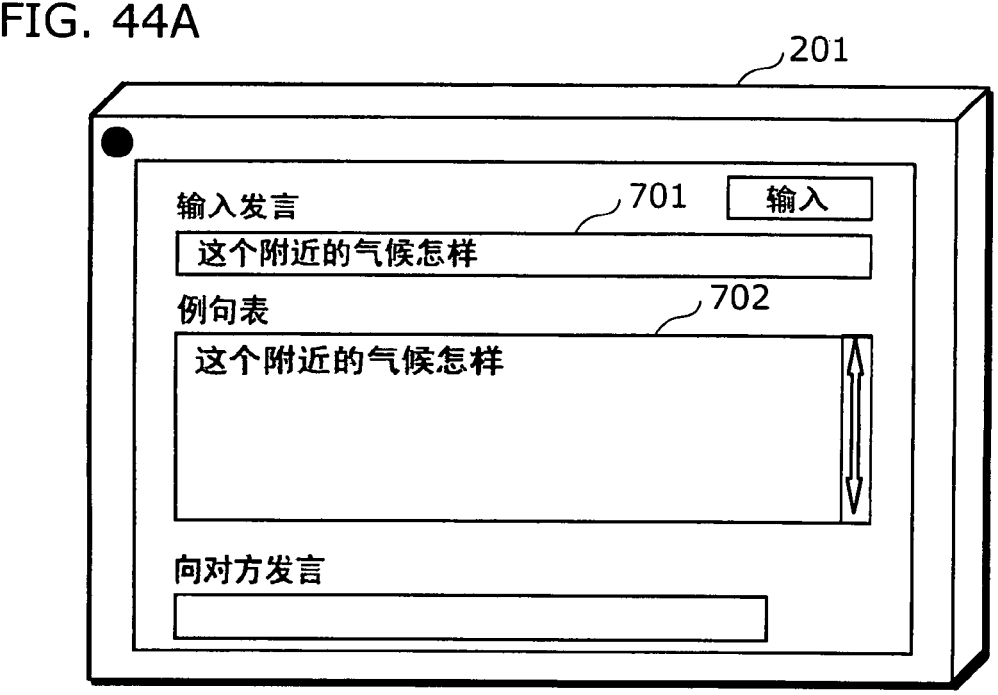
FIGS. 44A and 44B are diagrams showing display examples of the respective dialog supporting devices according to the present invention.
Figure 44B:
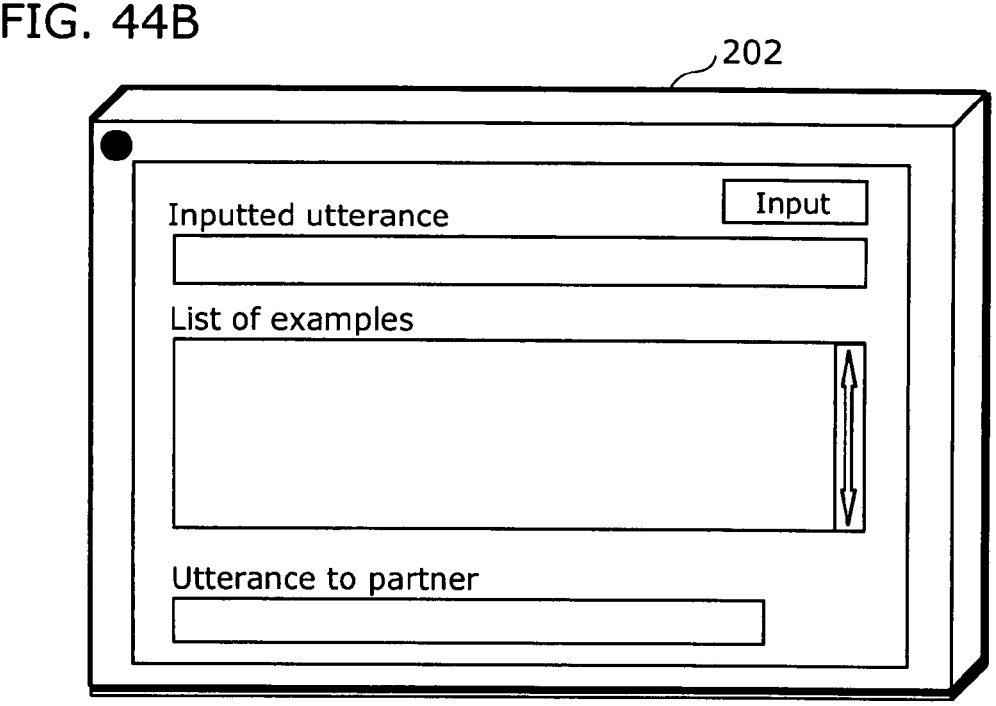

As shown in FIG. 43A, the user 1 is assumed to press an utterance input button 601 and say "这个附近的气候怎样". The utterance receiving unit 102 converts the utterance using the utterance recognition processing into character information, and provides "'这个附近的气候怎样" as utterance information. As shown in FIG. 44A, the utterance information is displayed on the display area 701. The example selecting unit 103 calculates respective similarity degrees between the utterance information and respective examples included in the example database 101, so that an example E { 这个附近的气候怎样} is obtained at Step S402. At step S403, examples included in example candidates E are sequentially displayed on the display area 702.

Figure 45A:
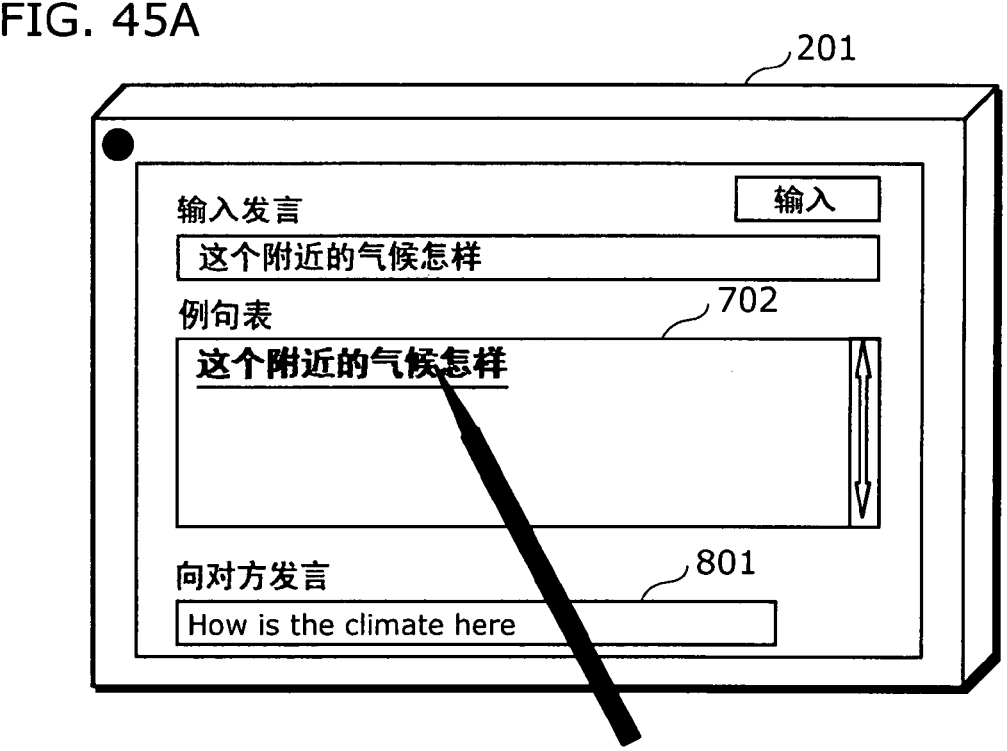
FIGS. 45A and 45B are diagrams showing display examples of the respective dialog supporting devices according to the present invention.
Figure 45B:
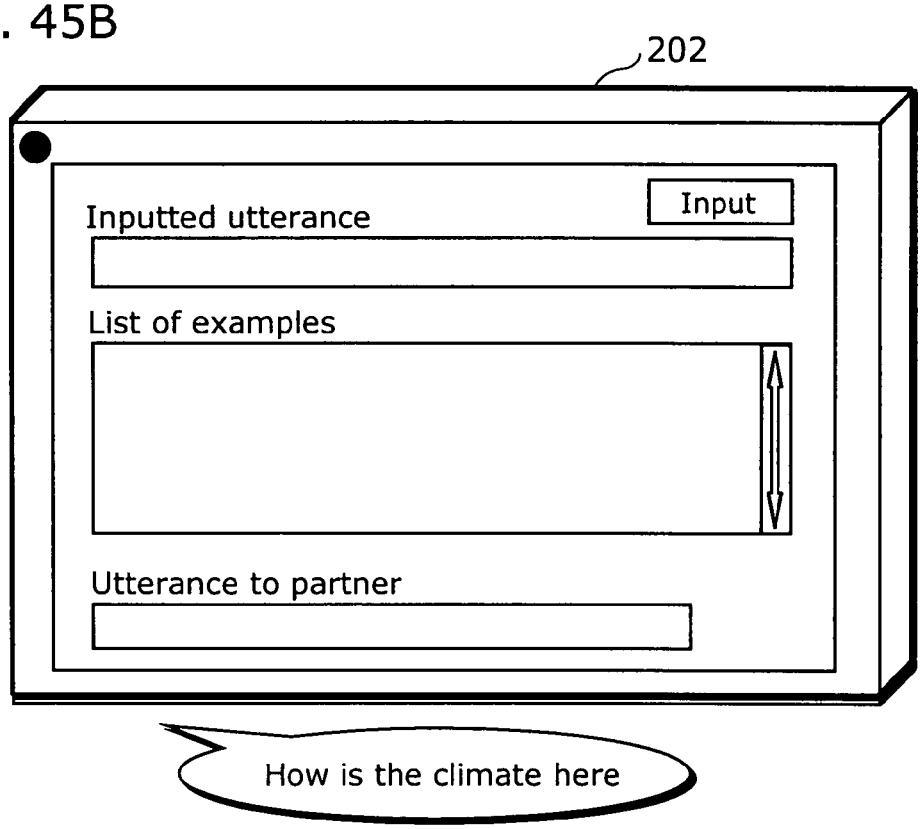

As shown in FIG. 45A, when the user 1 selects the example "这个附近的气候怎样" as a desired example e from the display area 702, a translated example "How is the climate here" is displayed on the display area 801. Furthermore, the translated example and its evaluation tag are sent by the sending unit 104 to the dialog supporting device 202 of the user 2. In the dialog supporting device 202 of the user 2, the receiving unit 105 receives the translated example and its evaluation tag, and the "How is the climate here" is provided as an utterance to the user 2.

Figure 46A:
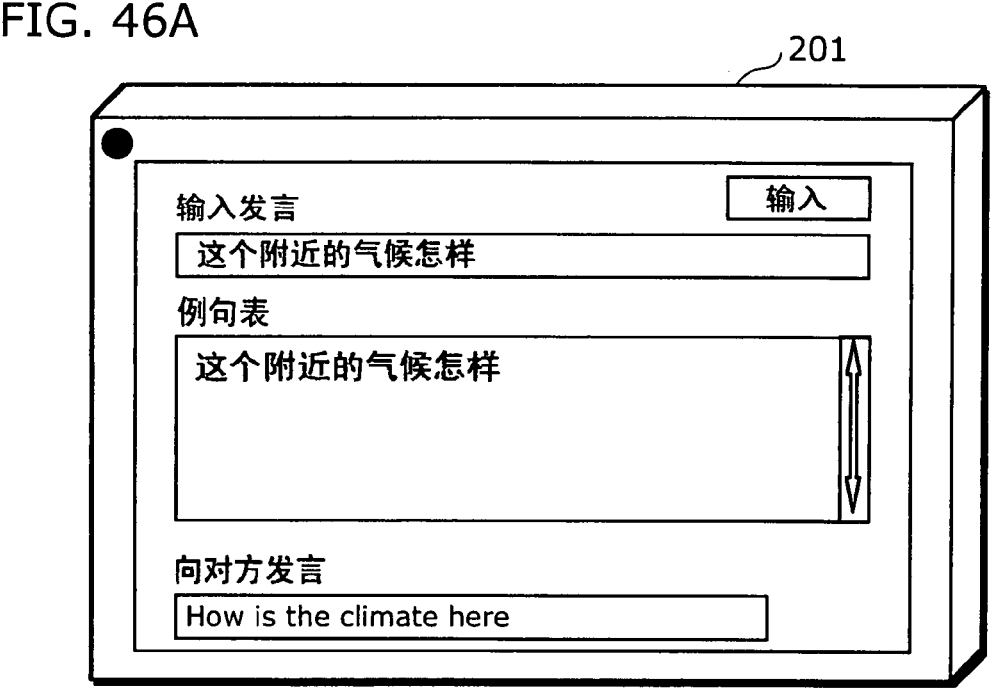
FIGS. 46A and 46B are diagrams showing display examples of the respective dialog supporting devices according to the present invention.
Figure 46B:
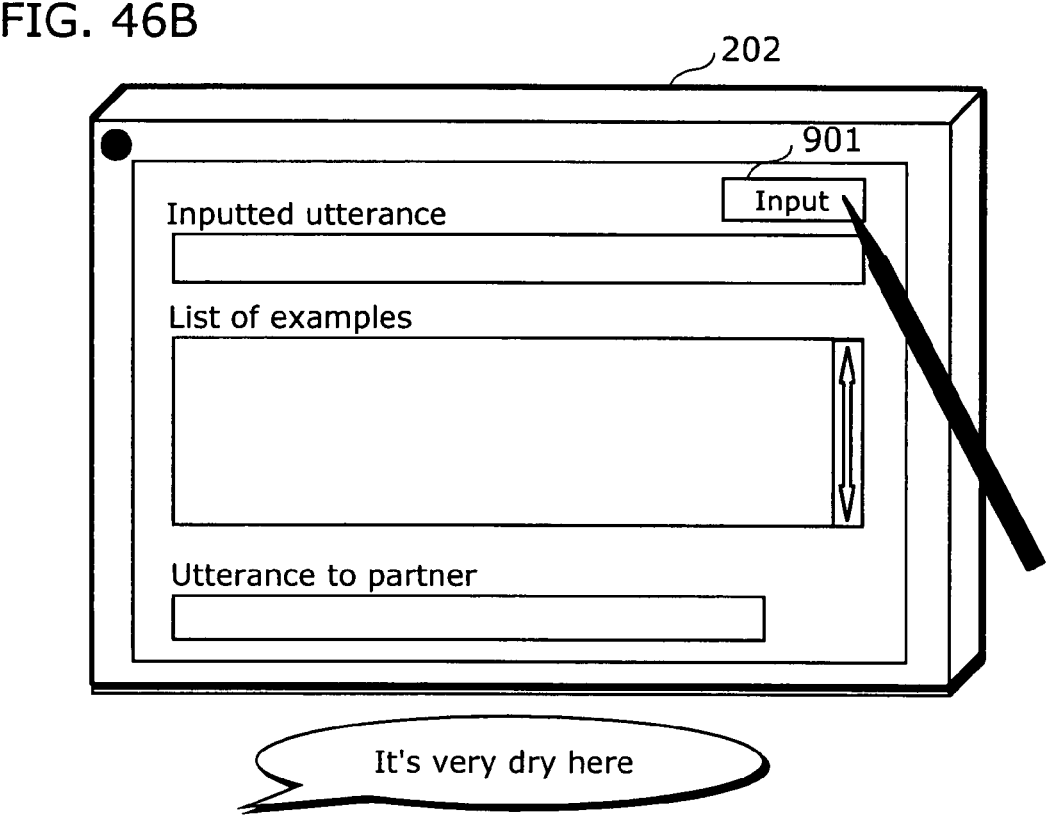
Figure 47A:
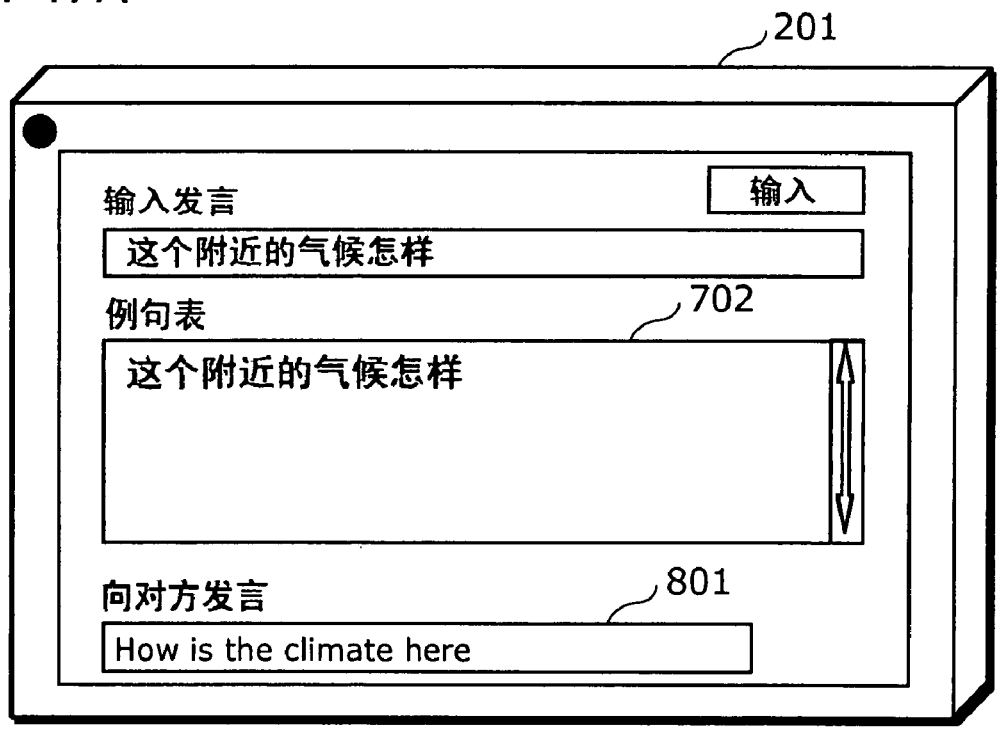
FIGS. 47A and 47B are diagrams showing display examples of the respective dialog supporting devices according to the present invention.
Figure 47B:
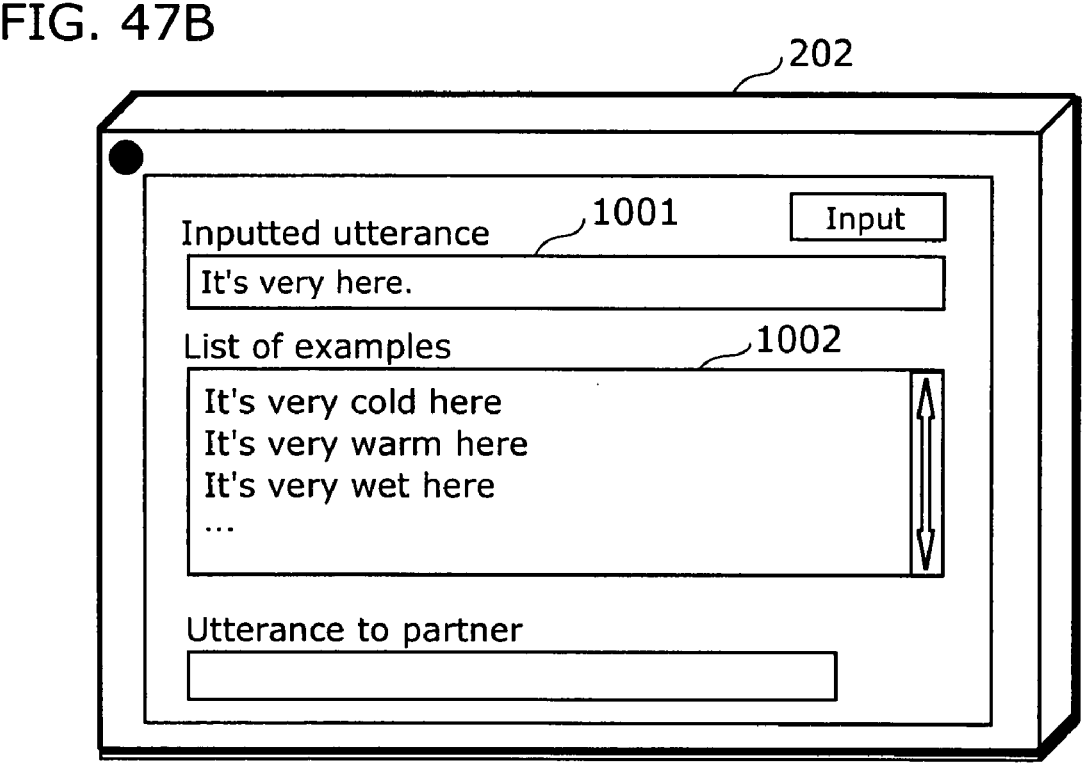

Likewise, as shown in FIG. 46B, the user 2 presses the utterance input button 901 and says "It's very dry here". As shown in FIG. 47B, the utterance is converted by the utterance receiving unit 102 into character information and displayed on the display area 1001. If the utterance receiving unit 102 has utterance recognition processing, there is a high possibility of utterance recognition errors for words with short utterance time period. Here, it is assumed that a word is missed as an error and utterance information "It's very here" is obtained. The example selecting unit 103 calculates respective similarity degrees between this utterance information and respective examples included in the example database 101 and generates the following example candidates E.

---
Example candidate E = {
It's very cold here (1),
It's very warm here (1),
It's very wet here (1),
It's very sunny here (1),
It's very mild here (1),
It's very dry here (1),
It's very cloudy here (1),
It's very hot here (1)}
---

Note that, in the above examples, the numerals in parenthesis represent similarity degrees calculated by dynamic programming shown in FIG. 5. The example candidates E created by the example selecting unit 103 are displayed on the display area 1002.

In this case, it is desirable that the user 2 can immediately select a desired example e from the example candidates, but such a selecting operation generally requires a considerable time in a small device such as a mobile terminal. For instance, in the case where only three example candidates can be displayed on a screen at the same time as shown in FIG. 47, the user has to scroll the display to check each of example candidates which have been hidden outside the screen, so that it takes a long time to select a desired example candidate.

Figure 48A:
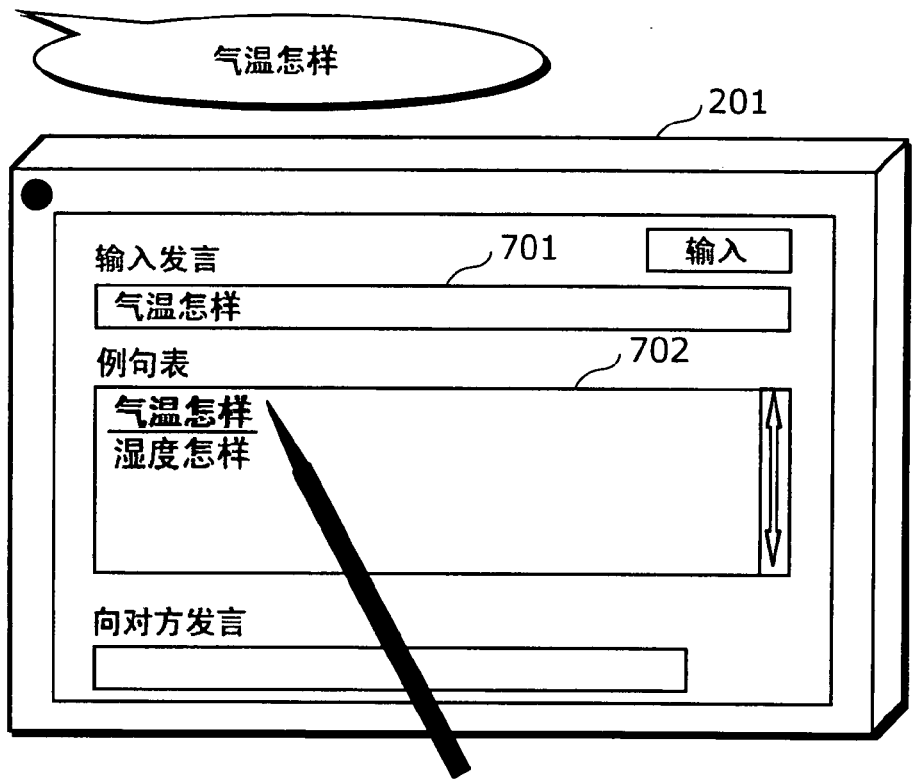
FIGS. 48A and 48B are diagrams showing display examples of the respective dialog supporting devices according to the present invention.
Figure 48B:
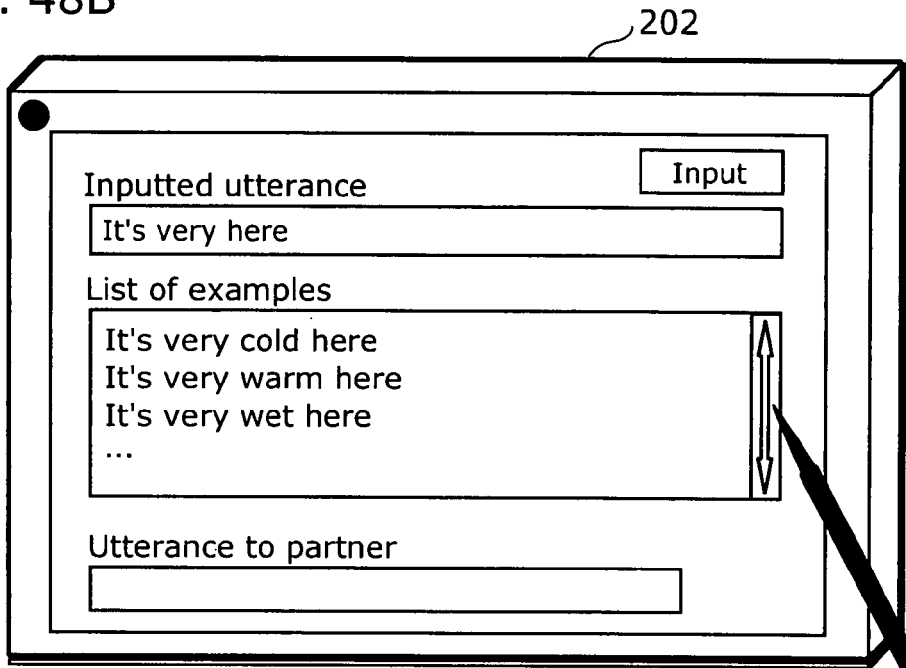
Figure 49A:
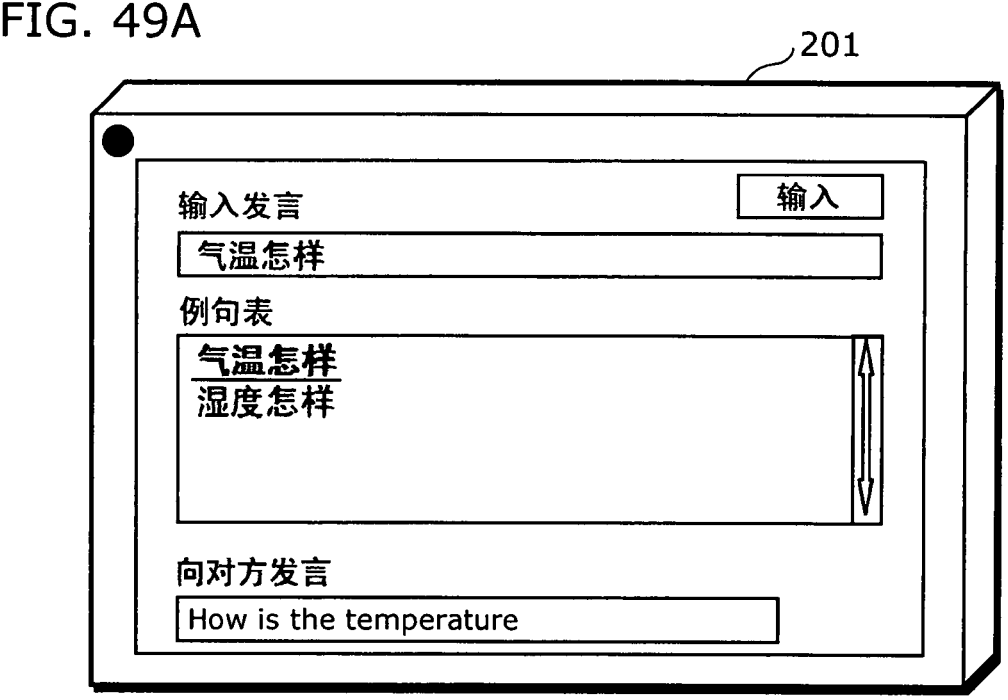
FIGS. 49A and 49B are diagrams showing display examples of the respective dialog supporting devices according to the present invention.
Figure 49B:
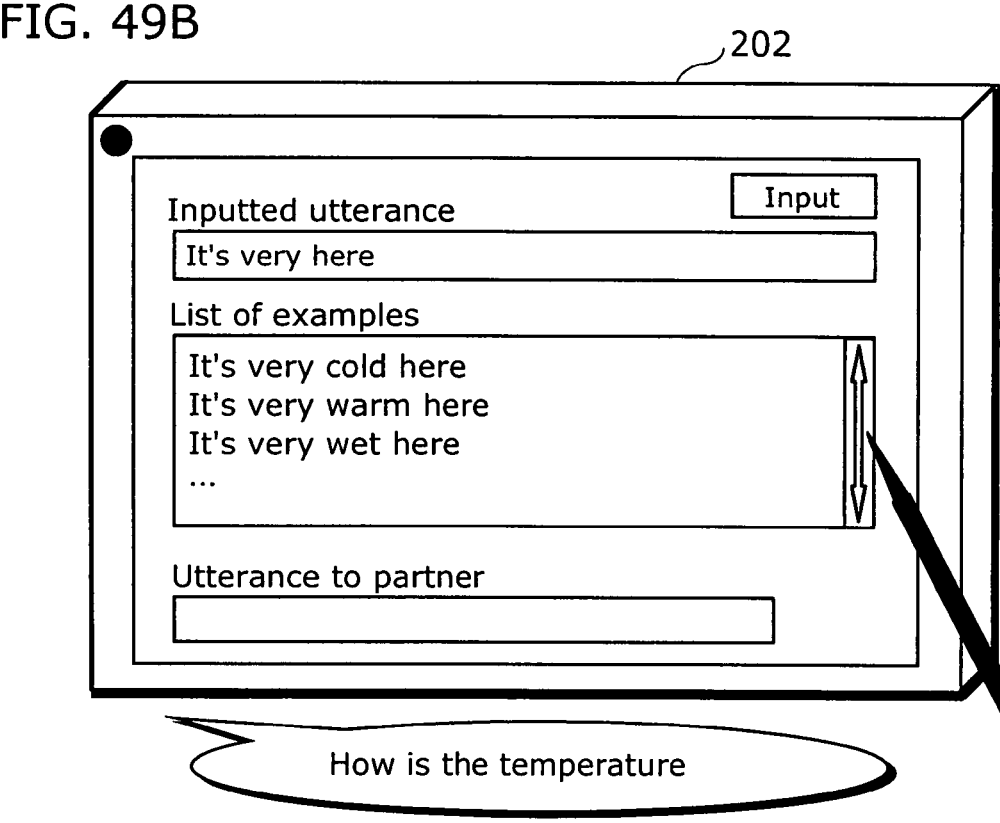

Here, it is assumed that, while the user 2 is searching for the desired example e, the user 1 inputs, as shown in FIG. 48A, a next utterance "气温怎样" into the display area 701. When the user 1 selects the desired example e "気温はどうですか" from the display area 702 in the same manner as described above, the example e "気 温はどうですか" and its evaluation tag "f:x=TEMP" are sent to the dialog supporting device 202 of the user 2. As shown in FIG. 49B, the sent data are outputted from the dialog supporting device 202 of the user 2, so that the user 2 has to change a target example to be searched in order to say to the partner "It's very hot" since the user 2 is actually asking information of temperature. In the conventional method without the example reevaluating unit 107, it is common that the user 2 presses an utterance input button 901 to say "It's very hot here" and then performs a further searching operation for example candidates of the utterance. The reason is that it is not certain that a next desired example is included in the currently-displayed example candidates, so that the user 2 thinks that it is quicker to start a new searching operation from the beginning.

However, in the present embodiment, in the dialog supporting device 202 of the user 2, the example reevaluating unit 107 reevaluates the following example candidates E held in the example selecting unit 103, using the evaluation tag "f:x=TEMP" sent from the dialog supporting device 201 of the user 1.

---
Example candidate E = {
It's very cold here (1) <v:TEMP|CLIM>,
It's very warm here (1), <v:TEMP|CLIM>,
It's very wet here (1) <v:HUM|CLIM>,
It's very sunny here (1) <v:CLIM>,
It's very mild here (1) <v:TEMP|HUM|CLIM>,
It's very dry here (1) <v:HUM|CLIM>,
It's very cloudy here (1) <v:CLIM>,
It's very hot here (1) <v:TEMP|CLIM>}
---

In other words, the examples included in the example candidates are sorted in an order by which amount parts satisfy a conditional equation x=TEMP, by referring to the evaluation tags defined in the example database 101. As a result, by prioritizing an example whose evaluation tag has an amount tag "v:n" where n corresponds to TEMP, the example candidates E are sorted as follows.

---
E = {
It's very cold here (1) <v:TEMP|CLIM>,
It's very warm here (1), <v:TEMP|CLIM>,
It's very hot here (1) <v:TEMP|CLIM>,
It's very mild here (1) <v:TEMP|HUM|CLIM>,
It's very wet here (1) <v:HUM|CLIM>,
It's very sunny here (1) <v:CLIM>,
It's very dry here (1) <v:HUM|CLIM>,
It's very cloudy here (1) <v:CLIM>}
---

Figure 50A:
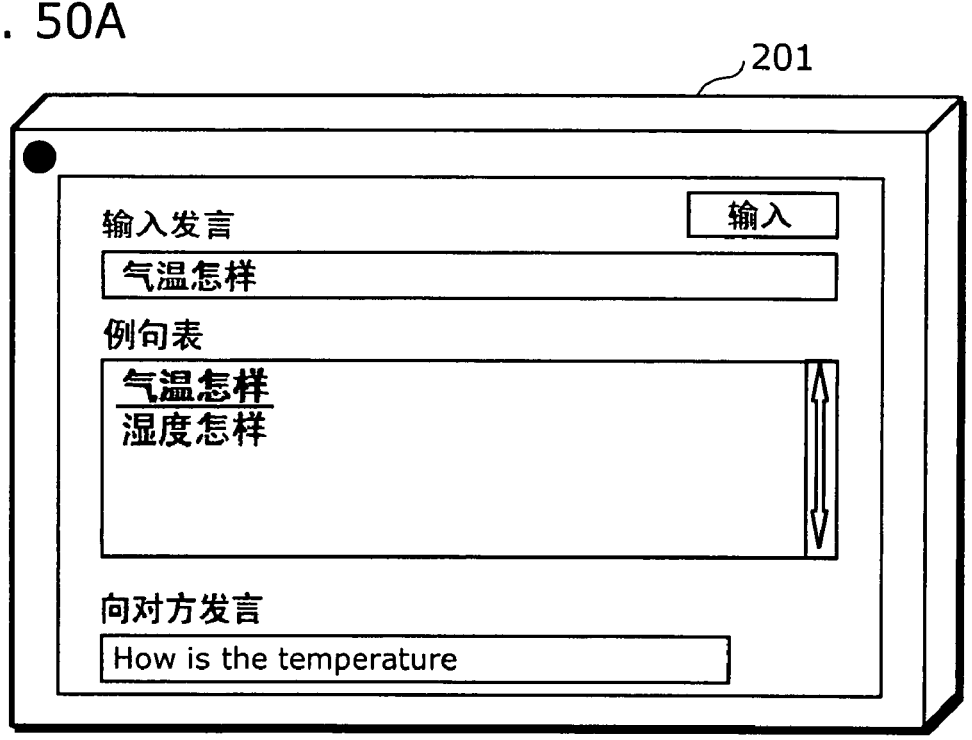
FIGS. 50A and 50B are diagrams showing display examples of the respective dialog supporting devices according to the present invention.
Figure 50B:
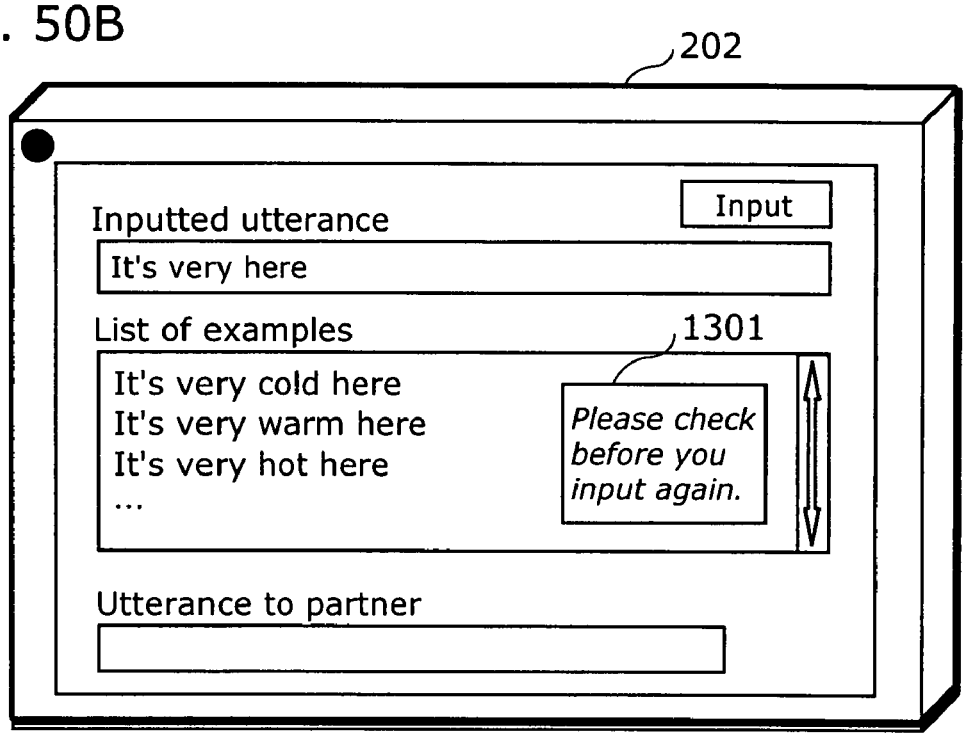

Here, the example No. 11 "It's very hot here" (1)<v:TEMP|CLIM> is arranged prior to the example No. 8 "It's very mild here" (1)<v:TEMP|HUM|CLIM>, since a conditional equation x=TEMP of the example No. 11 has higher meaning satisfaction for the conditional equation. More specifically, an interpretable range of each of the examples is calculated based on the number of types of amount parts in the amount tag, and it is determined that a smaller interpretable range has higher meaning satisfaction for the conditional equation. For instance, an interpretable range of the example No. 8 is 3, while an interpretable range of the example No. 11 is 2. Therefore, the example reevaluating unit 107 arranges the example No. 11 prior to the example No. 8. The sorted example candidates are presented to the user 2 together with a message 1301 asking the user 2 to select a desired example from the example candidates, as shown in FIG. 50B.

Figure 51A:
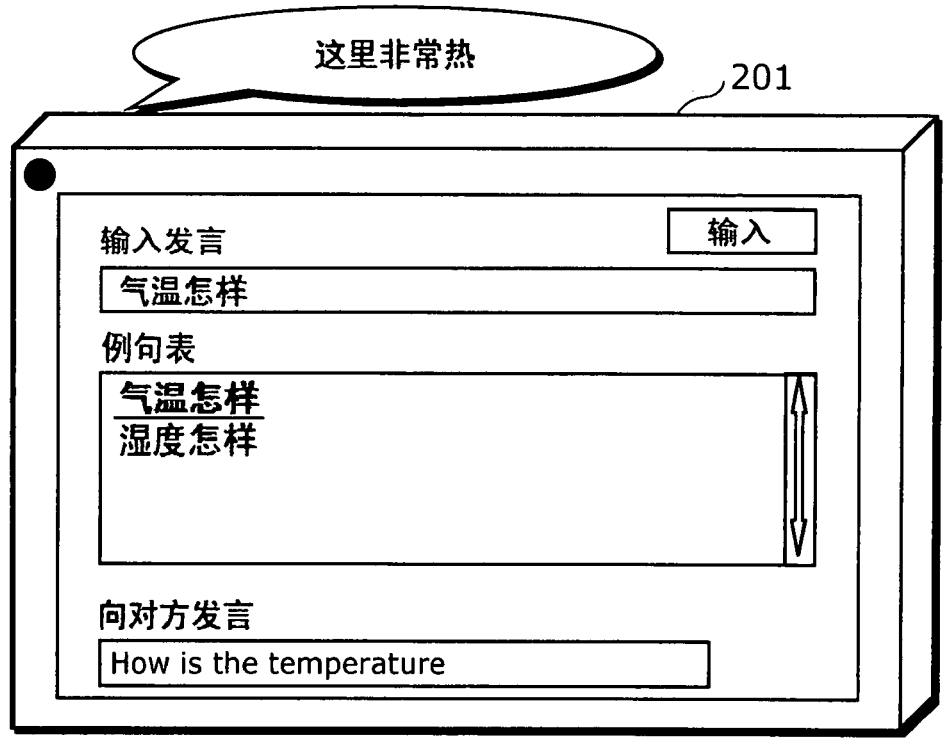
FIGS. 51A and 51B are diagrams showing display examples of the respective dialog supporting devices according to the present invention.
Figure 51B:
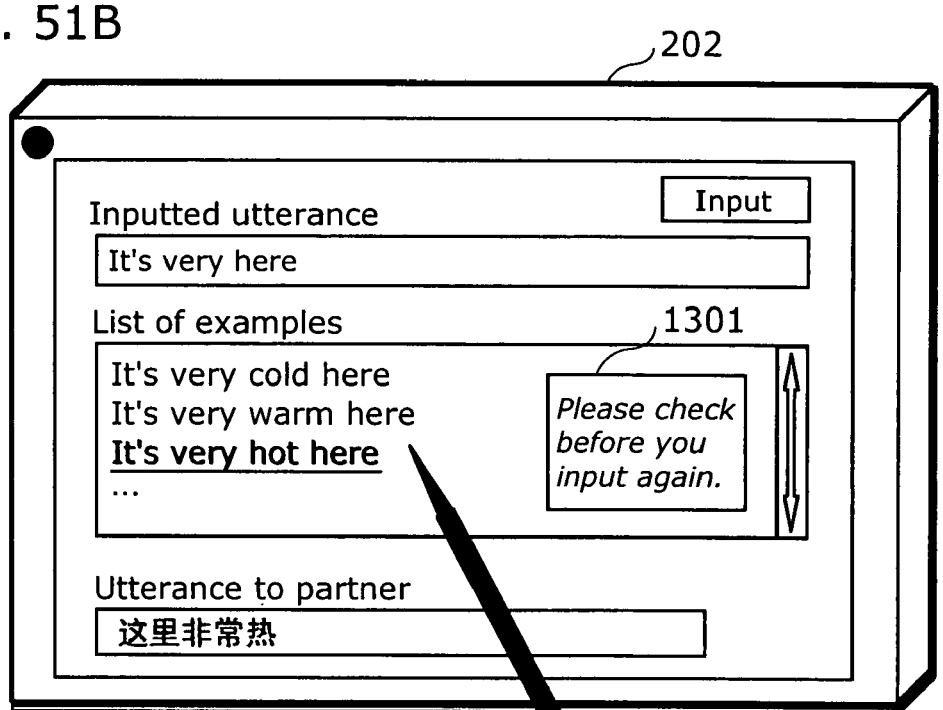

Thereby, the user 2 can immediately select an example e "It's very hot here" as the desired example as shown in FIG. 51B, so that a translated example "这里非常热" can be immediately outputted to the user 1 as shown in FIG. 51A.

As described above, the example candidates are reevaluated, so that further searching is not necessary and an operation amount required to generate one utterance can be reduced for the whole dialog.

Figure 52:
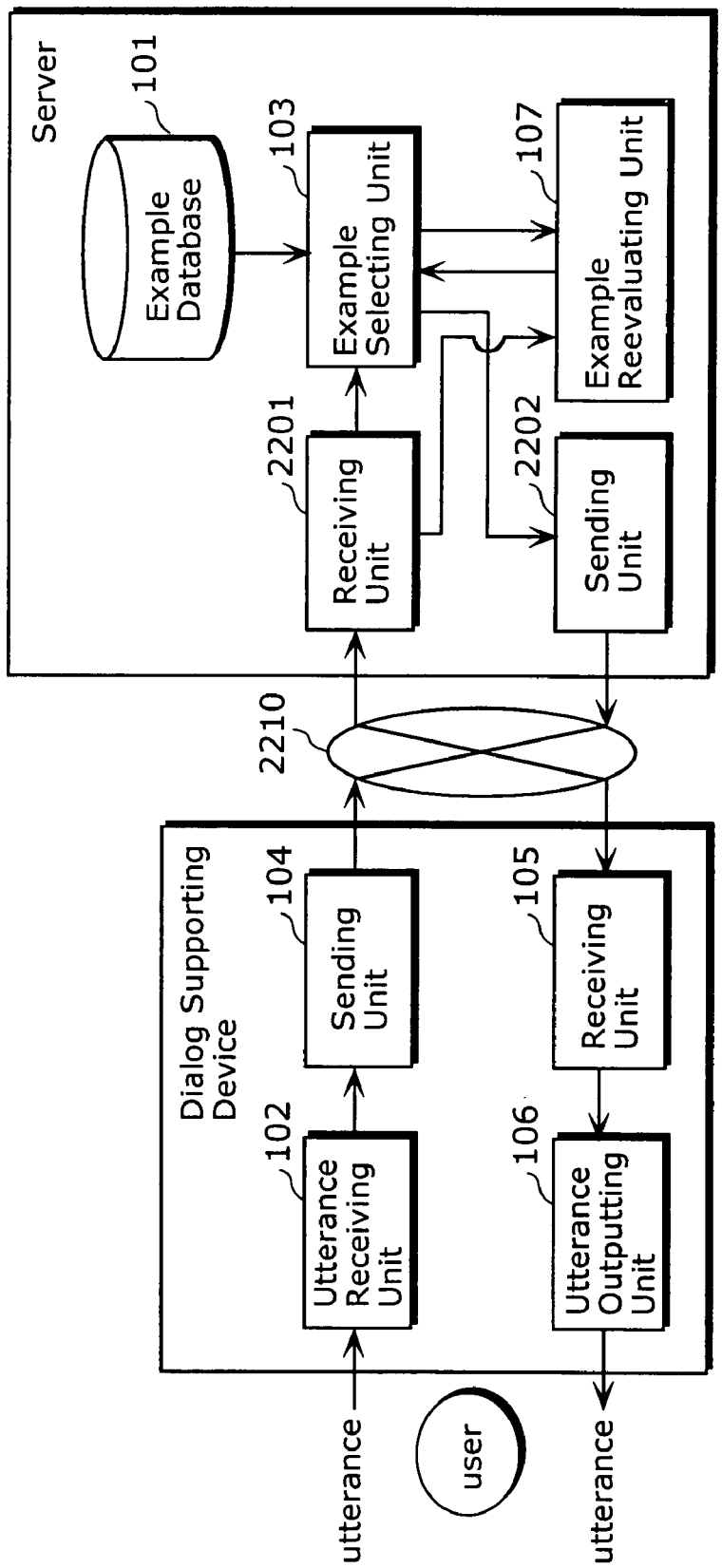
FIG. 52 is a block diagram showing an example of a structure of a dialog supporting system according to still another embodiment of the present invention.

Note also that, as shown in FIG. 52, the present invention can be realized a system having (i) a dialog supporting device which includes the utterance receiving unit 102, the sending unit 104, the receiving unit 105, and the utterance outputting unit 106, and (ii) a server which includes the example database 101, the example selecting unit 103, and the example reevaluating unit 107. Here, the dialog supporting device and the server are connected with each other via a network 2210 such as the Internet. In this system, the sending unit 104 of the dialog supporting device sends utterance information to the server, and the receiving unit 2201 of the server receives the utterance information. Then, the sending unit 2202 of the server sends examples specified by the server based on the utterance information, to the receiving unit 105 of the dialog supporting device. Further, when the server is informed of that the user selects one example from the example candidates in the dialog supporting device, the server sends a translated example of the selected example to the dialog supporting device of the user. Here, it is assumed that, prior to the selecting of the one example from the example candidates in the user's dialog supporting device, the sending unit 2202 of the server receives the utterance information from a partner's dialog supporting device, then sends example candidates specified based on the partner's utterance information to the partner's device, and then receives information that one example has been selected from the example candidates in the user's device. In this case, in the server, the sending unit 2202 sends a translated example of the selected example to the user's device, the example reevaluating unit 107 reevaluates the example candidates using an evaluation tag of the selected example, and the reevaluated example candidates are sent to the user's device.

Note also that the above embodiments have been described, as examples, the cases of dialog between Japanese and English, and dialog between Chinese and English, but the present invention can be applied to dialog in any other languages, such as French, and does not depend on specific languages.

Although only some exemplary embodiments of the present invention have been described in detail above, those skilled in the art will readily appreciate that many modifications are possible in the exemplary embodiments without materially departing from the novel teachings and advantages of the present invention.

Accordingly, all such modifications are intended to be included within the scope of this invention.

INDUSTRIAL APPLICABILITY

The dialog supporting device according to the present invention has a function of speedily completing utterances of dialog participants, and is suitable for a translation application software and the like used in a mobile telephone, a mobile terminal, and the like. Further, the present invention can be applied to a public street terminal, a public guide terminal, and the like. Furthermore, if the present invention is used for dialog between the same language, the present invention is also applied to a chatting system using fixed sentences.

What is claimed is:

1. A dialog supporting device which supports dialog, for use with another dialog supporting device, said device comprising:
    an example database operable to hold first examples and second examples which are used in the dialog, wherein the first examples are associated with respective second examples;
    an utterance receiving unit operable to receive an utterance of a user;
    an example selecting unit operable to (i) extract first example candidates by searching said example database based on the utterance received by said utterance receiving unit, (ii) select one first example from the extracted first example candidates, and (iii) obtain a second example associated with the selected one first example;
    a sending unit operable to send the second example obtained by said example selecting unit, to the other dialog supporting device;
    a receiving unit operable to receive a second example from the other dialog supporting device;
    an utterance outputting unit operable to output the second example from the other dialog supporting device; and
    an example reevaluating unit operable to reevaluate the first example candidates extracted by said example selecting unit, based on the second example from the other dialog supporting device.

2. The dialog supporting device according to claim 1,
wherein said example database is further operable to hold the first examples and the second examples in association with evaluation tags, respectively,
    wherein said example selecting unit is operable to obtain the second example and the associated evaluation tag, and
    wherein said example reevaluation unit is operable to reevaluate the first example candidates based on the evaluation tag associated with the second example from the other dialog supporting device.

3. The dialog supporting device according to claim 2,
wherein each of the evaluation tags is at least one of:
    an amount tag regarding information which a user provides to a dialog partner; and
    a condition tag indicating conditions of information which the user requests from the dialog partner; and
wherein said example reevaluating unit is operable to reevaluate the first example candidates based on (i) a condition tag which is the evaluation tag added to the second example from the other dialog supporting device, and (ii) amount tags which are evaluation tags associated with the respective first example candidates.

4. The dialog supporting device according to claim 1,
wherein said example reevaluating unit is operable to reevaluate the first example candidates when said receiving unit receives the second example from the other dialog supporting device before said example selecting unit selects the one first example from the first example candidates.

5. The dialog supporting device according to claim 4,
wherein said example reevaluating unit is operable to reevaluate the first example candidates and guide the user to select the one first example from the first example candidates when said receiving unit receives the second example from the other dialog supporting device before said example selecting unit selects the one first example from the first example candidates.

6. The dialog supporting device according to claim 1, further comprising:
    a candidate notifying unit operable to notify a user of the first example candidates extracted by said example selecting unit; and
    a selection instruction receiving unit operable to receive an instruction from the user to select the one first example from the first example candidates,
    wherein said example selecting unit is operable to select the one first example based on the instruction received by said selection instruction receiving unit.

7. The dialog supporting device according to claim 6,
wherein said candidate notifying unit is operable to sort the first example candidates based on a result of the reevaluation of said example reevaluating unit, and to notify the user of the sorted first example candidates.

8. The dialog supporting device according to claim 1, further comprising
    a topic change detecting unit operable to detect a change in topics in the dialog based on the second example from the other dialog supporting device,
    wherein said example reevaluating unit is further operable not to reevaluate the first example candidates when said receiving unit receives the second example from the other dialog supporting device and said topic change detecting unit detects a change in topics before said example selecting unit selects the one first example from the first example candidates.

9. The dialog supporting device according to claim 8,
wherein said example reevaluating unit is further operable to guide the user to make a further utterance when said receiving unit receives the second example from the other dialog supporting device and said topic change detecting unit detects the change in topics before said example selecting unit selects the one first example from the first example candidates.

10. The dialog supporting device according to claim 1, wherein said utterance receiving unit is operable to receive the utterance (i) via continuous utterance recognition processing using a language model derived from the first examples held in said example database, or (ii) via a keyboard under a limitation by which only words included in the first examples held in said example database can be inputted.

11. A dialog supporting system which supports dialog, said dialog supporting system comprising a server, a first dialog supporting device, and a second dialog supporting device, said first and second supporting devices being connected via said server,
wherein said first dialog supporting device includes:
an utterance receiving unit operable to receive an utterance of a user;
a receiving unit operable to receive a communication from said server;
an utterance outputting unit operable to output the communication received from said server; and
a sending unit operable to send the utterance received by said utterance receiving unit to said server,
wherein said server includes:
an example database operable to hold first examples and second examples which are used in the dialog, wherein the first examples are associated with respective second examples;
an example selecting unit operable to (i) extract first example candidates by searching said example database based on the utterance from said first dialog supporting device, (ii) select one first example from the extracted first example candidates, and (iii) obtain a second example associated with the selected one first example;
an example reevaluating unit operable to reevaluate the first example candidates extracted by said example selecting unit, based on a second example associated with an utterance sent from said second dialog supporting device; and
a sending unit operable to send (i) the second example obtained by said example selecting unit to said second dialog supporting device and (ii) a result of the reevaluating of said example reevaluating unit to said first dialog supporting device, and
wherein said second dialog supporting device includes:
an utterance receiving unit operable to receive an utterance of a user;
a receiving unit operable to receive the second example from said server;
an utterance outputting unit operable to output the second example received by said receiving unit; and
a sending unit operable to send the utterance received by said utterance receiving unit to said server.

12. A dialog supporting method of supporting dialog for use with a first dialog supporting device and a second dialog supporting device, said method comprising:
receiving, with the first dialog supporting device, an utterance of a user;
extracting, with the first dialog supporting device, first example candidates by searching an example database stored in the first dialog supporting device based on the utterance received in said receiving of the utterance, the example database holding first examples and second examples which are used in the dialog, wherein the first examples are associated with respective second examples;
receiving, with the first dialog supporting device, a second example from the second dialog supporting device;
outputting, with the first dialog supporting device, the second example from the second dialog supporting device;
reevaluating, with the first dialog supporting device, when the second example is received from the dialog partner of the user, the first example candidates extracted in said extracting based on the second example from the second dialog supporting device;
selecting one first example from the extracted candidates;
obtaining, with the first dialog supporting device, a second example associated with the selected one first example; and
sending, with the first dialog supporting device, the second example obtained in said obtaining to the second dialog supporting device.

13. A computer program stored in a recording medium which, when loaded into a computer, supports dialog and allows said computer to execute a dialog supporting method comprising:
receiving an utterance of a user;
extracting first example candidates by searching an example database based on the utterance received in said receiving of the utterance, the example database holding first examples and second examples which are used in the dialog, wherein the first examples are associated with respective second examples;
receiving a second example from a dialog partner of the user;
outputting the second example from the dialog partner of the user;
reevaluating, when the second example is received from the dialog partner of the user, the first example candidates extracted in said extracting based on the second example from the dialog partner of the user;
selecting one first example from the extracted candidates;
obtaining a second example associated with the selected one first example; and
sending the second example obtained in said obtaining, to a dialog supporting device of the dialog partner of the user.

* * * * *